(12) United States Patent
Lopp et al.

(10) Patent No.: US 8,517,055 B2
(45) Date of Patent: Aug. 27, 2013

(54) VALVE CARTRIDGE WITH LOBULAR KEY

(75) Inventors: Darren S. Lopp, North Ridgeville, OH (US); W. Randall Tucker, Oberlin, OH (US)

(73) Assignee: Moen Incorporated, North Olmsted, OH (US)

( * ) Notice: Subject to any disclaimer, the term of this patent is extended or adjusted under 35 U.S.C. 154(b) by 58 days.

(21) Appl. No.: 13/252,680

(22) Filed: Oct. 4, 2011

(65) Prior Publication Data

US 2012/0025122 A1 Feb. 2, 2012

Related U.S. Application Data

(62) Division of application No. 12/023,842, filed on Jan. 31, 2008, now Pat. No. 8,056,578.

(60) Provisional application No. 60/898,579, filed on Jan. 31, 2007.

(51) Int. Cl.
*F16K 11/078* (2006.01)

(52) U.S. Cl.
USPC .................................... 137/625.4; 137/454.6

(58) Field of Classification Search
USPC ........................................... 137/625.4, 454.6
See application file for complete search history.

(56) References Cited

U.S. PATENT DOCUMENTS

| | | | |
|---|---|---|---|
| 2,826,934 A * | 3/1958 | Jakeway | 74/553 |
| 3,680,592 A | 8/1972 | Hayman | |
| 3,698,418 A | 10/1972 | Schmitt | |
| 3,738,389 A | 6/1973 | Cole et al. | |
| 3,780,758 A | 12/1973 | DeVries | |
| 3,788,356 A | 1/1974 | Moen | |
| 3,880,400 A | 4/1975 | Cole et al. | |
| 3,929,317 A | 12/1975 | Cohn et al. | |
| 4,203,464 A | 5/1980 | Farrell et al. | |
| 4,226,260 A | 10/1980 | Schmitt | |
| 4,245,781 A * | 1/1981 | Sliger | 236/34.5 |
| 4,285,361 A | 8/1981 | Lissau | |
| 4,425,935 A | 1/1984 | Gonzalez | |
| 4,607,659 A | 8/1986 | Cole | |
| 4,641,685 A | 2/1987 | Rudelick | |
| 4,700,736 A | 10/1987 | Sheen | |
| 4,700,928 A | 10/1987 | Marty | |
| 4,802,506 A | 2/1989 | Aslanian | |
| 4,838,304 A * | 6/1989 | Knapp | 137/454.6 |
| 4,901,749 A | 2/1990 | Hutto | |
| 4,942,902 A * | 7/1990 | Knapp | 137/625.17 |
| 5,095,934 A | 3/1992 | Iqbal | |
| 5,613,521 A | 3/1997 | Knapp | |
| 5,615,709 A | 4/1997 | Knapp | |
| 5,664,655 A * | 9/1997 | Oh | 192/70.2 |
| 5,725,010 A | 3/1998 | Marty et al. | |
| 5,860,634 A | 1/1999 | Marty et al. | |
| 6,123,105 A | 9/2000 | Yang | |
| 6,293,299 B1 | 9/2001 | Nelson | |
| 6,575,196 B1 | 6/2003 | Creswell | |
| 6,920,899 B2 | 7/2005 | Haenlein et al. | |
| 7,032,272 B2 | 4/2006 | Haenlein | |
| 2006/0016491 A1 | 1/2006 | Rosko et al. | |
| 2006/0037651 A1 | 2/2006 | Yang | |

\* cited by examiner

*Primary Examiner* — John Fox
(74) *Attorney, Agent, or Firm* — Calfee, Halter & Griswold LLP

(57) ABSTRACT

A one-handle valve cartridge has one or more lobular keys formed on a housing of the valve cartridge. The lobular keys interface with keyways formed in a valve body.

18 Claims, 58 Drawing Sheets

SECTION A-A

SECTION B-B

SECTION C-C

SECTION A-A

SECTION A-A

SECTION B-B

SECTION A-A

SECTION B-B

SECTION A-A

SECTION A-A

SECTION A-A

SECTION A-A

SECTION A-A

SECTION B-B

VALVE CARTRIDGE WITH LOBULAR KEY

CROSS REFERENCE TO RELATED APPLICATIONS

This application is a divisional application of and claims priority to U.S. patent application Ser No. 12/023,842, filed on Jan. 31, 2008, and titled "VALVE CARTRIDGE WITH LOBULAR KEY," which in turn is claims priority to U.S. Provisional Patent Application No. 60/898,579, filed Jan. 31, 2007, and titled "VALVE CARTRIDGE WITH LOBULAR KEY", both of which are hereby incorporated by reference in their entirety.

FIELD

The invention relates generally to valve cartridges and, more particularly, to a valve cartridge having a lobular key.

BACKGROUND

Typically, for a plumbing fixture (e.g., a faucet, a tub spout, a shower head), a valve body conveys water flowing from a main water source to a desired destination (e.g., a sink, a tub, a basin). The valve body generally has two water inlet passages through which cold water and hot water from the main water source can respectively flow. The valve body also has a water outlet passage through which the cold water, the hot water or a mixture of the cold and hot water can be discharged to an outlet portion of the plumbing fixture (e.g., a spout). In a one-handle version of the valve body, the valve body has a cavity for receiving a valve cartridge which allows a user to control the flow rate and the temperature of the water flowing through the water inlet passages to the water outlet passage using a single valve actuating mechanism.

One type of (conventional) valve cartridge is a structural assembly including a housing in which two or more disks, plates or the like are disposed. The disks are made of a hard material (e.g., ceramic or metal). At least one of the disks (i.e., a fixed disk) is fixed relative to the housing. Another of the disks (i.e., a movable disk) is disposed above the fixed disk and is movable relative to the fixed disk. The valve cartridge includes the actuating mechanism that is directly or indirectly connected at one end to the movable disk. Another end of the actuating mechanism extends through an opening in the housing for manipulation by a user. The end of the actuating mechanism extending through the opening in the housing can be connected to a handle, knob or the like to assist the user in operating the valve cartridge.

In a one-handle version of this type of valve cartridge for use in the one-handle version of the valve body, the fixed disk includes two inlet openings (i.e., a cold water inlet opening and a hot water inlet opening) that substantially align with the water inlet passages of the valve body when the valve cartridge is installed in the valve body. Furthermore, the fixed disk includes an outlet opening that substantially aligns with the water outlet passage of the valve body when the valve cartridge is installed in the valve body. The actuating mechanism is connected to the movable disk via a coupling. The actuating mechanism can be pivoted to cause translational movement of the movable disk. The actuating mechanism can be rotated to cause angular movement of the movable disk.

In this manner, the movable disk can assume different positions relative to the fixed disk. In particular, pivoting of the actuating mechanism changes the flow rate of the water from zero to a maximum flow rate, whereas rotation of the actuating mechanism changes the temperature of the water. Accordingly, a one-handle actuating mechanism can control both the flow rate and the temperature of the water flowing through the valve cartridge.

The valve cartridge also includes one or more seals for preventing water from leaking out of the valve cartridge. The seals can be located, for example, below, between and/or above the disks in the valve cartridge. When the valve cartridge is installed in the valve body, a retention nut is used to secure the valve cartridge in the valve body. The retention nut engages an installation ledge of the housing of the valve cartridge such that the seals in the valve cartridge are compressed and, thus, apply a loading force to the components (including the disks) in the valve cartridge. Accordingly, the fixed disk and the movable disk are kept in water tight contact after installation of the valve cartridge in the valve body.

Typically, the conventional valve cartridge has one or more keys that project from the housing of the valve cartridge. The keys interface with corresponding keyways. A keyway is a complementary surface or recess formed in the valve body. One purpose of the keys is to align the valve cartridge in the valve body. In particular, when the keys properly interface with the keyways, the inlet openings and the outlet opening of the fixed disk of the valve cartridge are aligned with the water inlet passages and the water outlet passage of the valve body, respectively. Another purpose of the keys is to prevent the valve cartridge from rotating relative to the valve body as torque is applied to the valve catridge by the user after installation and during operation of the valve cartridge. If the valve cartridge were allowed to rotate in the valve body after installation, the inlet openings and the outlet opening of the fixed disk would become unaligned with the water inlet passages and the water outlet passage of the valve body, respectively, thereby causing the valve cartridge to operate improperly.

In general, the conventional keys projecting from a side of the housing have a rectangular or trapezoidal shape. As a result, it is difficult and/or expensive to machine the corresponding keyways in the valve body. Furthermore, the keyways can increase a width of the valve body. The keys project from the side of the housing near the top of the housing. The keyways are formed near the top of the valve body. As a result, it is possible to insert the valve cartridge into the valve body in an unaligned state, which increases the probability that the valve cartridge will be installed in an unaligned state.

The conventional keys projecting from a bottom of the housing are formed as posts that can be round. The keys formed on the bottom of the housing interface with keyways formed in a bottom of the valve body. As a result, it is possible to insert the valve cartridge into the valve body in an unaligned state, which increases the probability that the valve cartridge will be installed in an unaligned state. Furthermore, it is difficult to install and/or align the valve cartridge in the valve body since the keys cannot be seen once insertion of the valve cartridge in the valve body begins. Furthermore, the keyways can increase a depth of the valve body.

Consequently, there is a need in the art for a valve cartridge having keys that make forming the corresponding keyways in the valve body easier and less expensive, that make installing and aligning the valve cartridge in the valve body easier and less prone to alignment errors and that do not result in an increased size (e.g., width or height) of the valve body through formation of the keyways.

SUMMARY

In view of the above, it is an exemplary aspect to provide a valve cartridge having a housing with one or more lobular keys formed on the housing. The lobular keys interface with complementary shaped keyways formed in a valve body.

BRIEF DESCRIPTION OF THE DRAWINGS

The above aspects and additional aspects, features and advantages will become readily apparent by describing in detail exemplary embodiments thereof with reference to the attached drawings, wherein like reference numerals denote like elements, and:

FIG. 2A is a perspective view of the housing. FIG. 2B is a side elevational view of the housing. FIG. 2C is a cross-sectional view of the housing shown in FIG. 10A, along line A-A. FIG. 2D is a cross-sectional view of the housing shown in FIG. 10A, along line B-B. FIG. 2E is a cross-sectional view of the housing of FIG. 2C, along line C-C.

FIG. 4A is a perspective view of the spring. FIG. 4B is a plan view of the spring. FIG. 4C is a side elevational view of the spring.

FIG. 5A is a perspective view of the bushing. FIG. 5B is a side elevational view of the bushing. FIG. 5C is a bottom view of the bushing. FIG. 5D is a cross-sectional view of the bushing of FIG. 5C, along line A-A.

FIG. 6A is a perspective view of the flow plate. FIG. 6B is a plan view of the flow plate. FIG. 6C is a cross-sectional view of the flow plate of FIG. 6B, along line A-A. FIG. 6D is a cross-sectional view of the flow plate of FIG. 6B, along line B-B.

FIG. 8A is a top perspective view of the base seal. FIG. 8B is a bottom perspective view of the base seal.

FIG. 9A is a perspective view of the valve body. FIG. 9B is a plan view of the valve body.

FIG. 10A is a plan view of the valve cartridge in assembled form. FIG. 10B is a cross-sectional view of the valve cartridge of FIG. 10A, along line A-A. FIG. 10C is a cross-sectional view of the valve cartridge of FIG. 10A, along line B-B.

FIG. 13A is a perspective view of the upper housing. FIG. 13B is a side elevational view of the upper housing. FIG. 13C is a cross-sectional view of the upper housing of FIG. 13B, along line A-A.

FIG. 15A is a perspective view of the spring. FIG. 15B is a plan view of the spring. FIG. 15C is a cross-sectional view of the spring of FIG. 15B, along line A-A.

FIG. 16A is a side elevational view of the bushing. FIG. 16B is a cross-sectional view of the bushing of FIG. 16A along line A-A. FIG. 16C is a plan view of the bushing.

FIG. 17A is a perspective view of the carrier. FIG. 17B is a plan view of the carrier. FIG. 17C is a bottom view of the carrier. FIG. 17D is a side elevational view of the carrier.

FIG. 18A is a plan view of the movable disk. FIG. 18B is a cross-sectional view of the movable disk of FIG. 18A, along line A-A. FIG. 18C is a bottom view of the movable disk.

FIG. 19A is a top perspective view of the fixed disk. FIG. 19B is a bottom perspective view of the fixed disk. FIG. 19C is a plan view of the fixed disk. FIG. 19D is a bottom view of the fixed disk.

FIG. 20A is a top perspective view of the base seal. FIG. 20B is a plan view of the base seal.

FIG. 21A is a top perspective view of the lower housing. FIG. 21B is a bottom perspective view of the lower housing. FIG. 21C is a plan view of the lower housing. FIG. 21D is a bottom view of the lower housing.

FIG. 22A is a plan view of the valve cartridge in assembled form. FIG. 22B is a cross-sectional view of the valve cartridge of FIG. 22A, along line A-A. FIG. 22C is a cross-sectional view of the valve cartridge of FIG. 22A, along line B-B.

DETAILED DESCRIPTION

Figure 1:
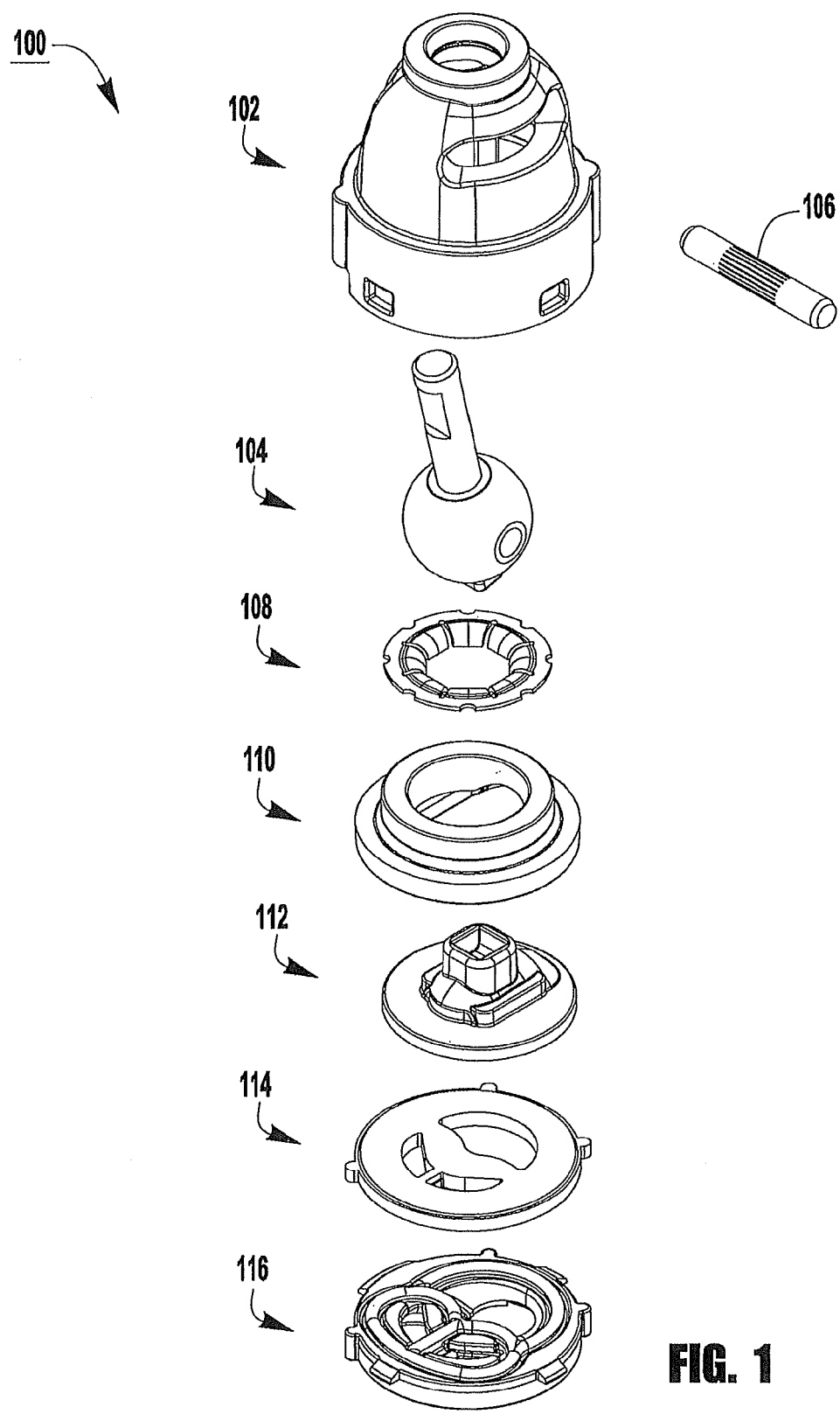
FIG. 1 is a perspective exploded view of a valve cartridge, according to an exemplary embodiment.
Figure 2A:
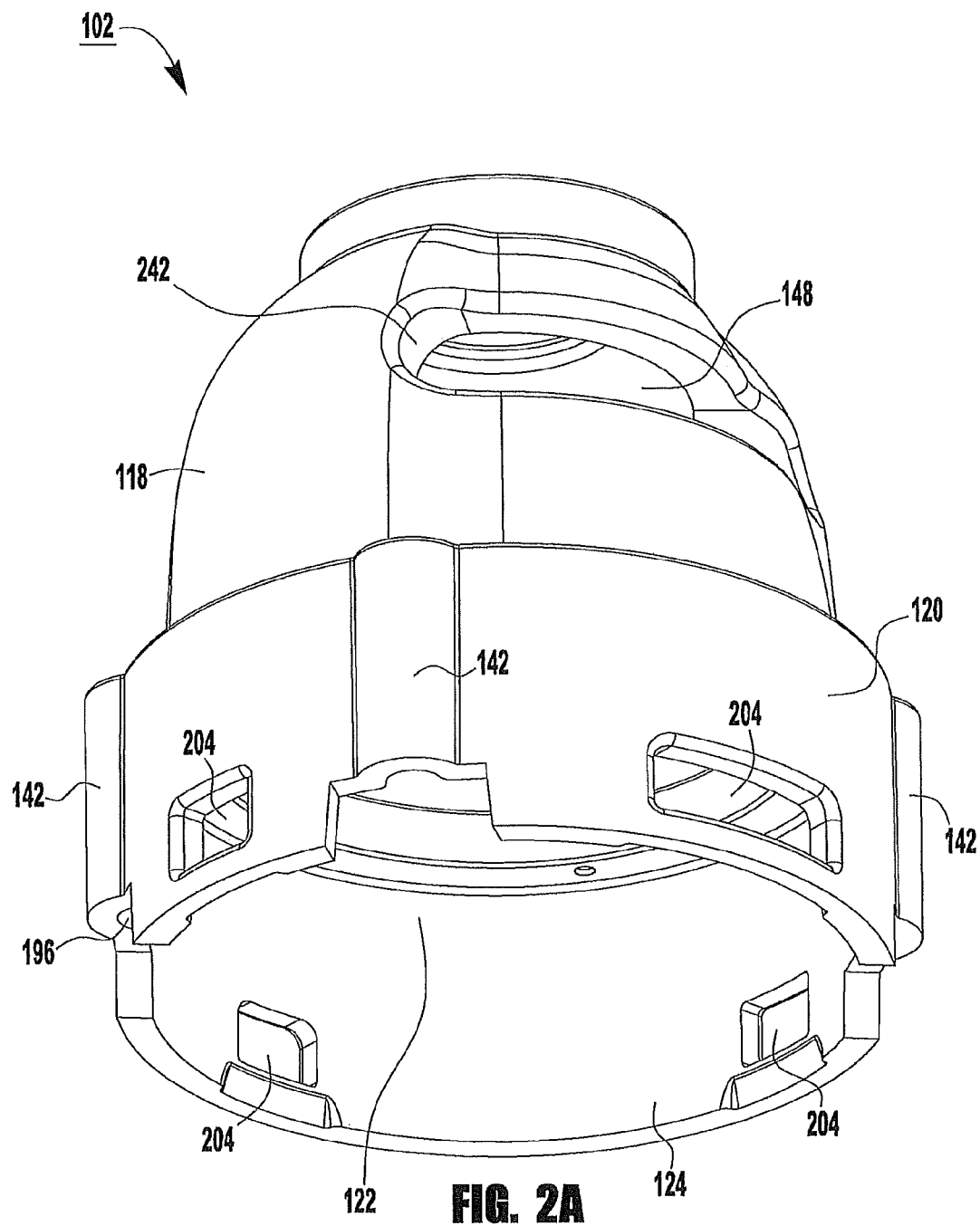
FIGS. 2A-2E show an exemplary housing used in the exemplary valve cartridge of FIG. 1.
Figure 2B:
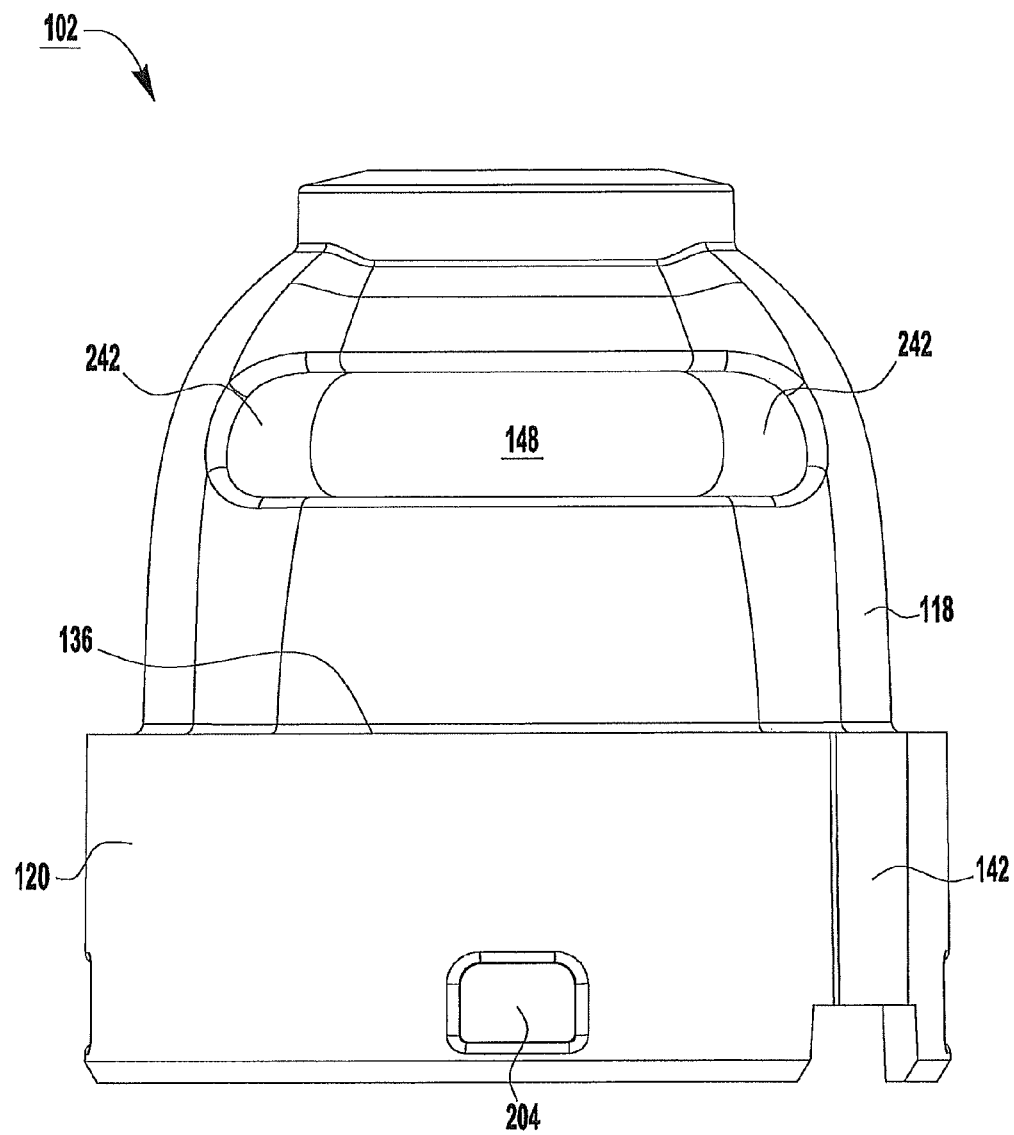
Figure 2C:
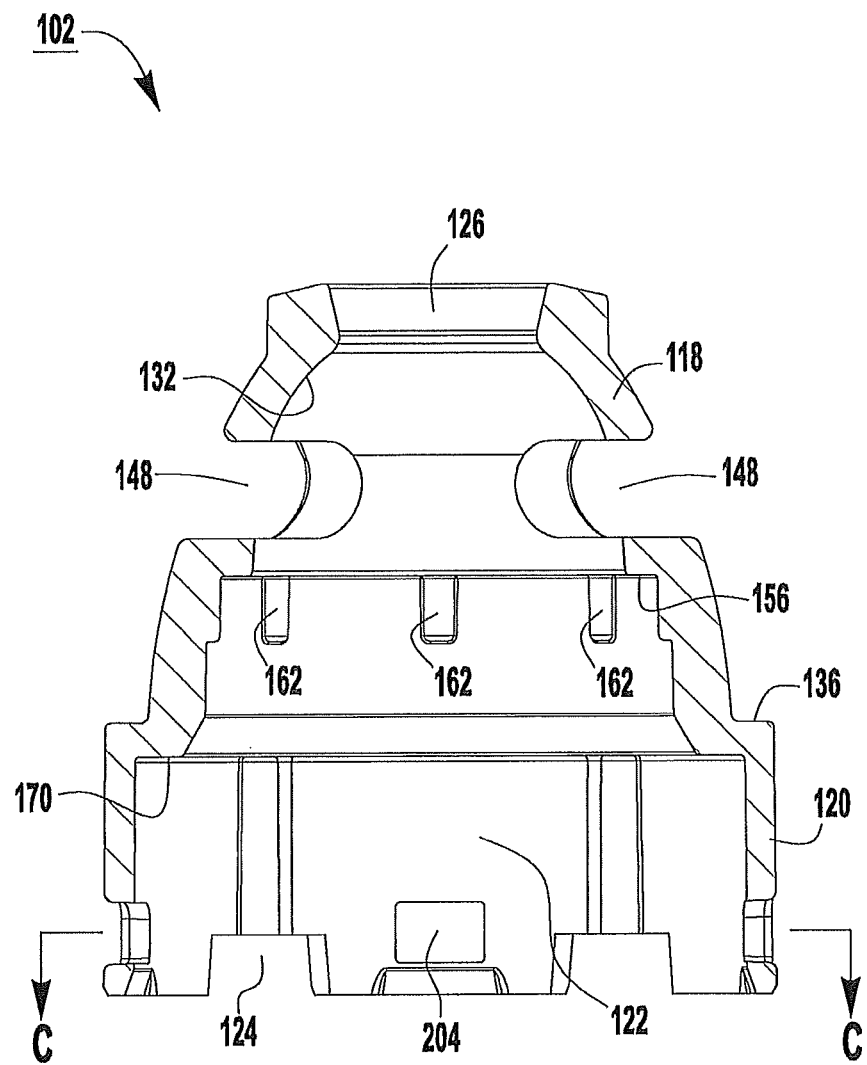
Figure 2D:
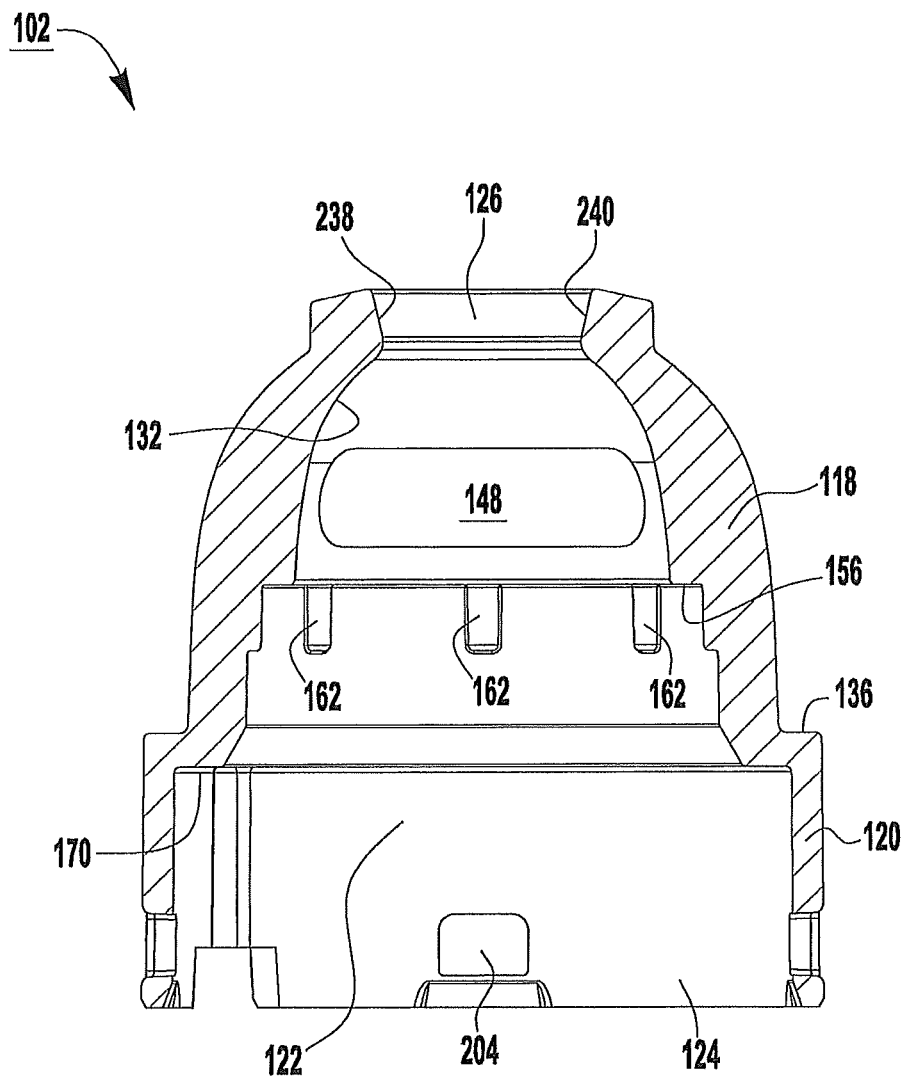
Figure 2E:
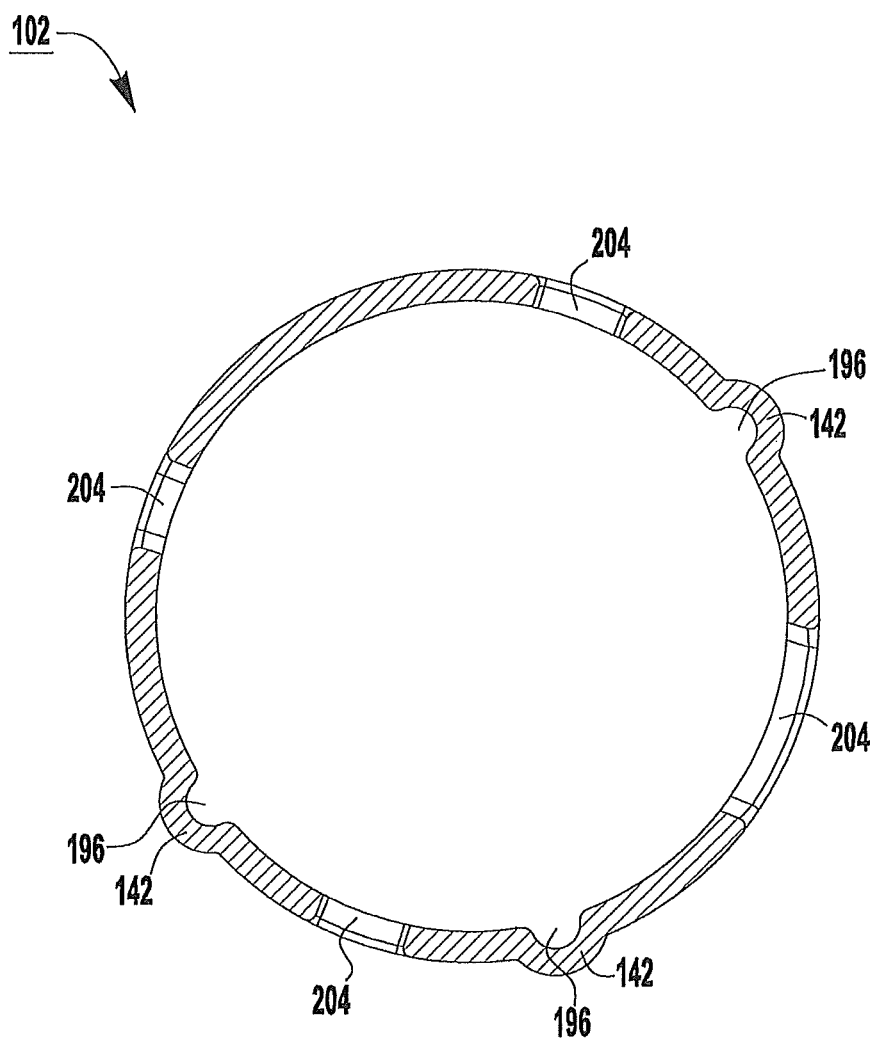

While the general inventive concept is susceptible of embodiment in many different forms, there are shown in the drawings and will be described herein in detail specific embodiments thereof with the understanding that the present disclosure is to be considered as an exemplification of the principles of the general inventive concept. Accordingly, the general inventive concept is not intended to be limited to the specific embodiments illustrated herein.

A one-handle valve cartridge 100, according to an exemplary embodiment, has one or more keys 142. The keys 142 have a lobular shape that makes forming corresponding keyways 144 in a valve body 140 easier and less expensive and makes installing and aligning the valve cartridge 100 in the valve body 140 easier and less prone to alignment errors. Furthermore, the lobular shape of the keys 142 allows the keyways 144 to be formed in the valve body 140 without increasing the size (e.g., width or height) of the valve body. Accordingly, the valve cartridge 100 can overcome various drawbacks of conventional valve cartridges having keys with a non-lobular shape.

As shown in FIGS. 1 and 10A-10C, the exemplary valve cartridge 100 has several discrete components including a housing 102, a ball-stem 104, a pin 106, a spring 108, a bushing 110, a flow plate 112, a manifold 114 and a base seal 116. The flow plate 112 and/or the manifold 114 can be made of a hard material. For example, the flow plate 112 and/or the manifold 114 can be made of stainless steel. The housing 102, for example, can be made of plastic or metal.

As shown in FIGS. 2A-2E, the housing 102 has a domed portion 118 and a cylindrical portion 120. A cavity 122 is formed in the housing 102 for receiving the remaining components of the valve cartridge 100. The cavity 122 extends inside the domed portion 118 and the cylindrical portion 120 of the housing 102. The cylindrical portion 120 of the housing 102 includes a lower opening 124 through which the components can be inserted into the housing 102. The domed portion 118 of the housing 102 includes an upper opening 126 through which a stem portion 128 of the ball-stem 104 extends. The cavity 122 in the housing 102 is wider near the lower opening 124 than near the upper opening 126.

A portion of the cavity 122 near the upper opening 126 of the housing 102 receives a ball portion 130 of the ball-stem 104. Accordingly, a first inner surface 132 of the portion of the cavity 122 near the upper opening 126 has a shape that substantially conforms to a shape of the ball portion 130 of the ball-stem 104 (see FIGS. 10B-10C and 11).

A portion of the cavity 122 near the lower opening 124 of the housing 102 receives the bushing 110, the flow plate 112, the manifold 114 and the base seal 116. A diameter of the cavity 122 near the lower opening 124 is substantially the same as a diameter of the base seal 116, the manifold 114 and a flat annular portion 134 of the bushing 110, such that only a small gap is present between these components and the housing 102 when the components are received in the housing 102.

A portion of the housing 102 where the domed portion 118 meets the cylindrical portion 120 forms an installation ledge 136 on an outer surface of the housing 102. A retention nut 138 engages the installation ledge 136 to secure the valve cartridge 100 in the valve body 140 (see FIG. 11).

Furthermore, the housing 102 has one or more keys 142 that each engage a complementary-shaped keyway 144 formed in an inner surface 146 of the valve body 140, as described below. In one exemplary embodiment, the valve cartridge 100 has three keys 142 (see FIG. 2E). The keys 142 have a lobular shape (see FIGS. 2A and 2E). Alternatively, at least a portion of each of the keys 142 has a lobular shape.

The keys 142 are formed integrally with the housing 102. In one exemplary embodiment, the keys 142 extend from near the lower opening 124 of the housing 102 to the installation ledge 136 of the housing 102. In one exemplary embodiment, the height of the keys 142 is between 0.486 and 0.494 inches. In another exemplary embodiment, the height of the keys 142 is approximately equal to 0.490 inches. In one exemplary embodiment, the height of the keyways 144 of the valve body 140 is between 0.780 and 0.790 inches. In another exemplary embodiment, the height of the keyways 144 is approximately equal to 0.785 inches. Thus, the contacting area of the keys 142 (with respect to the keyways 144) is substantially greater than with conventional keys.

The keys 142 can be evenly spaced around a circumference of the housing 102. Alternatively, the keys 142 can be unevenly spaced around the circumference of the housing 102. In one exemplary embodiment, the keys 142 are unevenly spaced around an outer surface of the cylindrical portion 120 of the housing 102.

The housing 102 also includes a pair of slots 148 formed on opposing sides of the housing 102 that interface with distal ends of the pin 106 to function as temperature-limit stops, as described below.

Figure 3:
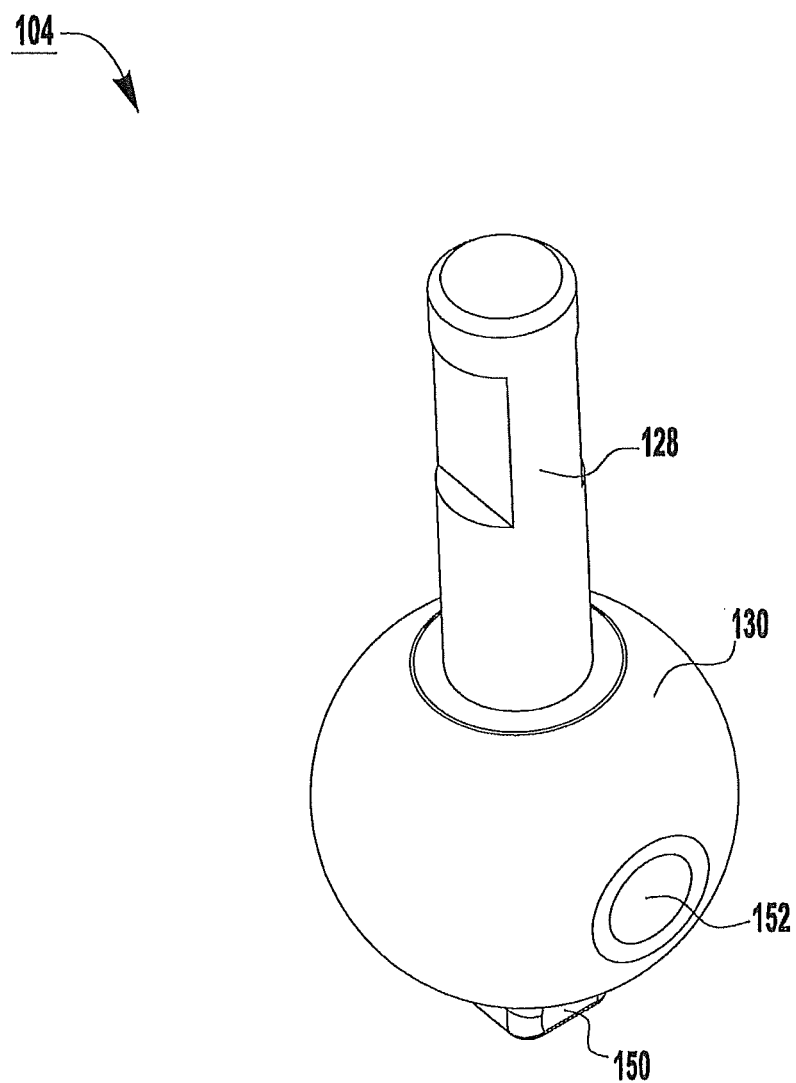
FIG. 3 is a perspective view of an exemplary ball-stem of the exemplary valve cartridge of FIG. 1.

As shown in FIG. 3, the ball-stem 104 is the actuating mechanism for the valve cartridge 100. The ball-stem 104 includes the ball portion 130 and the stem portion 128. The ball portion 130 and the stem portion 128 can be discrete components or can be formed integrally. The ball portion 130 includes a projection 150 extending from a side of the ball portion 130 that is opposite a side of the ball portion 130 from which the stem portion 128 extends. The projection 150 acts as a coupling device for connecting the ball-stem 104 to the flow plate 112, as described below. The ball portion 130 and the projection 150 can be discrete components or can be formed integrally.

A bore 152 is formed through a center of the ball portion 130 of the ball-stem 104. The bore 152 is orthogonal to the stem portion 128 of the ball-stem 104. After the ball-stem 104 is inserted into the cavity 122 of the housing 102, the pin 106 can be inserted through one of the slots 148 in the housing 102 and into the bore 152 of the ball-stem 104. In this manner, the pin 106 retains the ball-stem 104 in the housing 102.

Figure 4A:
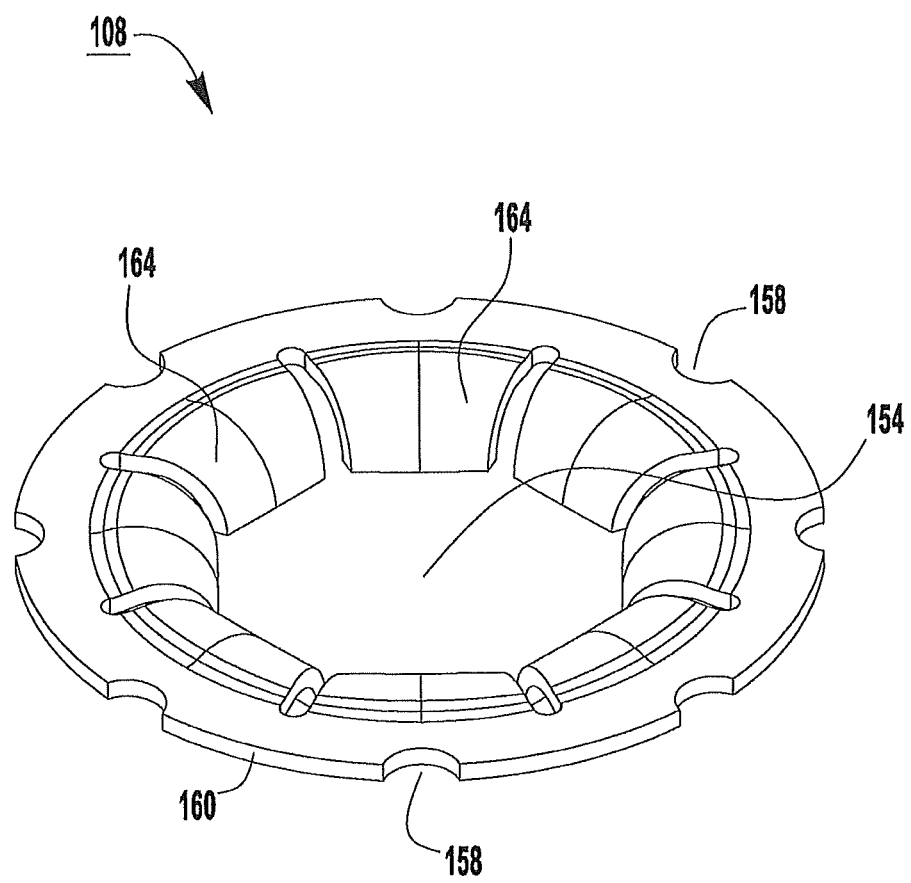
FIGS. 4A-4C show an exemplary spring used in the exemplary valve cartridge of FIG. 1.
Figure 4B:
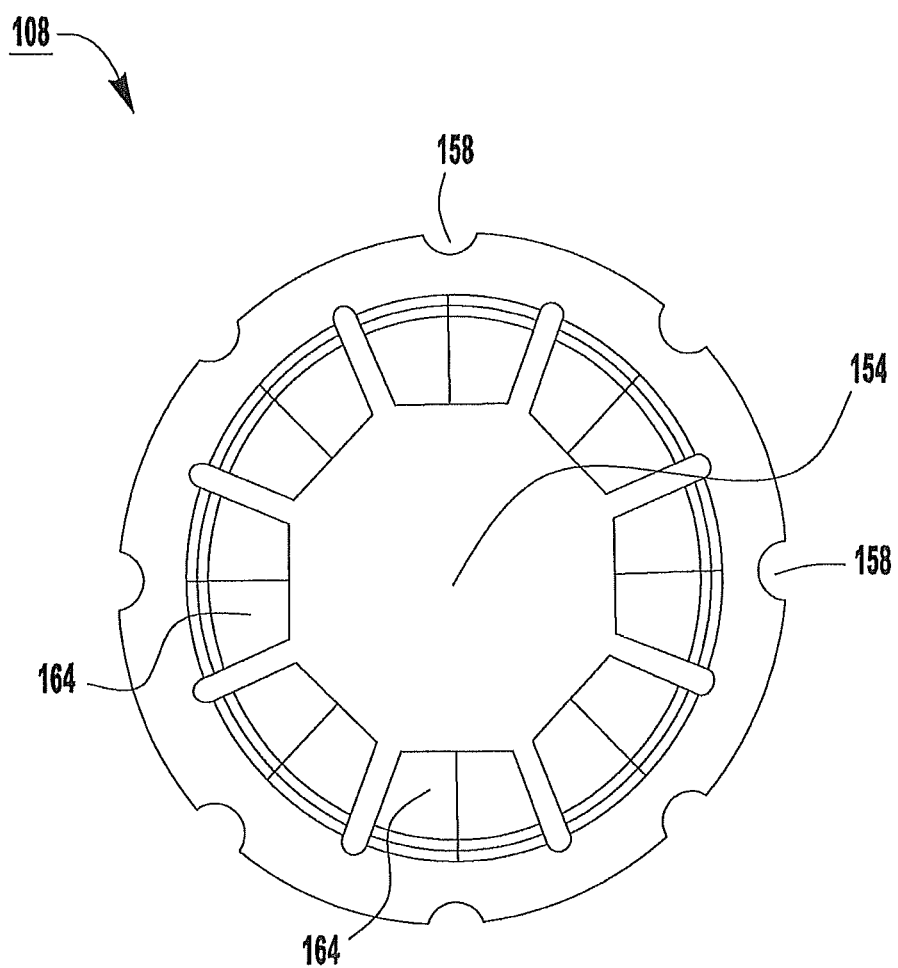
Figure 4C:
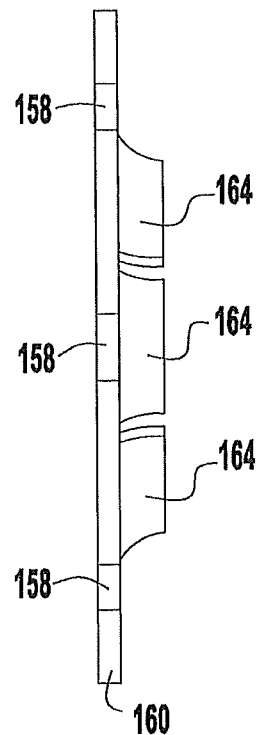
Figure 5A:
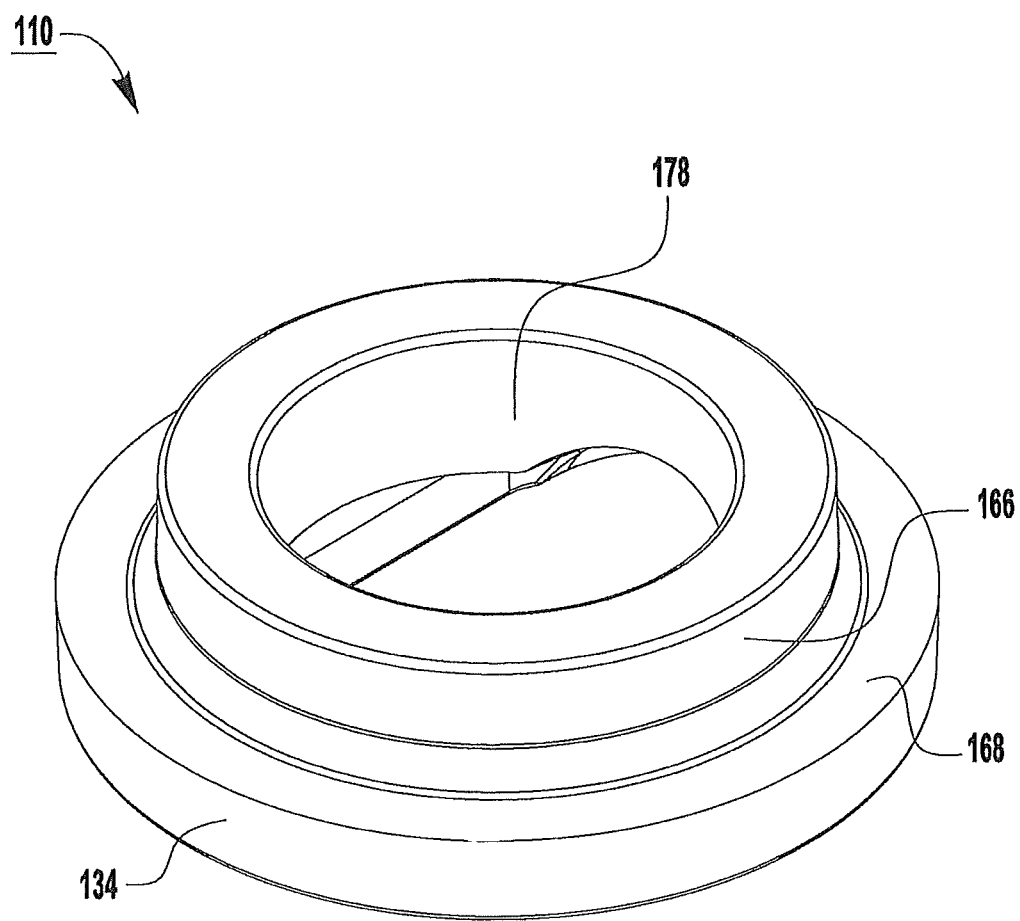
FIGS. 5A-5D show an exemplary bushing used in the exemplary valve cartridge of FIG. 1.
Figure 5B:
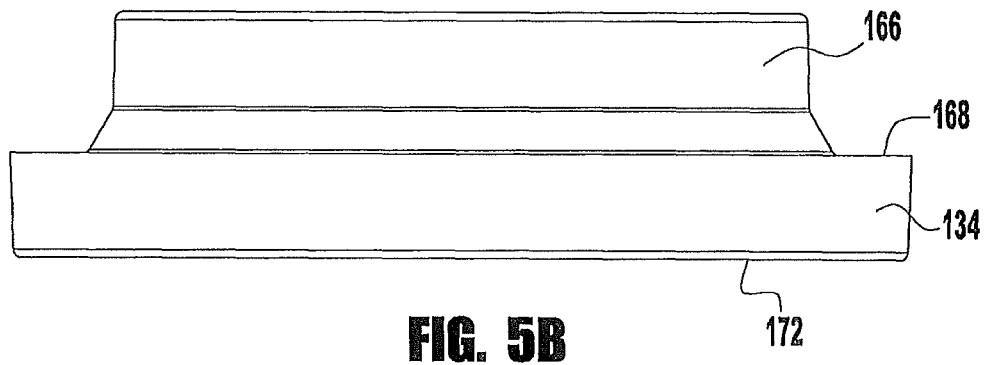
Figure 5C:
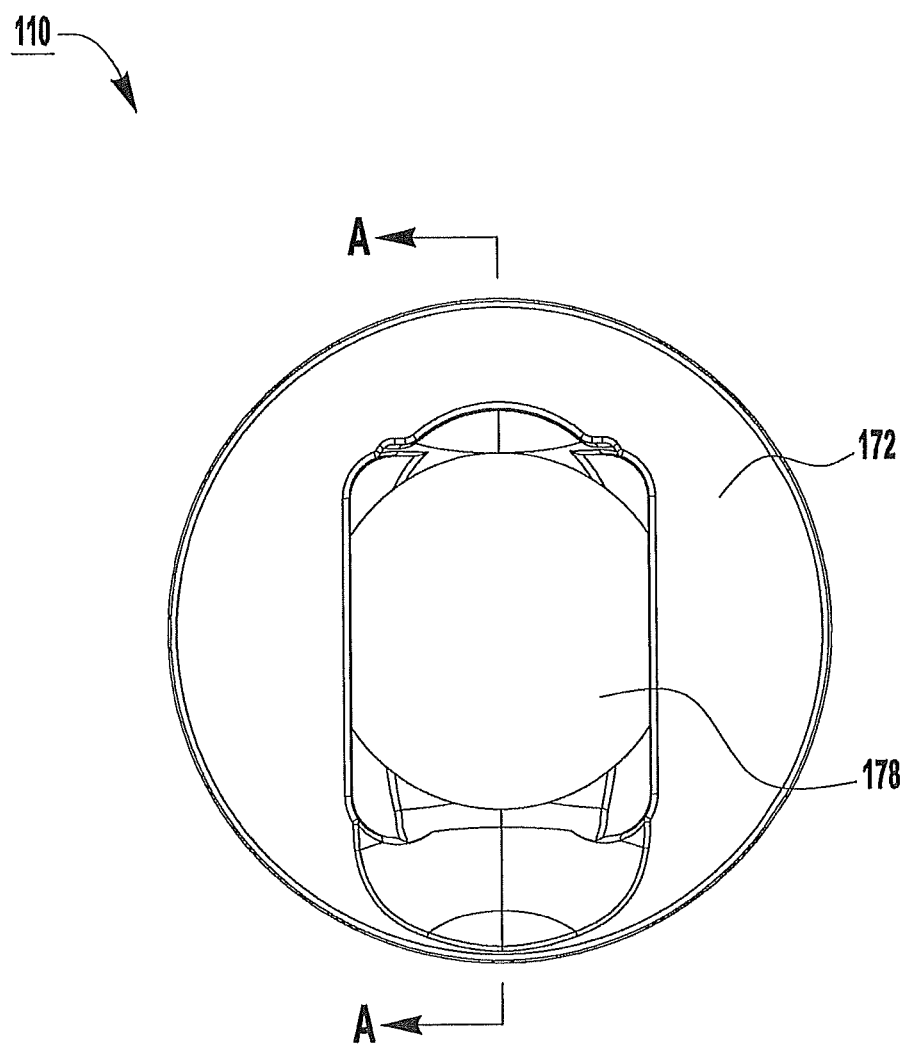
Figure 5D:
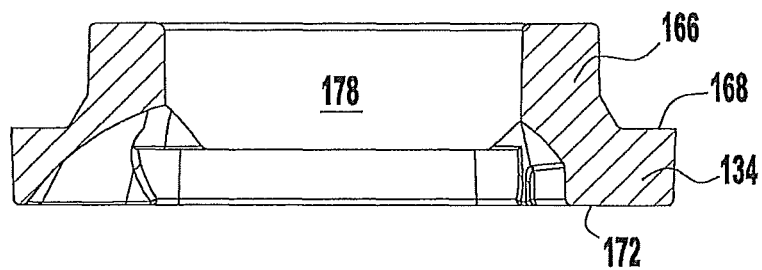
Figure 6A:
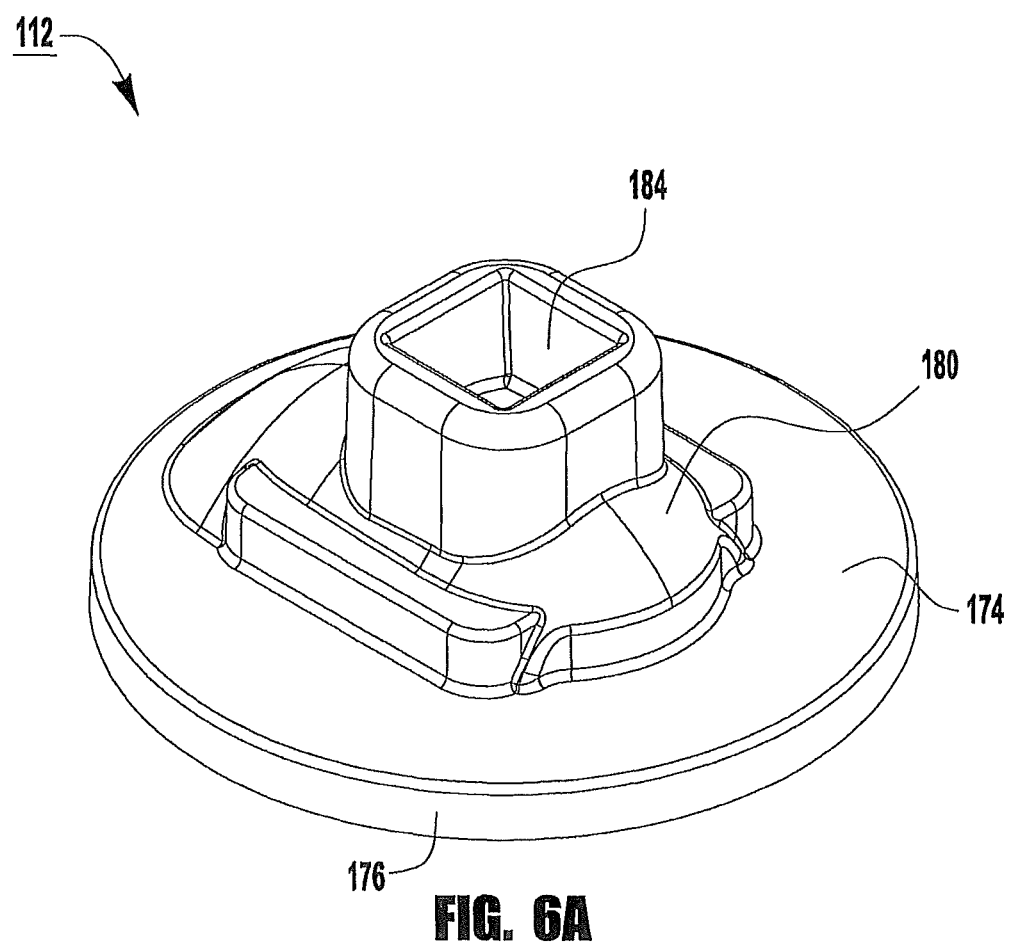
FIGS. 6A-6D show an exemplary flow plate used in the exemplary valve cartridge of FIG. 1.
Figure 6B:
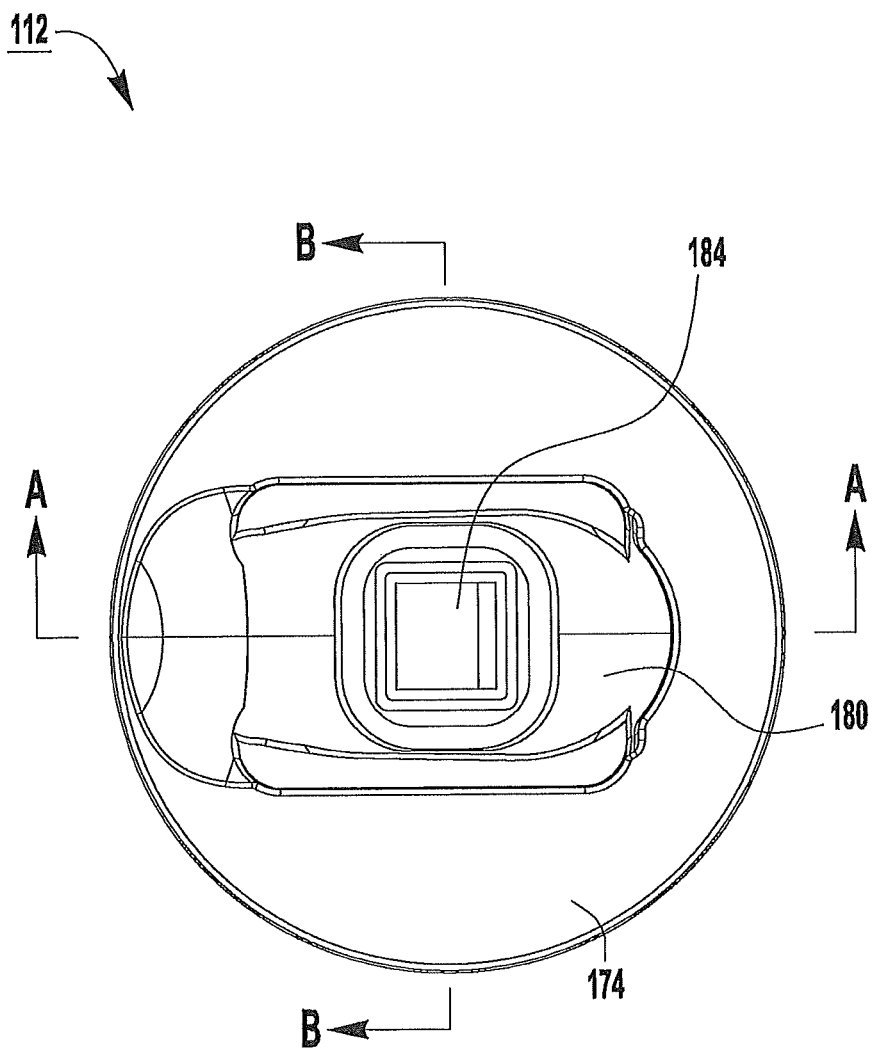
Figure 6C:
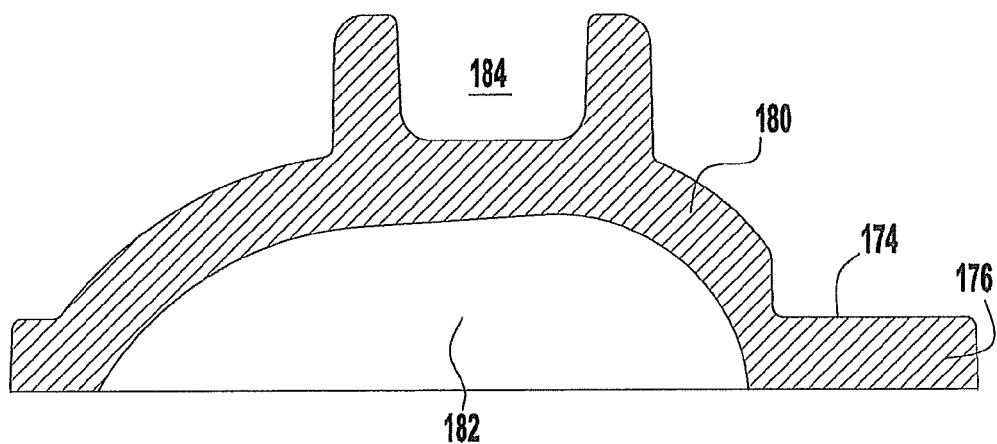
Figure 6D:
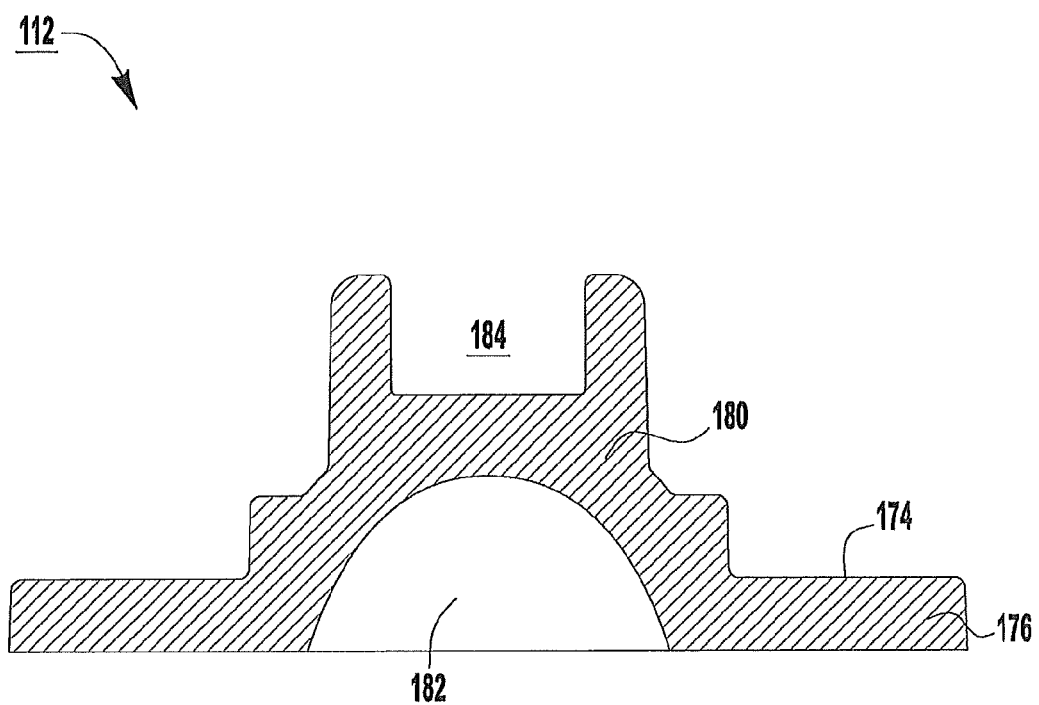

As shown in FIGS. 4A-4C, the spring 108 has an annular shape with a central opening 154. The spring 108 is disposed below the ball portion 130 of the ball-stem 104 in the housing 102 (see FIGS. 10B-10C). The spring 108 is connected to a second inner surface 156 of the housing 102 (e.g., by or through threading, friction fitting, snap fitting, welding), such that the spring 108 also retains the ball-stem 104 in the housing 102. The spring 108 has a plurality of notches 158 formed on an outer periphery 160 of the spring 108. The notches 158 engage corresponding tabs 162 formed on the second inner surface 156 of the housing 102 (see FIG. 2C), thereby securing the spring 108 within the housing 102 below the ball-stem 104.

The projection 150 of the ball-stem 104 extends through the central opening 154 in the spring 108. Some of the ball portion 130 of the ball-stem 104 can also extend through the central opening 154 in the spring 108. The spring includes a plurality of elastic flanges 164 surrounding the central opening 154. The elastic flanges 164 of the spring 108 contact the ball portion 130 of the ball-stem 104 and urge the ball portion 130 of the ball-stem 104 against the complementary-shaped first inner surface 132 of the housing 102.

As shown in FIGS. 5A-5D, the bushing 110 includes the flat annular portion 134 and a raised annular portion 166. A diameter of the flat annular portion 134 is greater than a diameter of the raised annular portion 166. The bushing 110 is disposed below and can be spaced apart from the spring 108 in the cavity 122 of the housing 102 (see FIGS. 10B-10C). An upper surface 168 of the flat annular portion 134 of the bushing 110 contacts a third inner surface 170 of the housing 102, which is located below the installation ledge 136 (see FIGS. 2C-2D and 10B-10C). A lower surface 172 of the flat annular portion 134 of the bushing 110 rests on an upper surface 174 of a flat portion 176 of the flow plate 112. Additionally, the raised annular portion 166 of the bushing 110 extends into a portion of the cavity 122 of the housing 102 immediately above the installation ledge 136. The raised annular portion 166 of the bushing 110 is sized to fit closely in that portion of the cavity 122 of the housing 102 receiving the raised annular portion 166 of the bushing 110. Accordingly, the bushing 110 provides a support surface between the housing 102 and the flow plate 112.

The bushing 110 has an opening 178 that extends through the flat annular portion 134 and the raised annular portion 166 of the bushing 110. A raised portion 180 of the flow plate 112 extends into the opening 178 of the bushing 110. The raised portion 180 of the flow plate 112 forms a mixing chamber 182. A portion of the opening 178 of the bushing 110 has an inner surface shaped to conform to a shape of the raised portion 180 of the flow plate 112 (see FIGS. 5C-5D). Additionally, a coupling recess 184 is formed on the raised portion 180 of the flow plate 112 (see FIGS. 6A-6D). After the flow plate 112 is installed in the valve cartridge 100, the coupling recess 184 is positioned within the opening 178 of the bushing 110 and surrounded by the raised annular portion 166 of the bushing 110 (see FIGS. 10B-10C).

The coupling recess 184 of the flow plate 112 receives the projection 150 of the ball-stem 104, thereby connecting the actuating mechanism (i.e., the ball-stem 104) and the flow plate 112. The projection 150 of the ball-stem 104 can have four sides that contact four corresponding sides of the coupling recess 184. It will be appreciated that notwithstanding the exemplary embodiments described herein, the ball-stem 104 can be connected to the flow plate 112 in any suitable manner that allows the ball-stem 104 to impart translational and angular movement to the flow plate 112.

As shown in FIGS. 6A-6D, the flow plate 112 is a valve member formed as a plate, disk or the like that is movable relative to the housing 102. The flow plate 112 includes the flat portion 176 and the raised portion 180. The flat portion 176 of the flow plate 112 forms a sealing surface that can cover and uncover water inlet apertures 186 and 188 in the manifold 114 to allow only cold water, only hot water or both cold and hot water to flow through the manifold 114. The water flowing through the water inlet apertures 186 and 188 in the manifold 114 enters the mixing chamber 182 (i.e., a cavity formed under the raised portion 180 of the flow plate 112) where the cold and hot water mixes prior to being discharged through a water outlet aperture 190 in the manifold 114. Furthermore, as noted above, the flow plate 112 also includes the coupling recess 184, which is formed on the raised portion 180 of the flow plate 112.

Figure 7:
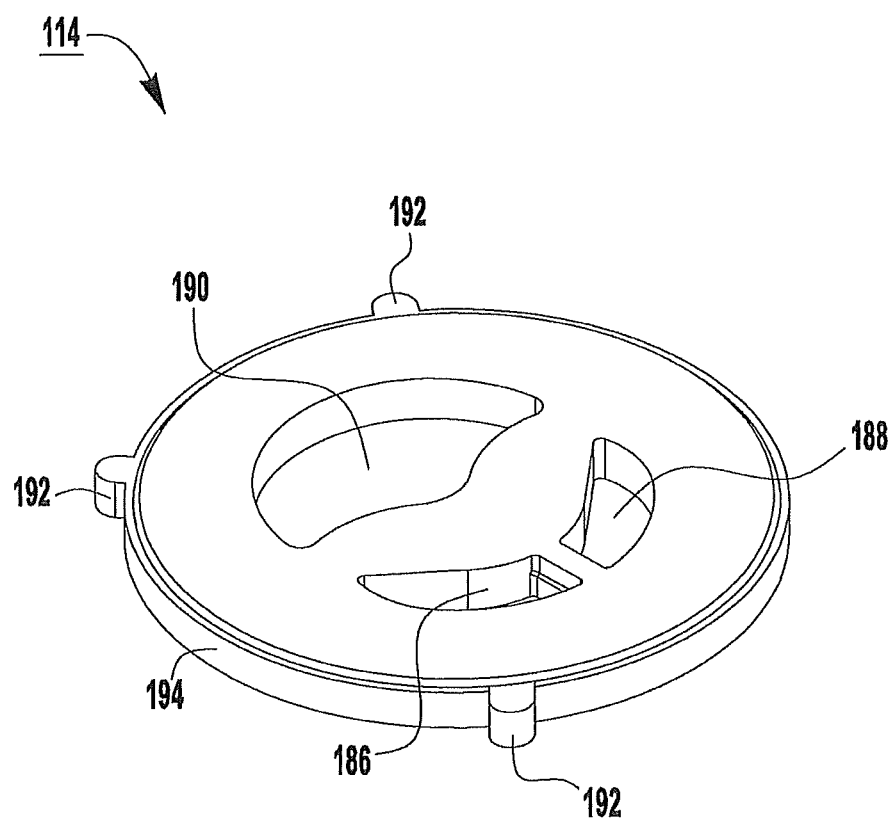
FIG. 7 is a perspective view of an exemplary manifold of the exemplary valve cartridge of FIG. 1.

As shown in FIG. 7, the manifold 114 is a valve member formed as a plate, disk or the like that is fixed relative to the housing 102. The manifold 114 includes one or more projections 192 formed on a periphery 194 of the manifold 114, wherein each of the projections 192 fits inside an internal cavity 196 of one of the keys 142 of the housing 102 (see FIGS. 2A and 2E). The projections 192 fix the manifold 114 relative to the housing 102, thereby preventing rotation of the manifold 114 within the housing 102.

The manifold 114 includes the water inlet apertures 186 and 188, which correspond to a cold water inlet aperture and a hot water inlet aperture, respectively. The manifold 114 also includes the water outlet aperture 190 through which cold water flowing through the cold water inlet aperture 186, hot water flowing through the hot water inlet aperture 188 or a mixture of the cold and hot water can flow to a water outlet passage (not shown) of the valve body 140.

Figure 8A:
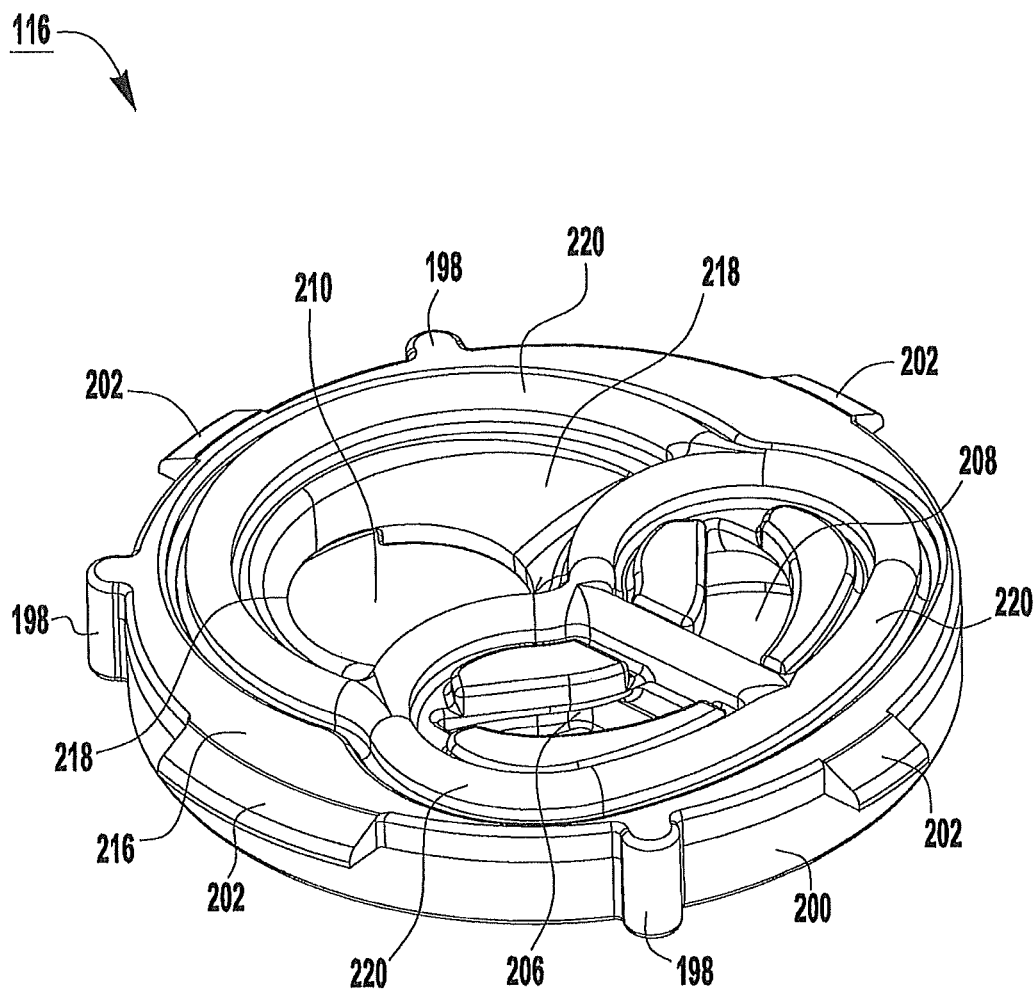
FIGS. 8A-8B show an exemplary base seal used in the exemplary valve cartridge of FIG. 1.
Figure 8B:
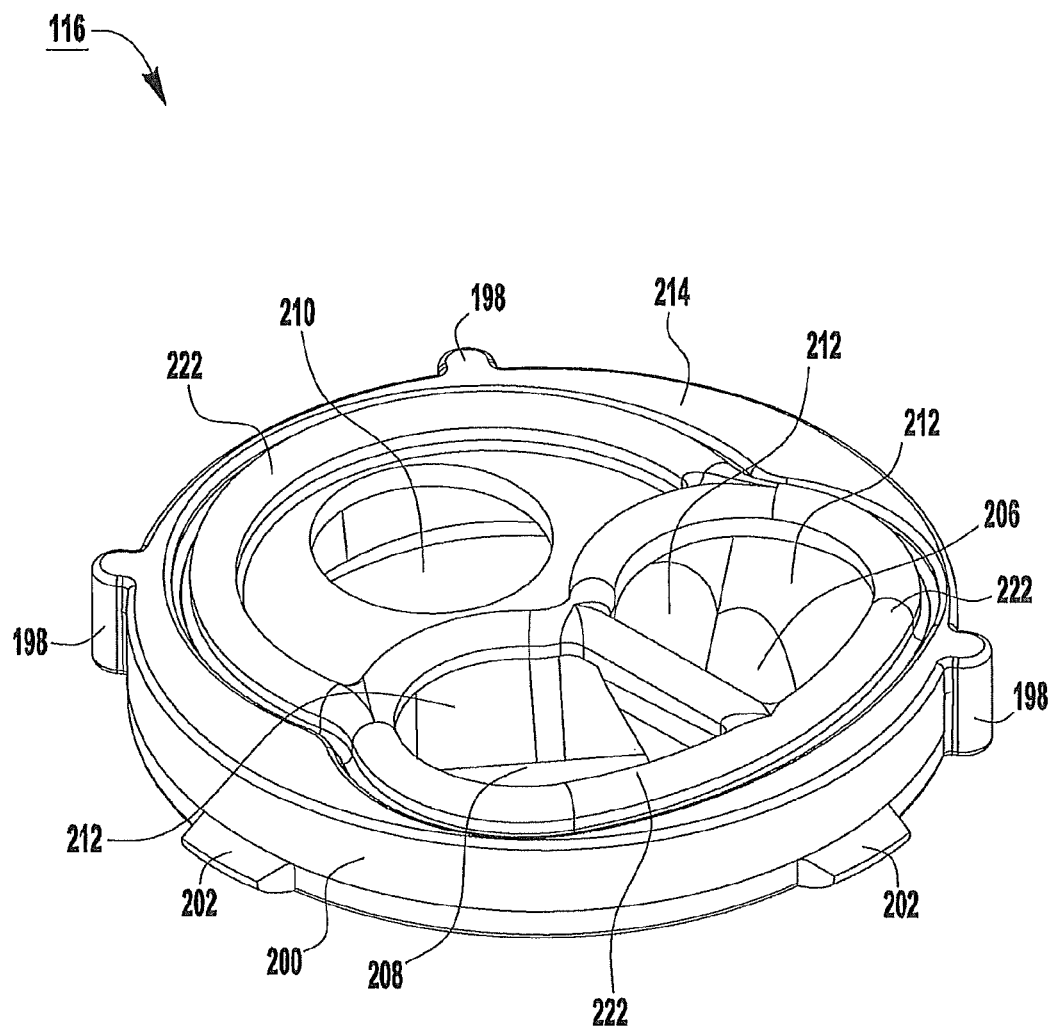

As shown in FIGS. 8A-8B, the base seal 116 is a sealing member formed of an elastic material (e.g., rubber). The base seal 116 includes one or more projections 198 formed on a periphery 200 of the base seal 116, wherein each of the projections 198 fits inside the internal cavity 196 of one of the keys 142 of the housing 102. The projections 198 fix the base seal 116 relative to the housing 102, thereby preventing rotation of the base seal 116 within the housing 102. The base seal 116 also includes one or more tabs 202 formed on the periphery 200 of the base seal 116, wherein the one or more tabs 202 are deformable to fit in and extend through a corresponding one or more openings 204 formed in the housing 102 to secure the base seal 116 in the housing 102. The one or more tabs 202 can have different sizes.

Like the manifold 114, the base seal 116 has a cold water inlet aperture 206, a hot water inlet aperture 208 and a water outlet aperture 210. The cold water inlet aperture 206 and the hot water inlet aperture 208 of the base seal 116 each have walls 212 that slope from near a lower surface 214 of the base seal 116 to near an upper surface 216 of the base seal 116 to improve the flow of water through the base seal 116 and into the valve cartridge 100. The water outlet aperture 210 of the base seal 116 has walls 218 that slope from near the upper surface 216 of the base seal 116 to near the lower surface 214 of the base seal 116 to improve the flow of water through the base seal 116 and out of the valve cartridge 100. It is important that the apertures 186, 188 and 190 in the manifold 114 are aligned with the apertures 206, 208 and 210 in the base seal 116 when the valve cartridge 100 is assembled. Accordingly, the projections 192 on the manifold 114 and the projections 198 on the base seal 116 insure that the manifold 114 and the base seal 116 fit into the housing 102 in only one orientation, wherein the apertures 186, 188 and 190 in the manifold 114 are aligned with the apertures 206, 208 and 210 in the base seal 116 in this orientation.

A ridge 220 surrounds the apertures 206, 208 and 210 in the base seal 116 on the upper surface 216 of the base seal 116 (see FIG. 8A). Similarly, a ridge 222 surrounds the apertures 206, 208 and 210 in the base seal 116 on the lower surface 214 of the base seal 116 (see FIG. 8B). The ridges 220 and 222 of the base seal 116 are compressed when the valve cartridge 100 is installed in the valve body 140 (see FIGS. 10B-10C and 11 which show the ridges 220 and 222 overlapped with the compressing structure for purposes of illustration only). In particular, as the retention nut 138 is tightened down on the installation ledge 136 of the housing 102, the ridge 220 is compressed between the manifold 114 of the valve cartridge 100 and the base seal 116, while the ridge 222 is compressed between the base seal 116 and a seating surface 224 of the valve body 140 (see FIG. 11). It should be noted that although the projections 192 of the manifold 114 prevent the manifold 114 from rotating within the housing 102, the projections 192 nonetheless allow the manifold 114 to move axially within the housing 102. In this manner, the compression of the ridges 220 and 222 of the base seal 116 exerts a loading force on the flow plate 112 and the manifold 114. Accordingly, the flow plate 112 and the manifold 114 are kept in water-tight engagement with one another, after installation of the valve cartridge 100.

Figure 11:
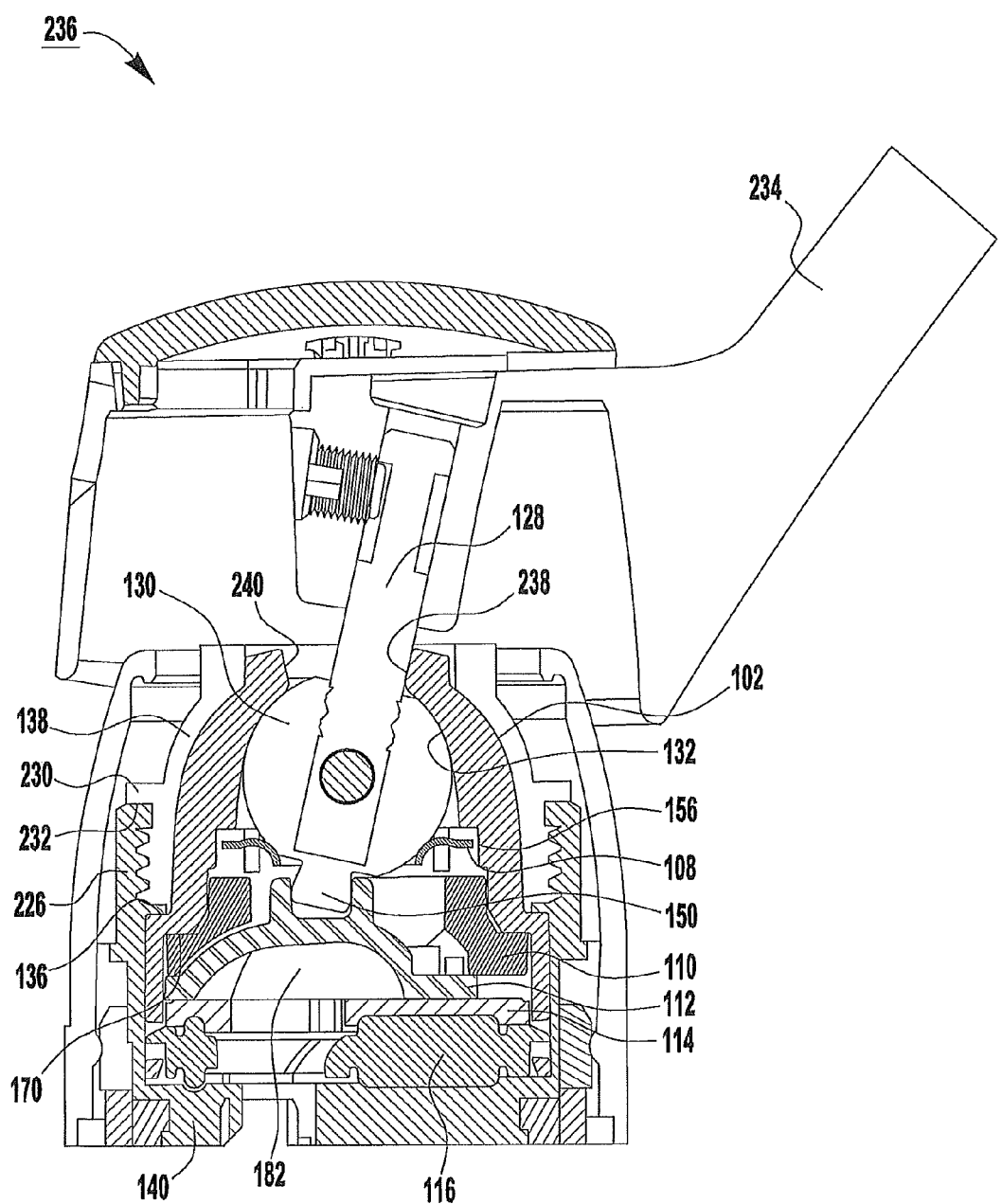
FIG. 11 is a mirror image of a cross-sectional view (along line B-B in FIG. 10A) of the exemplary valve cartridge of FIG. 1 after installation in a plumbing fixture.

The retention nut 138 is a hollow nut that engages sidewalls 226 of the valve body 140 to secure the valve cartridge 100 in the valve body 140 (see FIG. 11). For example, the retention nut 138 can have external threads for engaging complementary threads on the sidewalls 226. An inner surface of the retention nut 138 is shaped to conform substantially to a shape of the domed portion 118 of the housing 102. The installation ledge 136, however, is the only portion of the housing 102 that the retention nut 138 contacts when the valve cartridge 100 is installed in the valve body 140.

Additionally, the retention nut 138 and/or the valve body 140 can have structural features that prevent an excessive amount of torque from being transferred to the valve cartridge 100. For example, the retention nut 138 includes an annular flange 230 that bottoms out on a surface 232 of the valve body 140 to prevent excessive tightening of the retention nut 138 (see FIG. 11). Accordingly, the annular flange 230 functions to limit the maximum amount of torque that can be transferred from the retention nut 138 to the valve cartridge 100.

The position and the orientation of the flow plate 112 relative to the manifold 114 are controlled by the stem portion 128 of the ball-stem 104 projecting out of the housing 102 through the upper opening 126. For example, pivoting the stem portion 128 of the ball-stem 104 about the pin 106 changes the position of the flow plate 112 relative to the manifold 114, which changes the flow rate of the water. Rotating the stem portion 128 of the ball-stem 104 changes the orientation of the flow plate 112 relative to the manifold 114, which changes the temperature of the water.

An operating member 234 such as a handle, knob or the like (see FIG. 11) can be connected to the stem portion 124 of the ball-stem 104 to facilitate manipulation of the stem portion 128 by the user. Accordingly, after the valve cartridge 100 is installed in the valve body 140, the user can manipulate the operating member 234 which moves the stem portion 128 of the ball-stem 104 to change the position and/or orientation of the flow plate 112 relative to the manifold 114, thereby controlling the flow rate and temperature of the water flowing through the valve cartridge 100 and out a plumbing fixture 236, such as through a spout (not shown) of the plumbing fixture 236 (see FIG. 11).

Pivoting of the stem portion 128 of the ball-stem 104 about the pin 106 can be limited by the stem portion 128 contacting opposing surfaces of the upper opening 126 of the housing 102. Thus, the stem portion 124 of the ball-stem 104 contacts a first surface 238 of the upper opening 126 of the housing 102 when the valve cartridge 100 is in a fully closed position corresponding to a flow rate of zero (see FIG. 10C). The stem portion 128 of the ball-stem 104 contacts a second surface 240 of the upper opening 126 of the housing 102 when the valve cartridge 100 is in a fully open position corresponding to a maximum flow rate.

Rotation of the stem portion 128 of the ball-stem 104 can be limited by the distal ends of the pin 106 contacting end portions 242 of the slots 148 (see FIGS. 1, 2A-2B and 9A). Accordingly, the length of the slots 148, which function as temperature limit stops, define the range of temperatures for which the valve cartridge 100 can deliver the water.

Figure 9A:
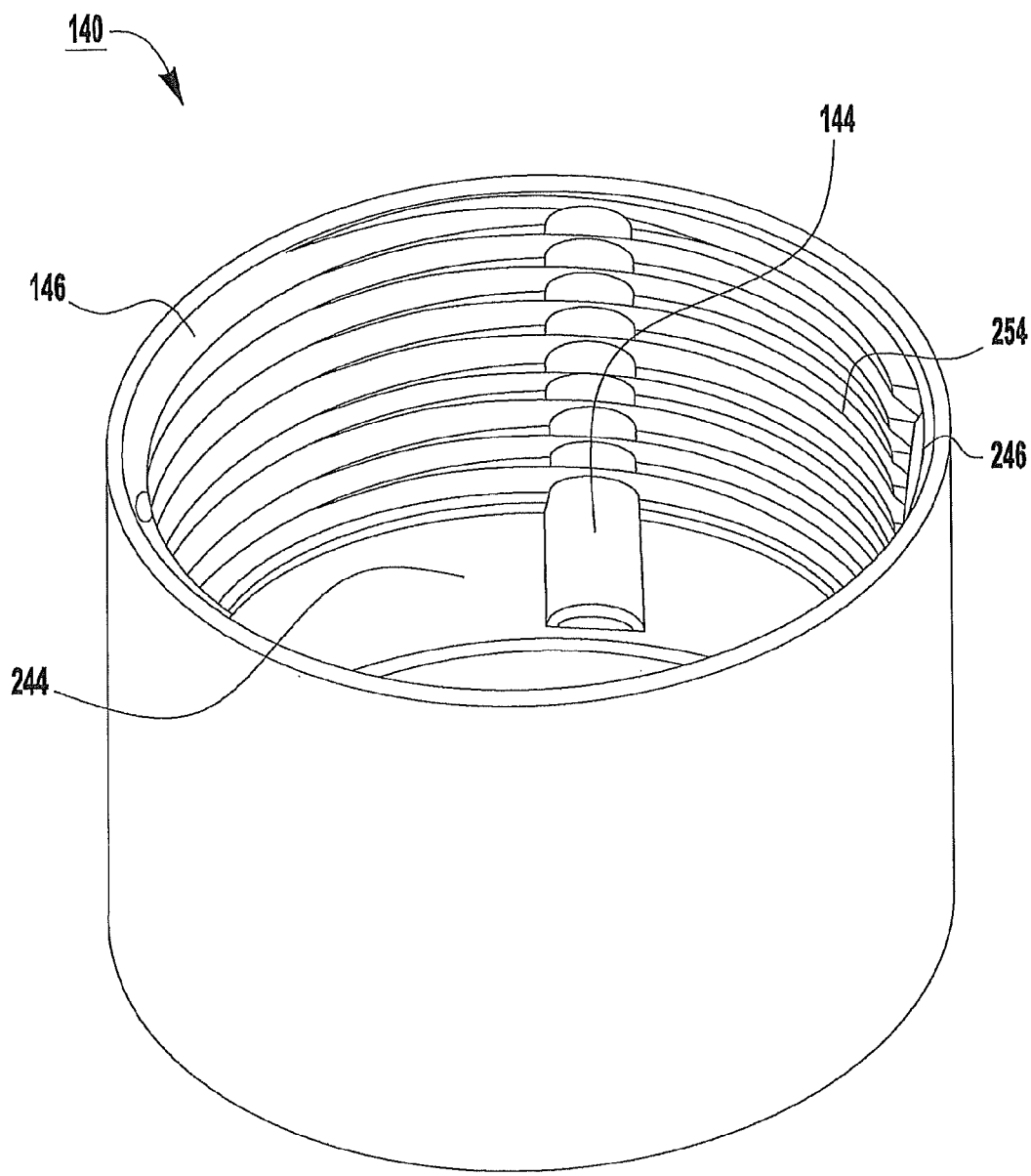
FIGS. 9A-9B show an exemplary valve body in which the exemplary valve cartridge of FIG. 1 can be installed.
Figure 9B:
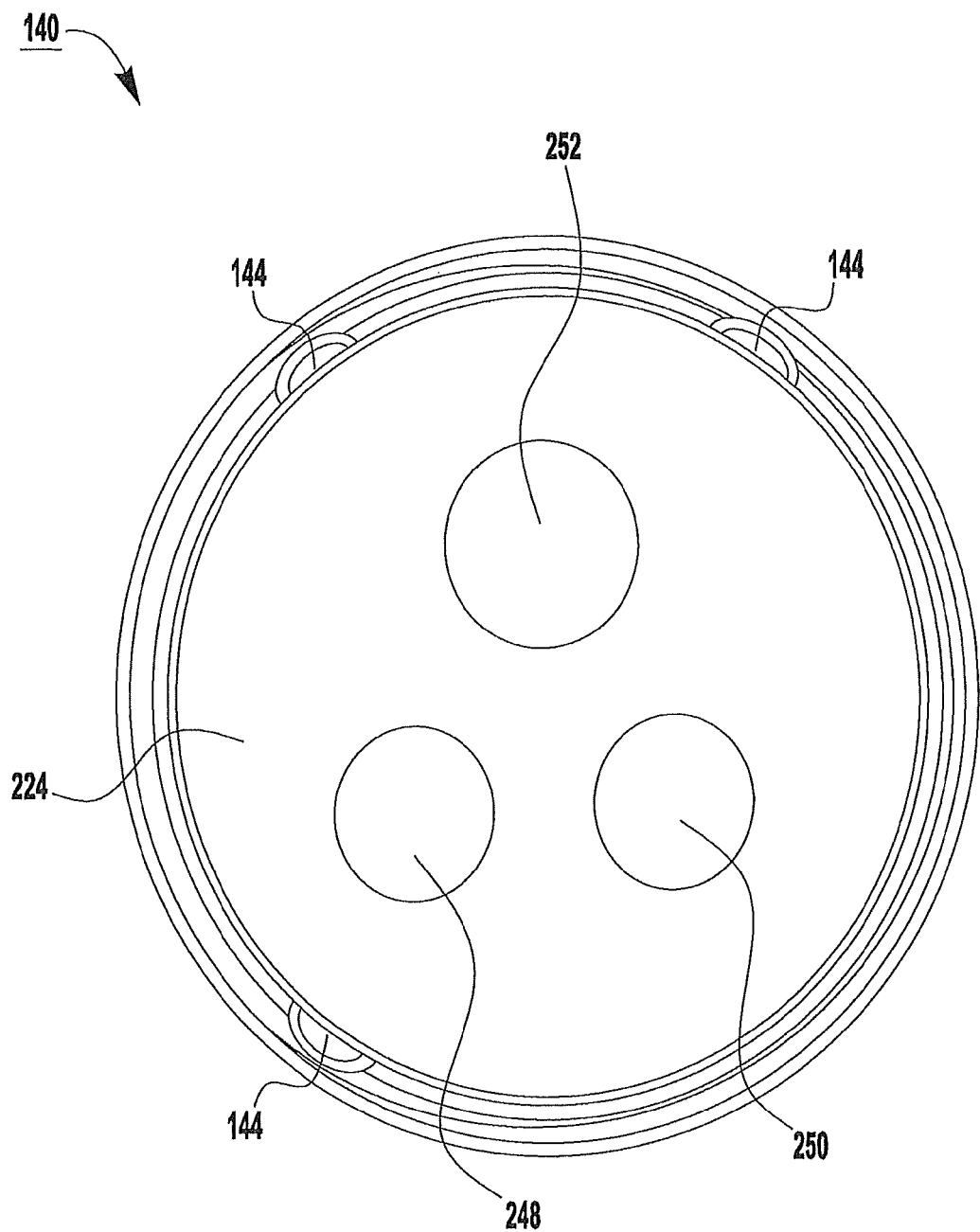
Figure 10A:
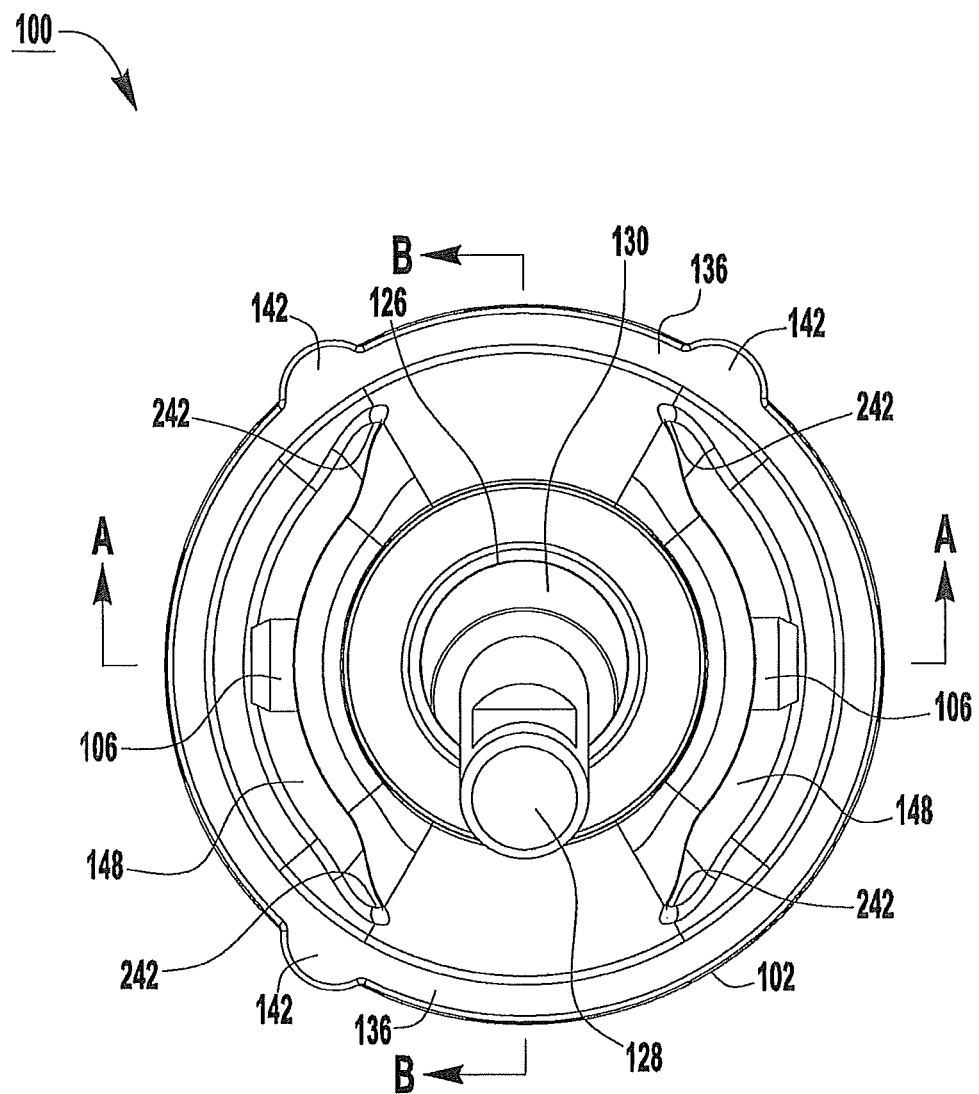
FIGS. 10A-10C show the exemplary valve cartridge of FIG. 1 in assembled form.
Figure 10B:
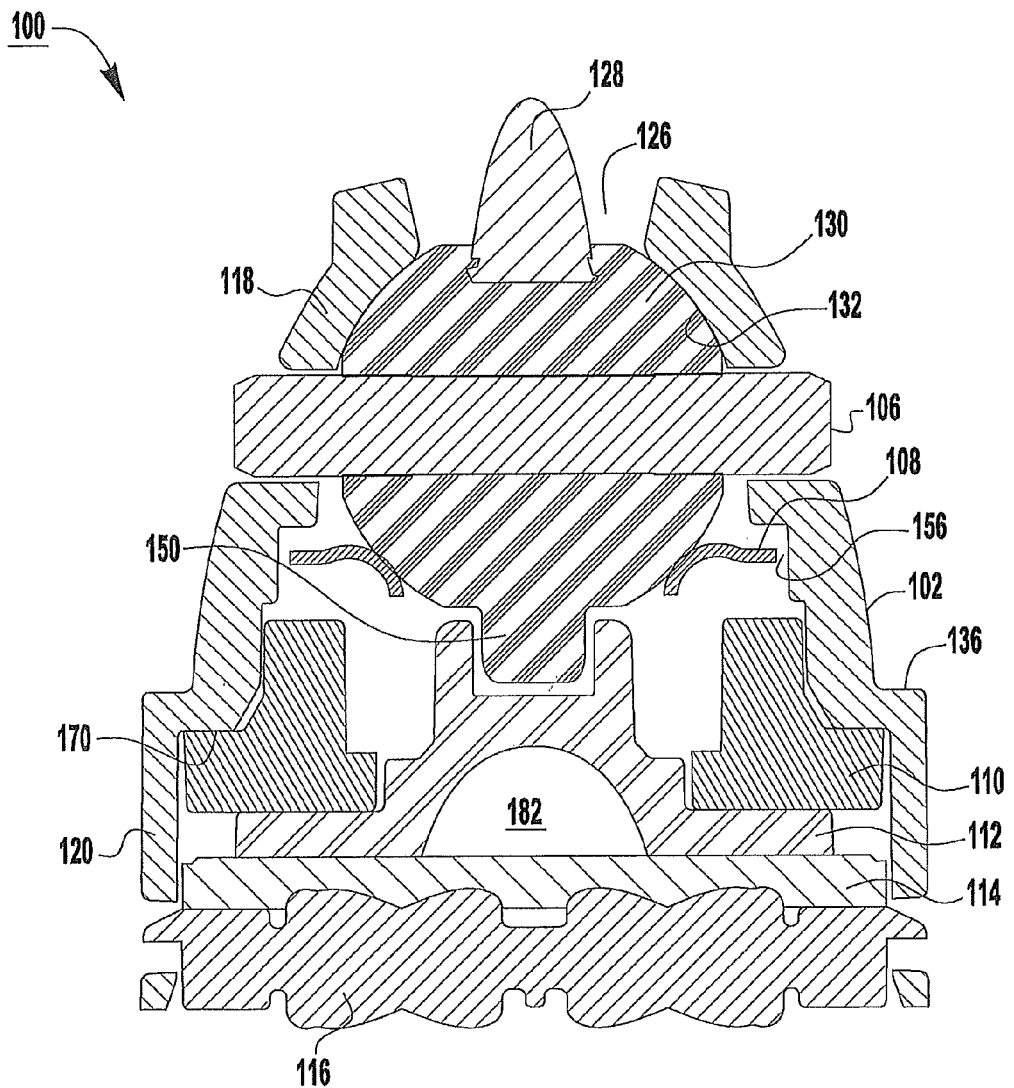
Figure 10C:
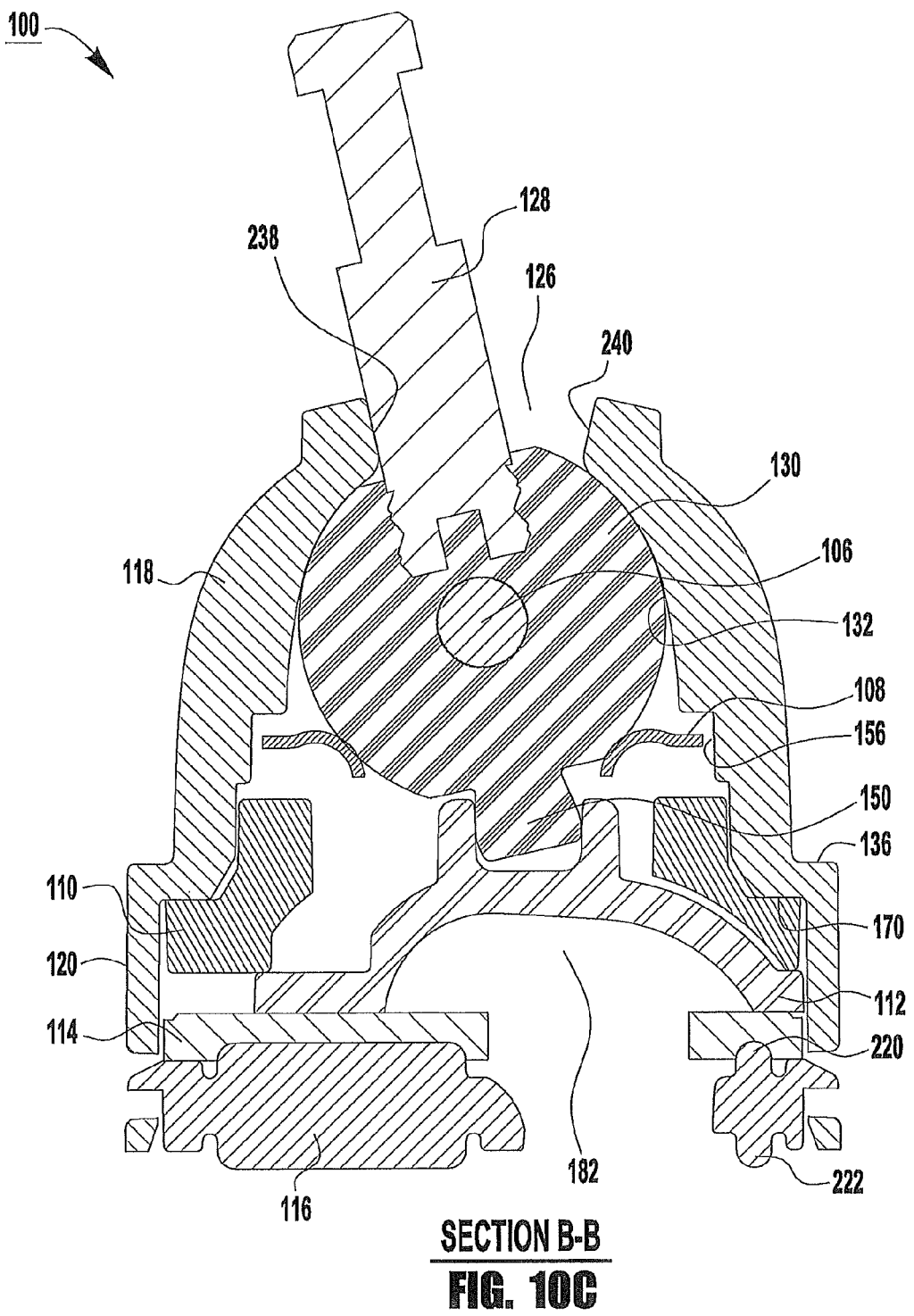

As shown in FIGS. 9A-9B, the valve body 140 includes a cavity 244 extending from an upper opening 246 of the valve body 140 to a bottom surface (forming the seating surface 224) of the valve body 140. In this manner, the valve cartridge 100 is inserted into the valve body 140 through the upper opening 246 and into the cavity 244 during installation of the valve cartridge 100 into the valve body 140. Thereafter, the ridge 222 of the base seal 116 rests on the seating surface 224 of the valve body 140. The seating surface 224 of the valve body 140 includes a cold water inlet 248 and a hot water inlet 250, which carry cold and hot water from a water source to the valve body 140, and a water outlet 252, which carries cold, hot or warm water from the valve body 140 to the plumbing fixture 236.

After the valve cartridge 100 is inserted in the cavity 244 of the valve body 140, the retention nut 138 is tightened down on the installation ledge 136 of the housing 102 to secure the valve cartridge 100 in the valve body 140. At least a portion of the inner surface 146 of the valve body 140 can be a threaded surface 254 to engage threads on the retention nut 138.

The valve body 140 includes the keyways 144 formed in the inner surface 146 of the valve body 140. The keyways 144 have a curved shape for receiving the (lobular) keys 142 of the valve cartridge 100 therein. This curved shape of the keyways 144 is easier and less expensive to form (e.g., machine) in the valve body 140 than conventional keyways having a non-lobular shape.

The keys 142 of the valve cartridge 100 interface with the keyways 144 of the valve body 140 to insure that the valve cartridge 100 is aligned with the valve body 140. Accordingly, the cold water inlet 248, the hot water inlet 250 and the water outlet 252 of the valve body are brought into alignment with the apertures 186, 188 and 190 in the manifold 114 (and, thus, the apertures 206, 208 and 210 in the base seal 116) during installation of the valve cartridge 100 in the valve body 140.

Because the keyways 144 extend from near the seating surface 224 to near the upper opening 246 of the valve body 140, the keys 142 prevent the valve cartridge 100 from fitting through the upper opening 246 of the valve body 140 unless the keys 142 are aligned with the keyways 144. Furthermore, because the valve cartridge 100 has three, unevenly spaced keys 142, only one possible alignment exists between the keys 142 and the keyways 144. As a result, the valve cartridge 100 cannot be inserted in the valve body 140 in an unaligned state. Accordingly, the keys 142 insure that the valve cartridge 100 is aligned with the valve body 140 when the valve cartridge 100 is being installed in the valve body 140. Consequently, it is easier for the user to install the valve cartridge 100 in the valve body 140. Furthermore, installation of the valve cartridge 100 in the valve body 140 can be performed more quickly. Further still, there is significantly less chance of any alignment error between the valve cartridge 100 and the valve body 140 during installation of the valve cartridge 100.

In one exemplary embodiment, the keyways 144 extend to or through the seating surface 224 of the valve body 140. In this case, the spacing of the keys 142 is selected so that any deformation of the seating surface 224 of the valve body 140 by formation of the keyways 144 would not adversely affect the compression of the ridge 222 between the base seal 116 and the seating surface 224.

In one exemplary embodiment, the height of the cavity 244 of the valve body 140 is between 0.780 and 0.790 inches. In another exemplary embodiment, the height of the cavity 244 of the valve body 140 is approximately equal to 0.785 inches. In still another exemplary embodiment, the height of the cavity 244 of the valve body 140 is approximately equal to 1.158 inches. In one another exemplary embodiment, the height of the keyways 144 is substantially the same as the height of the cavity 244 of the valve body 140. The keyways 144, however, do not increase an overall height of the valve body 140.

In one exemplary embodiment, the depth of the keyways 144 is between 0.032 and 0.045 inches. In another exemplary embodiment, the depth of the keyways 144 is approximately equal to 0.039 inches. Because the depth of the keyways 144 is less than or equal to the depth of the threaded surface 254 of the valve body 140, the keyways 144 do not increase an overall width (i.e., outer diameter) of the valve body 140 (see FIG. 9B).

Furthermore, the lobular keys 142 of the valve cartridge 100 interface with the keyways 144 of the valve body 140 to prevent the valve cartridge 100 from rotating relative to the valve body 140 during operation of the valve cartridge 100. By preventing rotation of the valve cartridge 100 relative to the valve body 140, the alignment of the cold water inlet 248, the hot water inlet 250 and the water outlet 252 of the valve body valve and the apertures 186, 188 and 190 of the manifold 114 is maintained. Because the shape of the keyways 144 closely matches the shape of the lobular keys 142, the user experiences a consistent, precise and smooth feel when manipulating the operating member 234 during operation of the valve cartridge 100.

A one-handle valve cartridge 400, according to another exemplary embodiment, has one or more keys 438. The keys 438 have a lobular shape that makes forming corresponding keyways (e.g., the keyways 144 shown in FIGS. 9A-9B) in a valve body (e.g., the exemplary valve body 140 shown in FIGS. 9A-9B) easier and less expensive and makes installing and aligning the valve cartridge 400 in the valve body easier and less prone to alignment errors. Furthermore, the lobular shape of the keys 438 allows the keyways to be formed in the valve body without increasing the size (e.g., width or height) of the valve body. Accordingly, the valve cartridge 400 can overcome various drawbacks of conventional valve cartridges having keys with a non-lobular shape.

Figure 12:
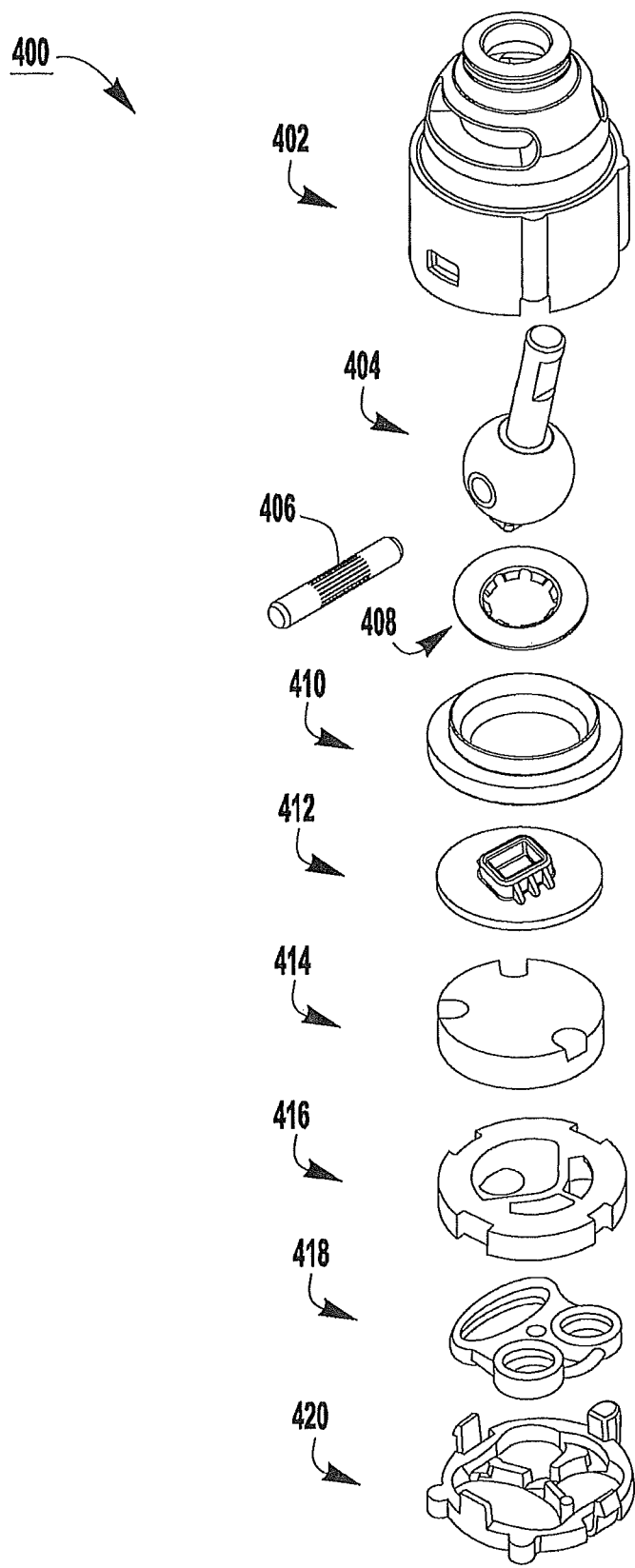
FIG. 12 is a perspective exploded view of a valve cartridge, according to another exemplary embodiment.
Figure 22A:
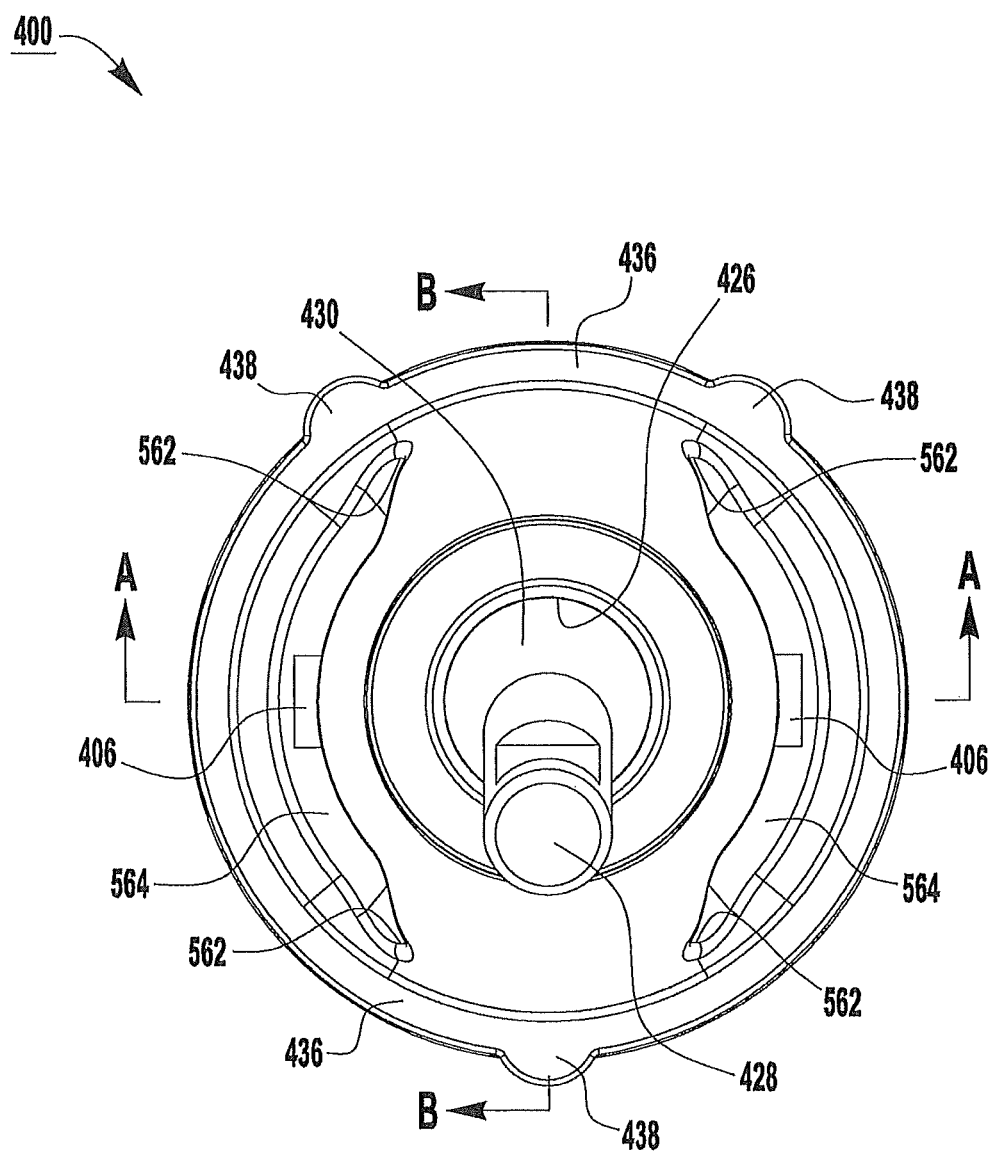
FIGS. 22A-22C show the exemplary valve cartridge of FIG. 12 in assembled form.
Figure 22B:
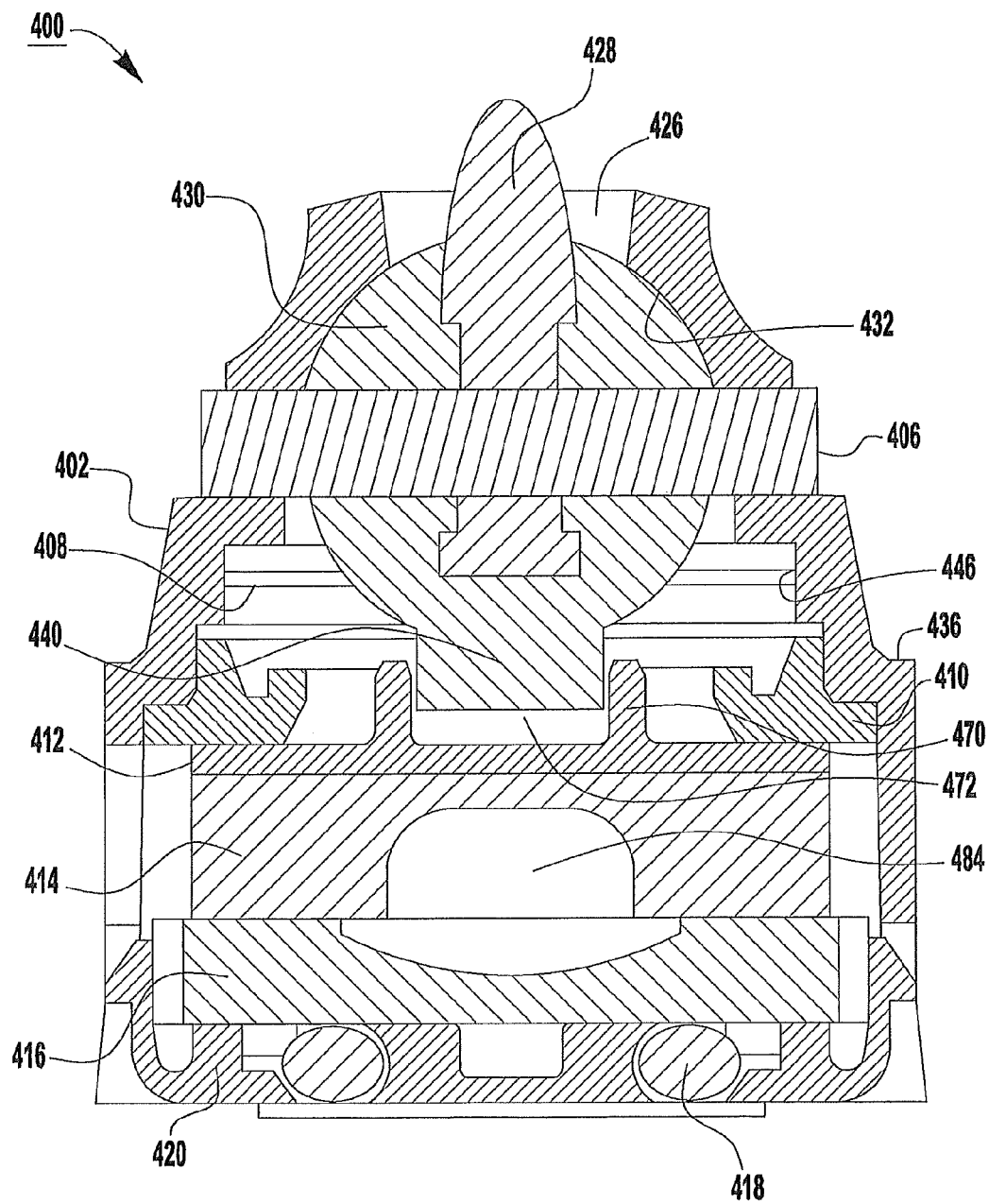
Figure 22C:
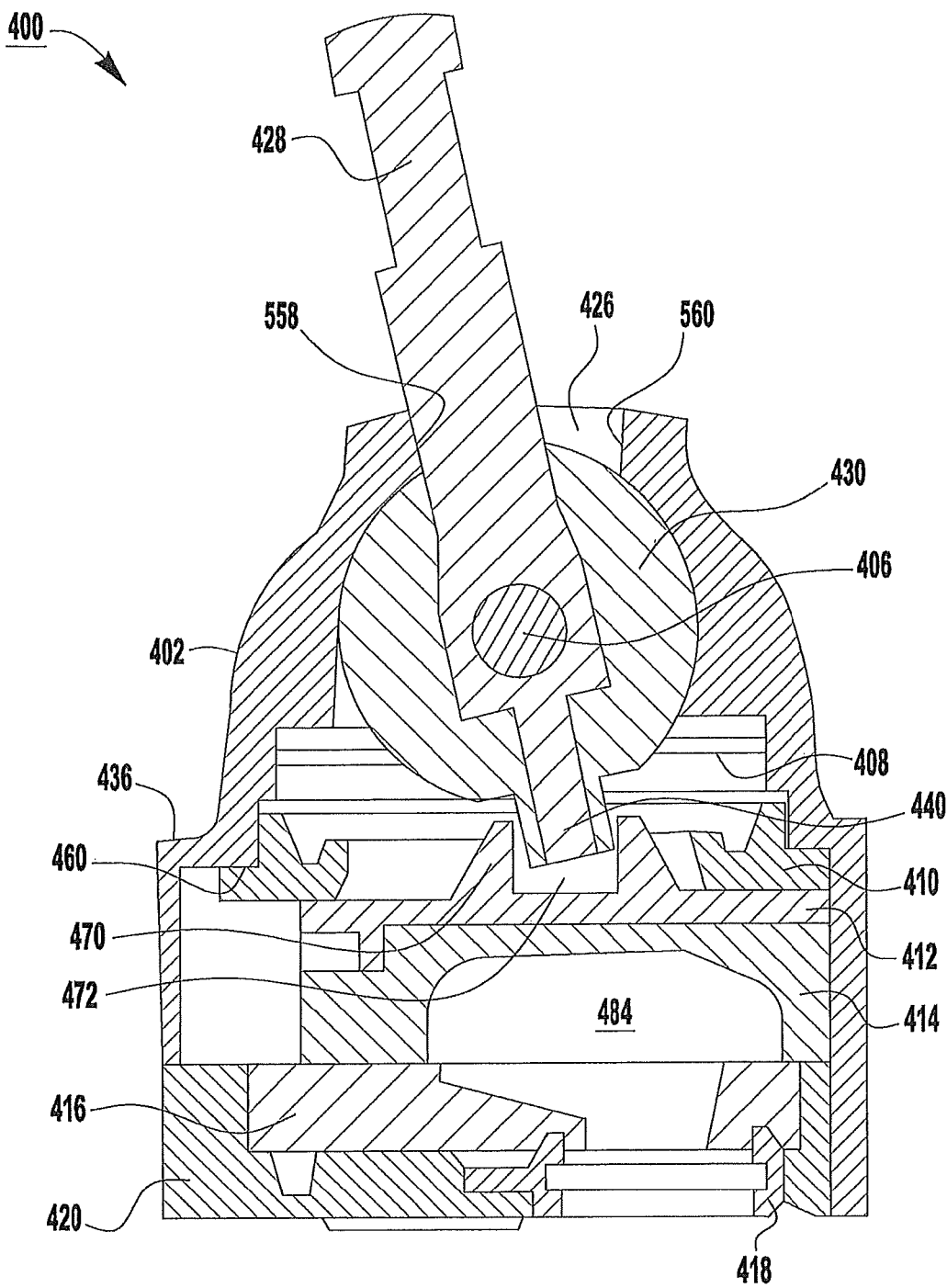

As shown in FIGS. 12 and 22B-22C, the exemplary valve cartridge 400 has several discrete components including an upper housing 402, a ball-stem 404, a pin 406, a spring 408, a bushing 410, a carrier 412, a movable disk 414, a fixed disk 416, a base seal 418 and a lower housing 420. The movable disk 414 and/or the fixed disk 416 can be made of a hard material. For example, the movable disk 414 and/or the fixed disk 416 can be made of ceramic. The upper housing 402, for example, can be made of plastic or metal. In one exemplary embodiment, the height of the upper housing is approximately 1.576 inches.

Figure 13A:
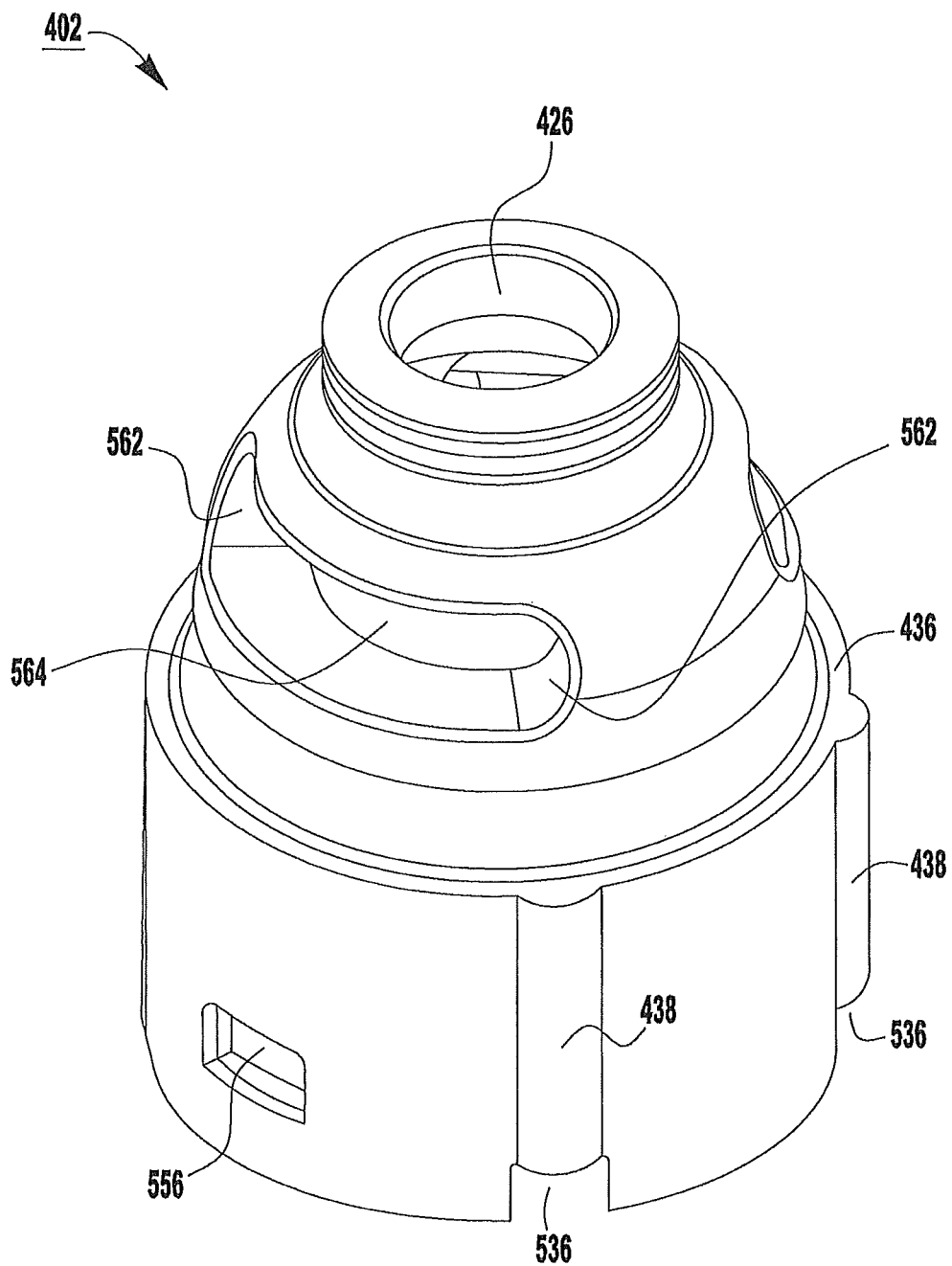
FIGS. 13A-13C show an exemplary upper housing used in the exemplary valve cartridge of FIG. 12.
Figure 13B:
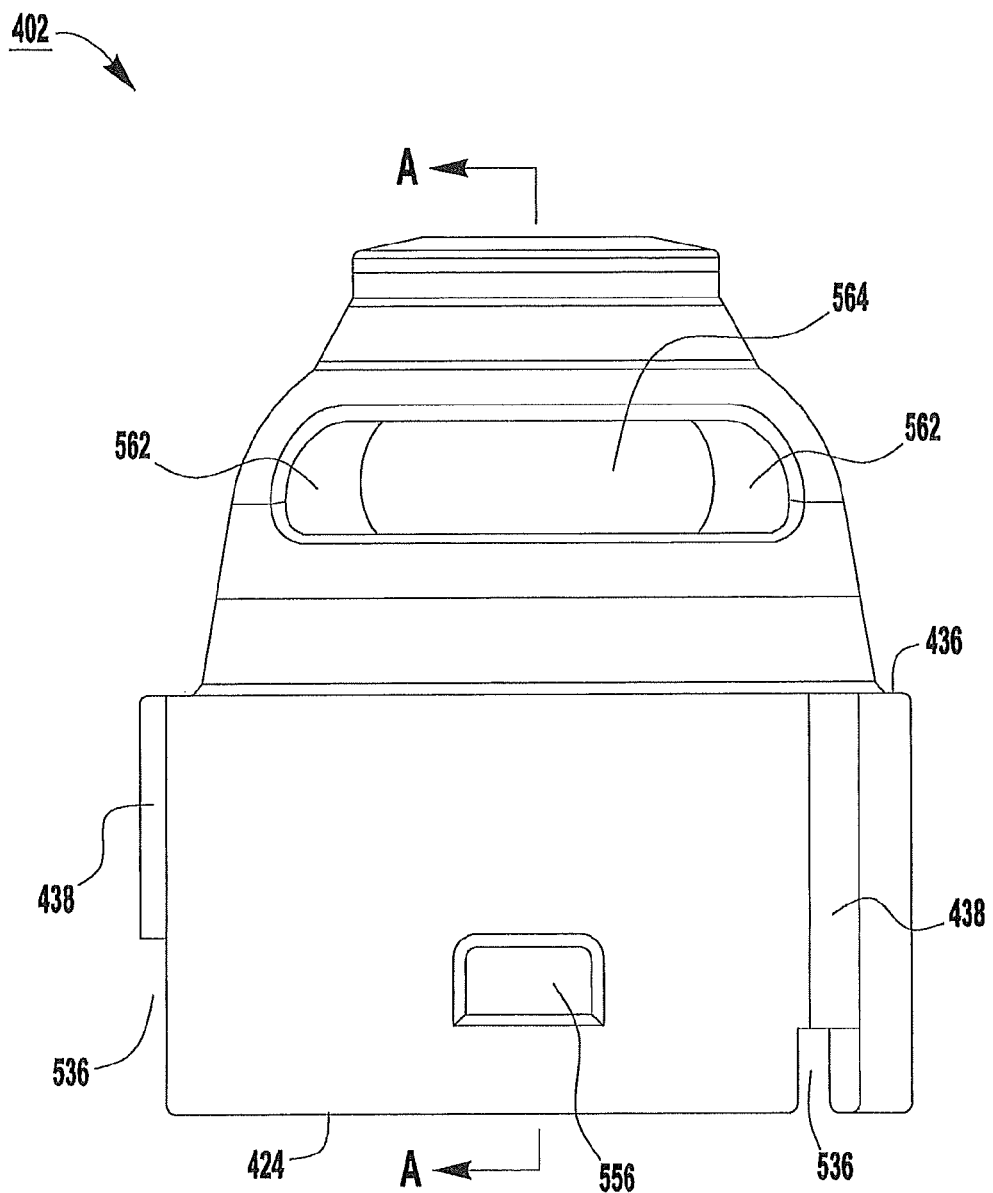
Figure 13C:
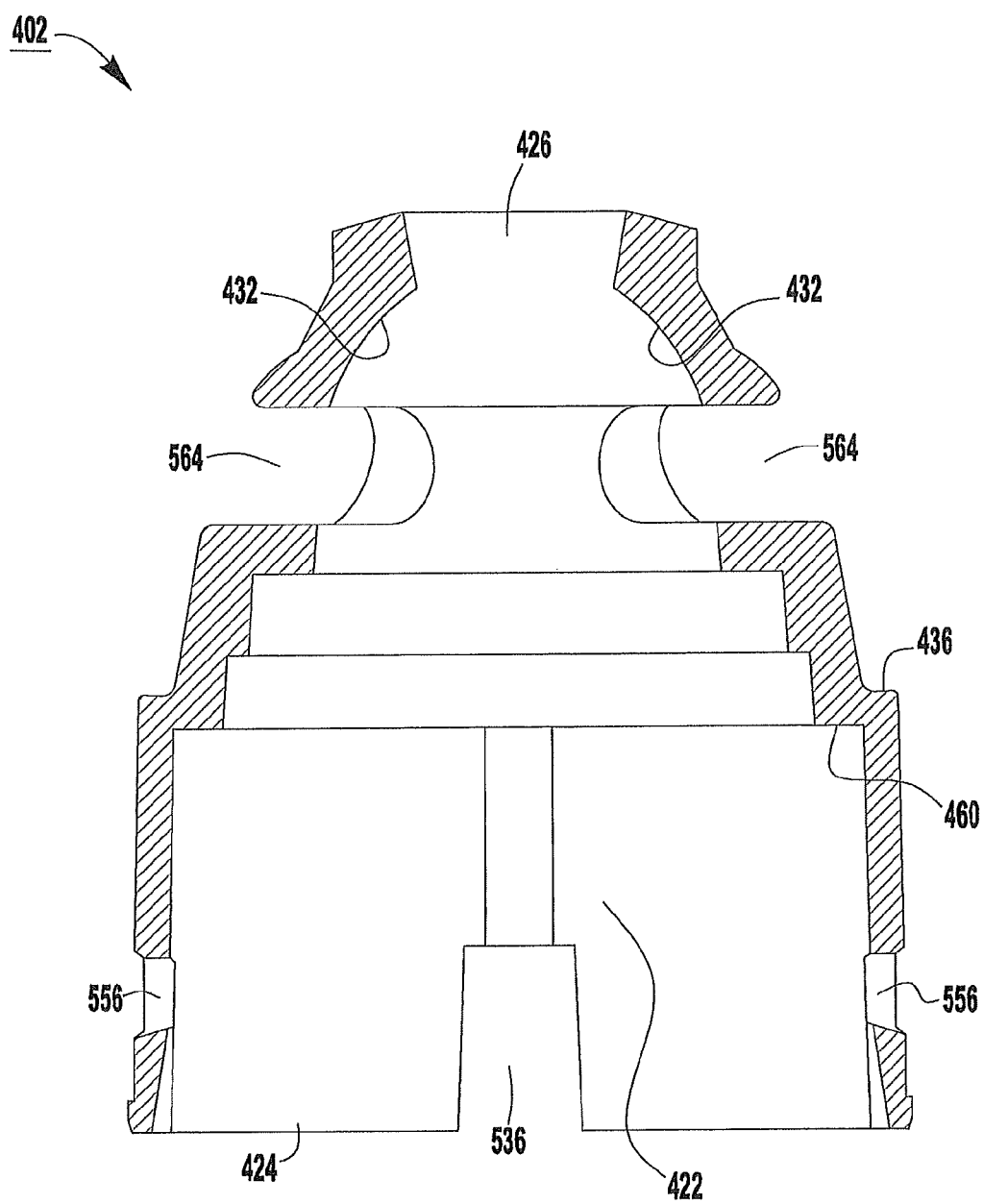

As shown in FIGS. 13A-13C, the upper housing 402 has a cavity 422 formed therein for receiving the remaining components of the valve cartridge 400. The upper housing 402 includes a lower opening 424 through which the components can be inserted into the upper housing 402. The upper housing 402 also includes an upper opening 426 through which a stem portion 428 of the ball-stem 404 extends. The cavity 422 in the upper housing 402 is wider near the lower opening 424 than near the upper opening 426. A portion of the cavity 422 near the upper opening 426 of the upper housing 402 receives a ball portion 430 of the ball-stem 404. Accordingly, a first inner surface 432 of the portion of the cavity 422 near the upper opening 426 has a shape that substantially conforms to a shape of the ball portion 430 of the ball-stem 404 (see FIGS. 13C and 22B).

A portion of the cavity 422 near the lower opening 424 of the upper housing 402 receives the bushing 410, the carrier 412, the movable disk 414, the fixed disk 416 and the base seal 418 (see FIGS. 22B-22C). Furthermore, as described below, the lower housing 420 interfaces with the upper housing 402 to form a housing assembly 434 that retains these components therein (see FIGS. 22B-22C).

The portion of the cavity 422 near the lower opening 424 of the upper housing 402 forms an installation ledge 436 on an outer surface of the upper housing 402 (see FIGS. 13A-13C and 22A-22C). In one exemplary embodiment, a retention nut (e.g., the retention nut 138 shown in FIG. 11) engages the installation ledge 436 and/or the upper housing 402 above the installation ledge 436 to secure the valve cartridge 400 in the valve body.

Furthermore, the upper housing 402 has one or more keys 438 that each engage a complementary-shaped keyway formed in an inner surface of the valve body, as described below. In one exemplary embodiment, the valve cartridge 400 has three keys 438 (see FIG. 22A). The keys 438 have a lobular shape (see FIGS. 13A and 22A). Alternatively, at least a portion of each of the keys 438 has a lobular shape.

The keys 438 are formed integrally with the housing assembly 434 (i.e., the upper housing 402 and the lower housing 420). In one exemplary embodiment, the keys 438 extend from the bottom of the housing assembly 434 to the installation ledge 436. In one exemplary embodiment, the height of the keys 438 is between 0.641 and 0.651 inches. In another exemplary embodiment, the height of the keys 438 is approximately equal to 0.646 inches. In one exemplary embodiment, the height of the keyways of the valve body is between 1.076 and 1.082 inches. In another exemplary embodiment, the height of the keyways is approximately equal to 1.079 inches. In still another exemplary embodiment, the height of the keyways is approximately equal to 1.158 inches. Thus, the contacting area of the keys 438 (with respect to the keyways) is substantially greater than with conventional keys.

The keys 438 can be evenly spaced around a circumference of the housing assembly 434. Alternatively, the keys 438 can be unevenly spaced around the circumference of the housing assembly 434.

In one exemplary embodiment, one or more projections 500 of the lower housing 420 can fit into one or more corresponding openings 536 formed in the upper housing 402 below those portions of the keys 438 formed on the upper housing 402 (see FIGS. 13A-13C and 21A-21D). In one exemplary embodiment, three projections 500 fit into three openings 536. These projections 500 have a shape that is substantially the same as a shape of the keys 438. By fitting into the openings 536 below the portions of the keys 438 on the upper housing 402, the projections 500 also function as portions of the keys 438, for example, by engaging the complementary-shaped recesses in the valve body.

In one exemplary embodiment, the valve cartridge includes three keys 438, wherein a portion of each of the keys 438 is formed on the upper housing 402. For two of the three keys 438, the portion has a height between 0.513 and 0.529 inches. For the other key 438, the portion has a height between 0.368 and 0.384 inches. In another exemplary embodiment, the valve cartridge includes three keys 438, wherein a portion of each of the keys 438 is formed on the upper housing 402. For two of the three keys 438, the portion has a height of approximately 0.521 inches. For the other key 438, the portion has a height of approximately 0.376 inches.

The upper housing 402 also includes a pair of slots 564 formed on opposing sides of the upper housing 402 that interface with distal ends of the pin 406 to function as temperature-limit stops, as described below (see FIGS. 13A-13C).

Figure 14:
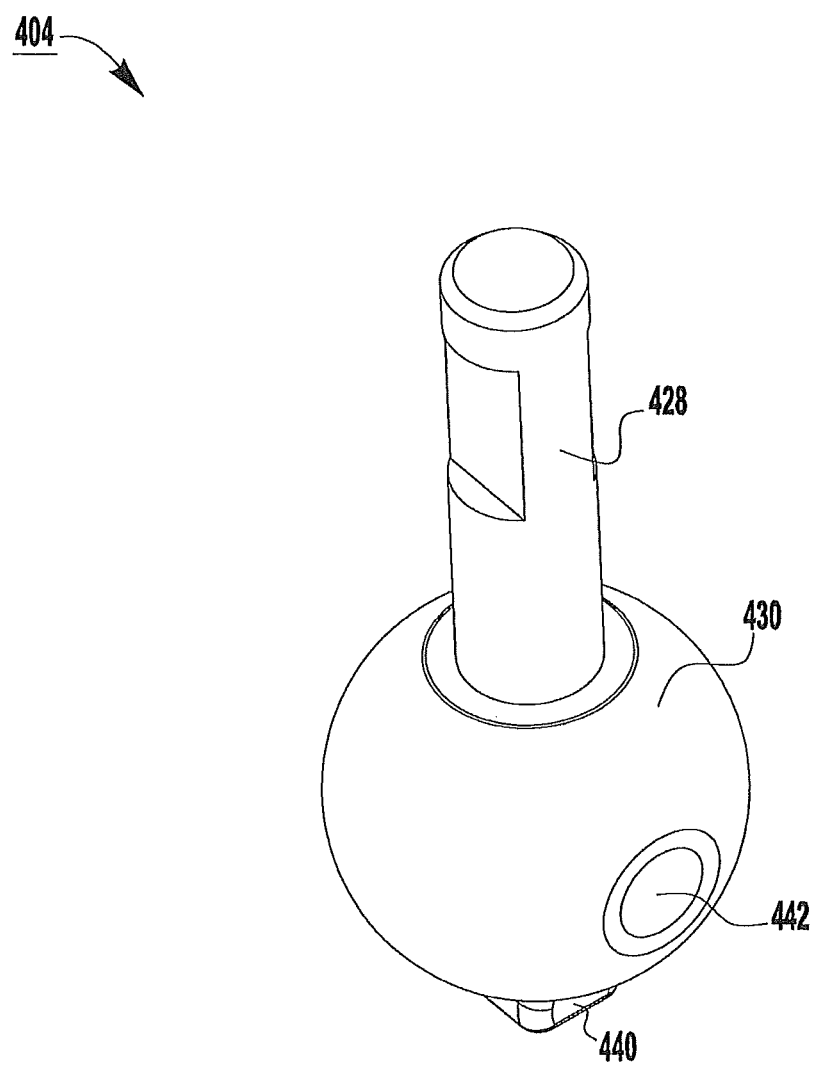
FIG. 14 is a perspective view of an exemplary ball-stem of the exemplary valve cartridge of FIG. 12.

As shown in FIG. 14, the ball-stem 404 is the actuating mechanism for the valve cartridge 400. The ball-stem 404 includes the ball portion 430 and the stem portion 428. The ball portion 430 and the stem portion 428 can be discrete components or can be formed integrally. The ball portion 430 includes a projection 440 extending from a side of the ball portion 430 that is opposite a side of the ball portion 430 from which the stem portion 428 extends. The projection 440 acts as a coupling device for connecting the ball-stem 404 to the carrier 412, as described below. The ball portion 430 and the projection 440 can be discrete components or can be formed integrally.

A bore 442 is formed through a center of the ball portion 430 of the ball-stem 404. The bore 442 is orthogonal to the stem portion 428 of the ball-stem 404. After the ball-stem 404 is inserted into the cavity 422 of the upper housing 402, the pin 406 can be inserted through one of the slots 564 in the upper housing 402 and into the bore 442 of the ball-stem 404. In this manner, the pin 406 retains the ball-stem 404 in the upper housing 402.

Figure 15A:
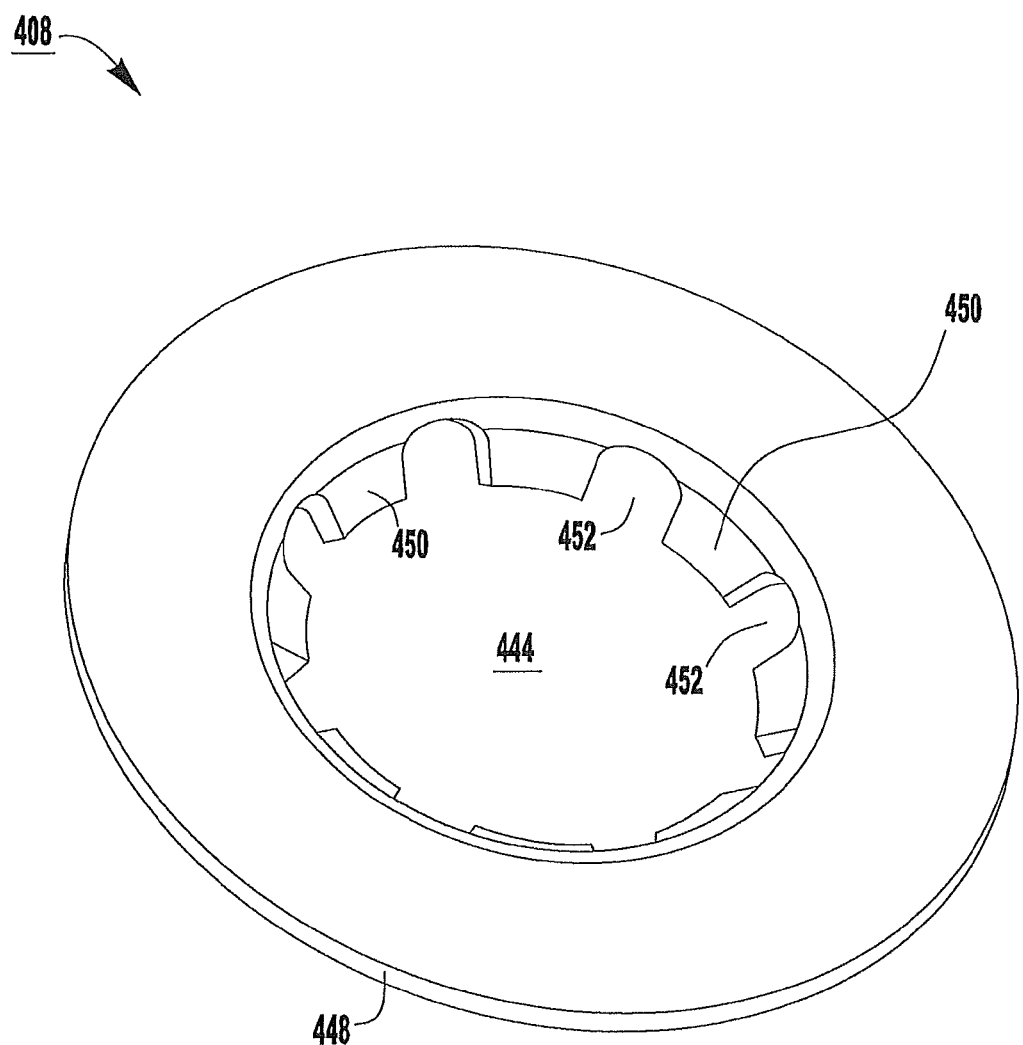
FIGS. 15A-15C show an exemplary spring used in the exemplary valve cartridge of FIG. 12.
Figure 15B:
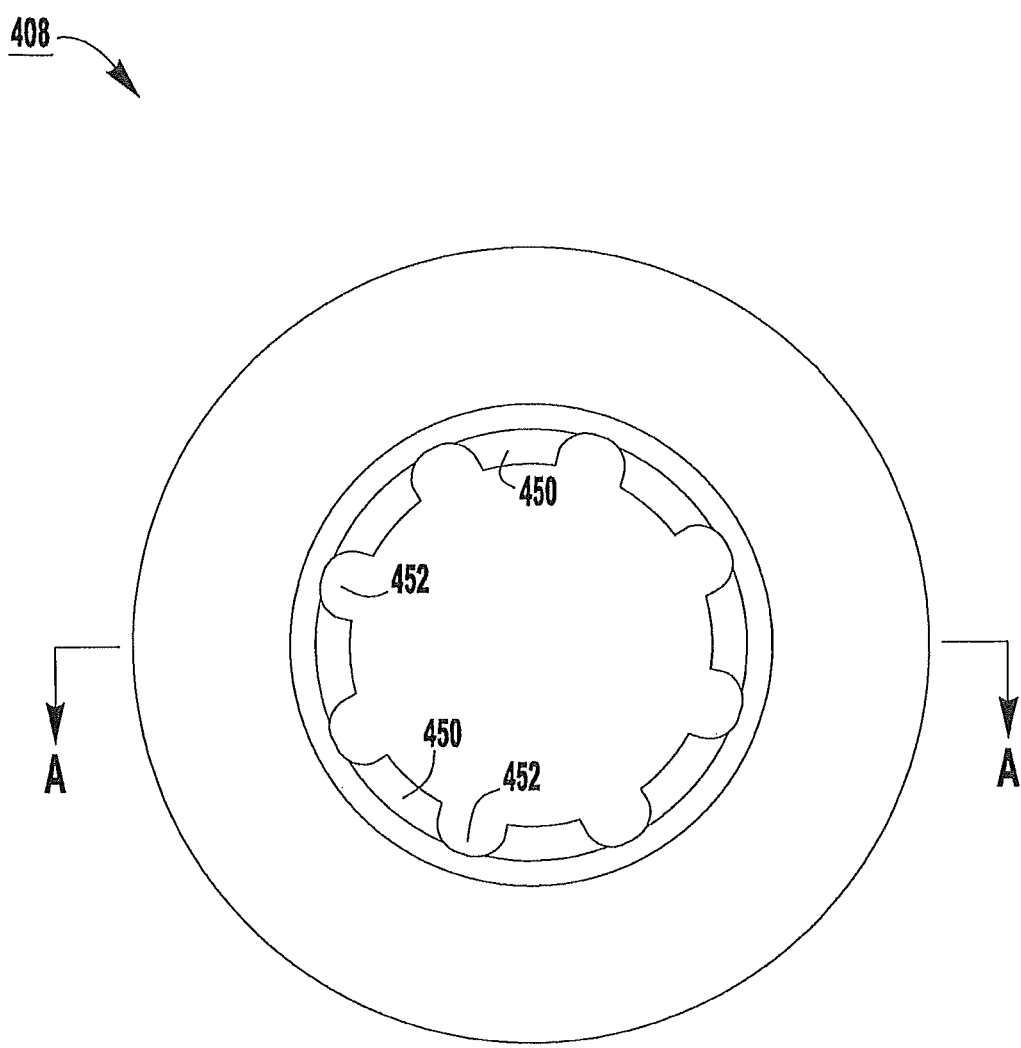
Figure 15C:
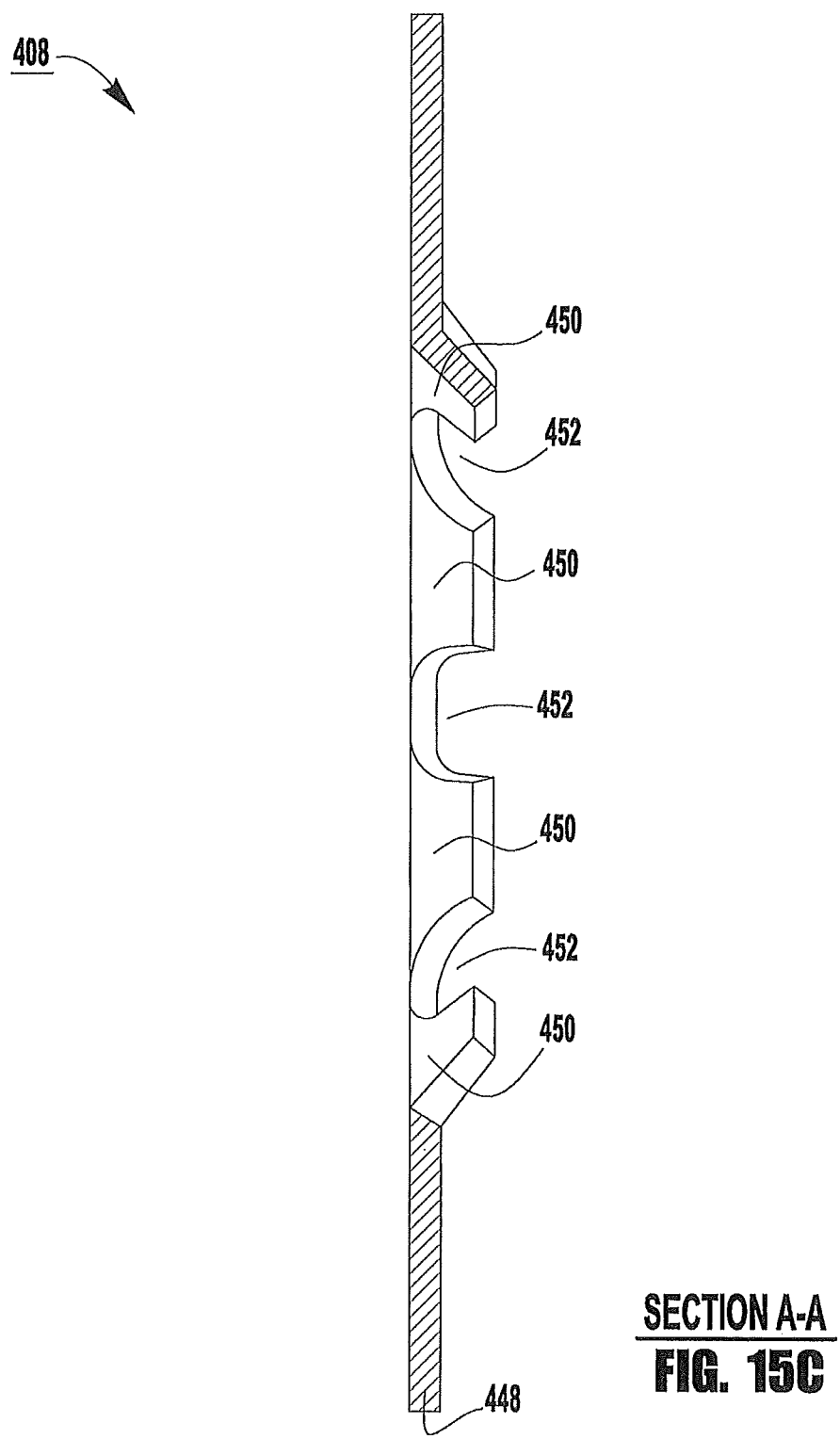

As shown in FIGS. 15A-15C, the spring 408 has an annular shape with a central opening 444. The spring 408 is disposed below the ball portion 430 of the ball-stem 404 in the upper housing 402 (see FIGS. 22B-22C). The spring 408 is connected to a second inner surface 446 of the upper housing 402 (e.g., by or through threading, friction fitting, snap fitting, welding), such that the spring 408 also retains the ball-stem 404 in the upper housing 402 (see FIG. 22B). In one exemplary embodiment, at least a portion of an outer periphery 448 of the spring 408 is welded to the second inner surface 446 of the upper housing 402.

The projection 440 of the ball-stem 404 extends through the central opening 444 in the spring 408. Some of the ball portion 430 of the ball-stem 404 can also extend through the central opening 444 in the spring 408. The spring 408 includes a plurality of elastic flanges 450 surrounding the central opening 444. The elastic flanges 450 are spaced apart from one another such that gaps 452 are formed between the elastic flanges 450. The elastic flanges 450 of the spring 408 contact the ball portion 430 of the ball-stem 404 and urge the ball portion 430 of the ball-stem 404 against the complementary-shaped first inner surface 432 of the upper housing 402. The gaps 452, for example, function to reduce the stress placed on the spring 408 from engaging the ball-stem 404.

Figure 16A:
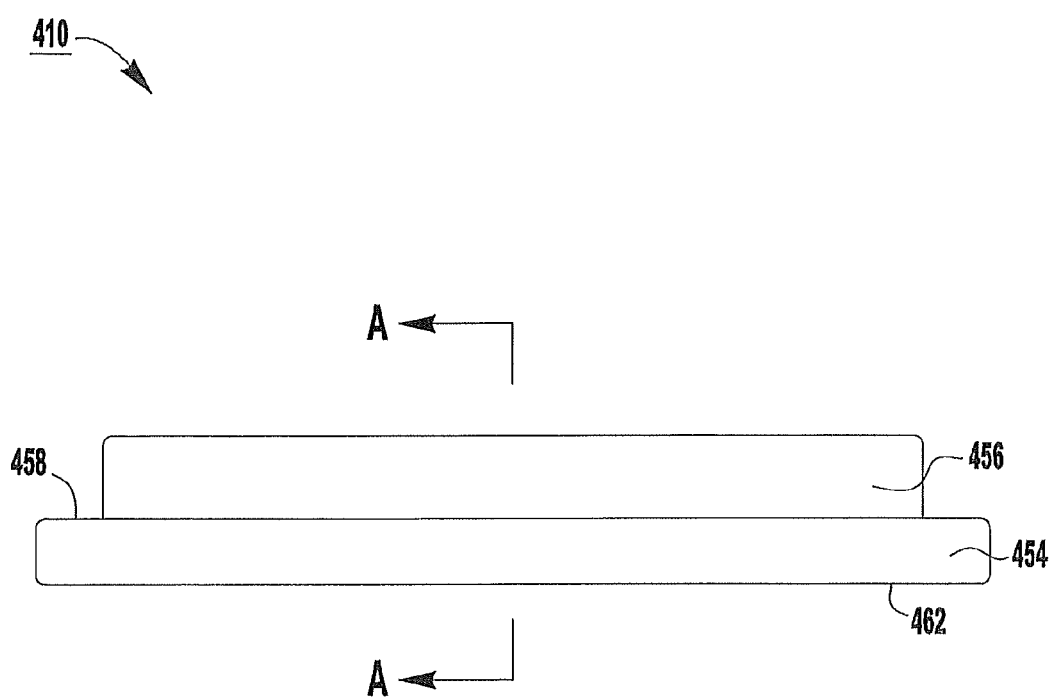
FIGS. 16A-16C show an exemplary bushing used in the exemplary valve cartridge of FIG. 12.
Figure 16B:
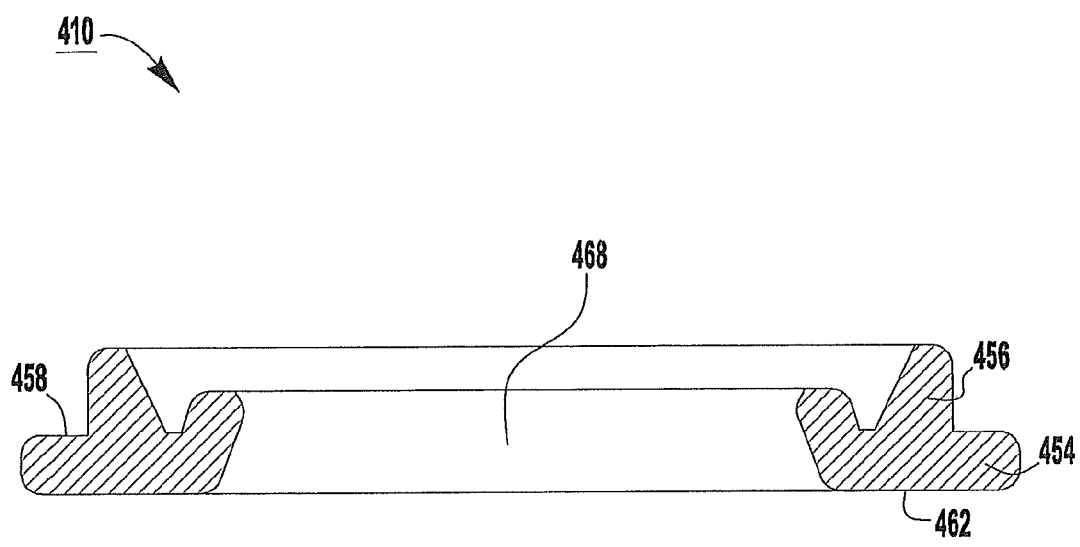
Figure 16C:
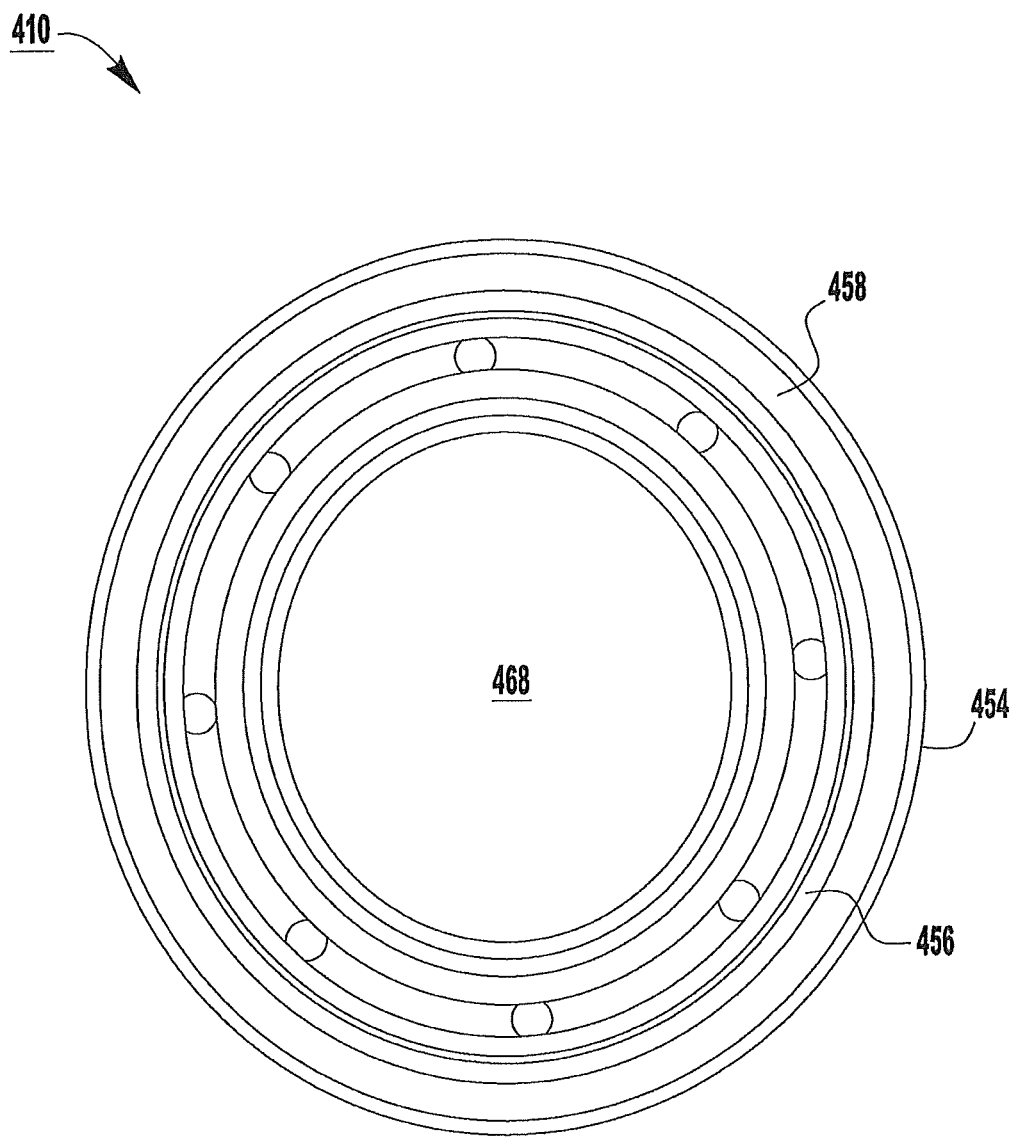
Figure 17A:
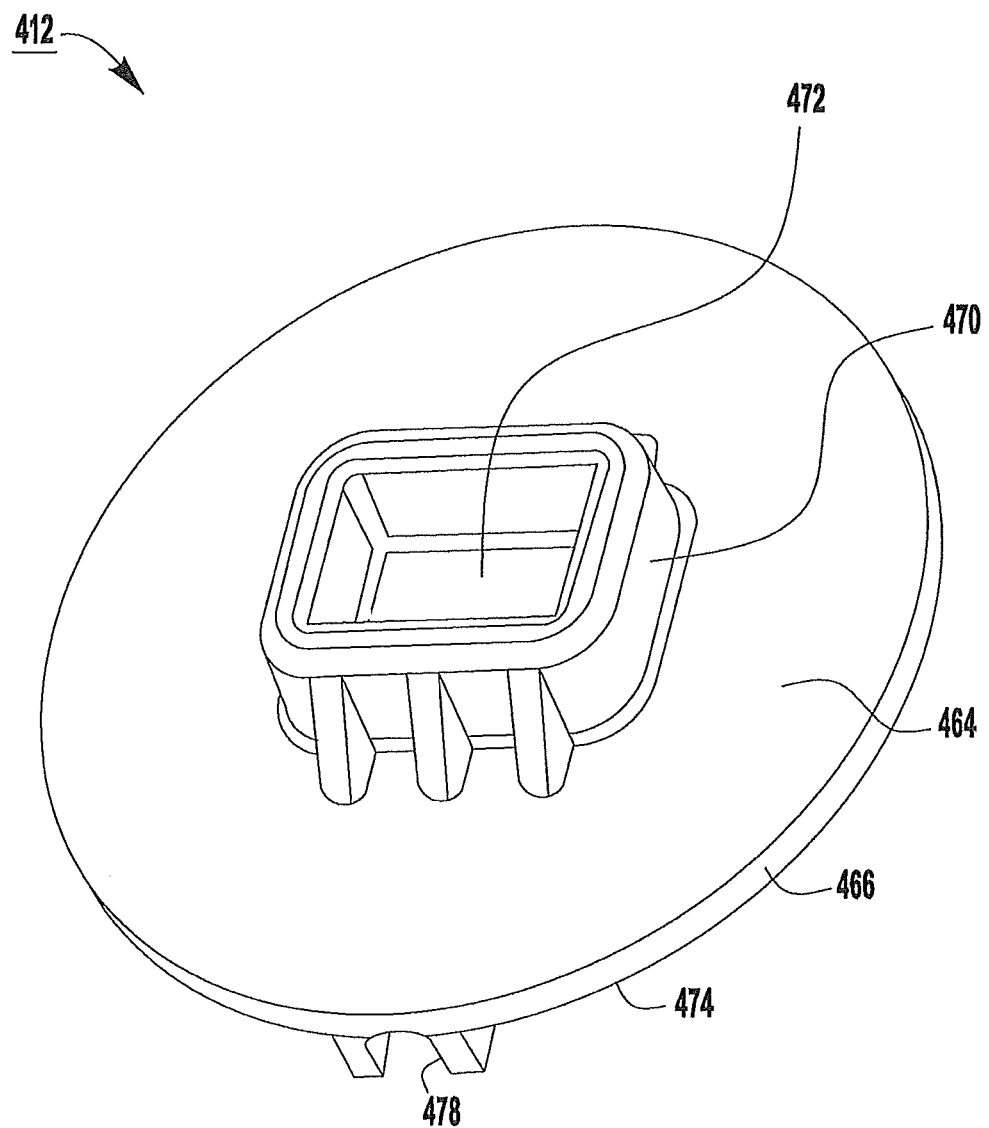
FIGS. 17A-17D show an exemplary carrier used in the exemplary valve cartridge of FIG. 12.
Figure 17B:
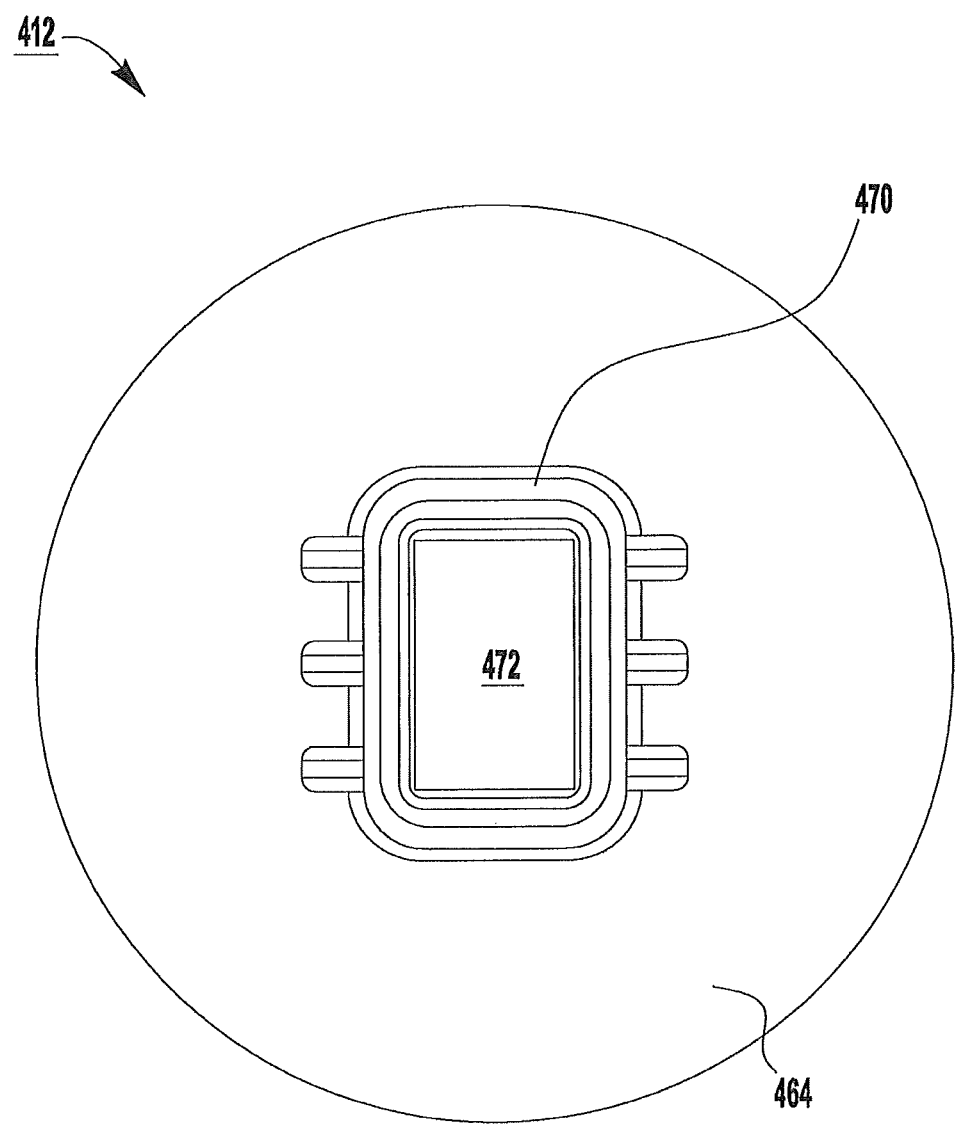
Figure 17C:
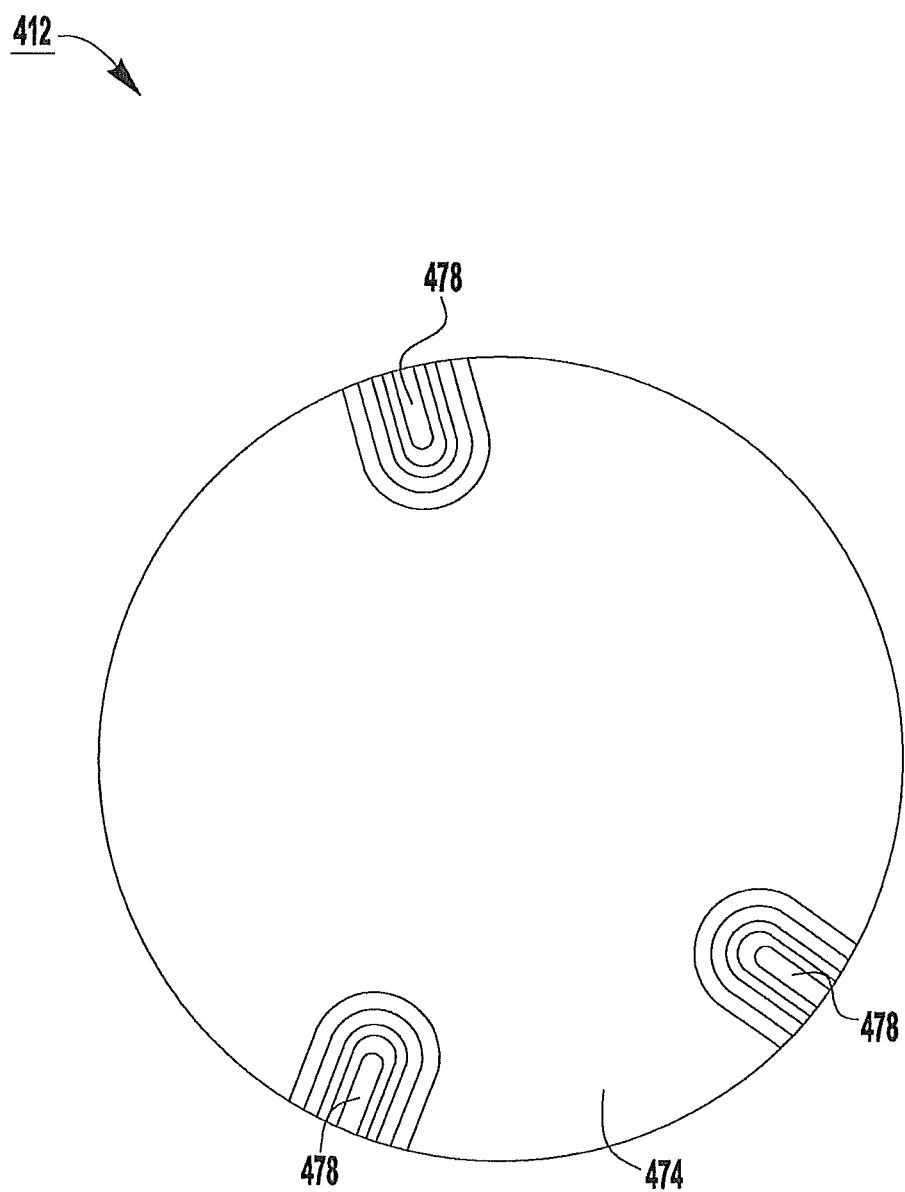
Figure 17D:
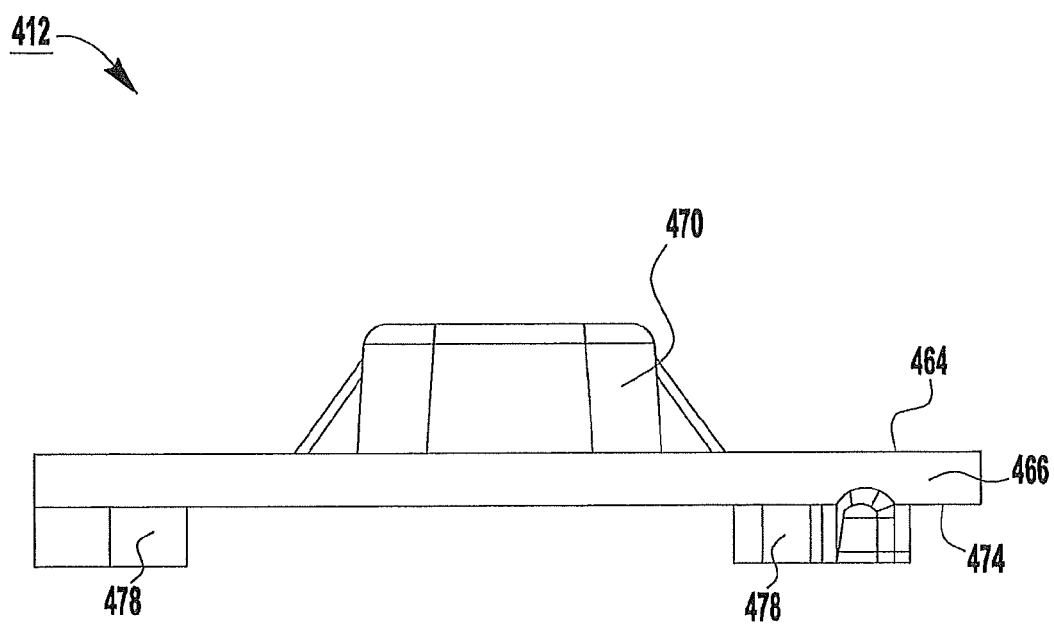

As shown in FIGS. 16A-16C, the bushing 410 includes a flat annular portion 454 and a raised annular portion 456. A diameter of the flat annular portion 454 is greater than a diameter of the raised annular portion 456. The bushing 410 is disposed below and can be spaced apart from the spring 408 in the cavity 422 of the upper housing 402 (see FIGS. 22B-22C). An upper surface 458 of the flat annular portion 454 of the bushing 410 contacts a third inner surface 460 of the upper housing 402, which is located below the installation ledge 436 (see FIGS. 13C and 22C). A lower surface 462 of the flat annular portion 454 of the bushing 410 rests on an upper surface 464 of a flat portion 466 of the carrier 412 (see FIGS. 16A-16B, 17A-17B, 17D and 22B-22C). Additionally, the raised annular portion 456 of the bushing 410 extends into a portion of the cavity 422 of the upper housing 402 immediately above (and adjacent to) the installation ledge 436. The raised annular portion 456 of the bushing 410 is sized to fit closely in that portion of the cavity 422 of the upper housing 402 receiving the raised annular portion 456 of the bushing 410. Accordingly, the bushing 410 provides a support surface between the upper housing 402 and the carrier 412.

The bushing 410 has an opening 468 that extends through the flat annular portion 454 and the raised annular portion 456 of the bushing 410. A raised portion 470 of the carrier 412 extends into the opening 468 of the bushing 410 (see FIGS. 17A-17B and 17D). Additionally, a coupling recess 472 is formed in the raised portion 470 of the carrier 412. After the carrier 412 is installed in the valve cartridge 400, the coupling recess 472 is positioned within the opening 468 of the bushing 410 and surrounded by the bushing 410 (see FIGS. 22B-22C).

The coupling recess 472 of the carrier 412 receives the projection 440 of the ball-stem 404, thereby connecting the actuating mechanism (i.e., the ball-stem 404) and the carrier 412 (see FIGS. 22B-22C). The projection 440 of the ball-stem 404 can have four sides that contact four corresponding sides of the coupling recess 472. The projection 440 of the ball-stem 404 does not contact a bottom surface of the coupling recess 472. It will be appreciated that notwithstanding the exemplary embodiments described herein, the ball-stem 404 can be connected to the carrier 412 in any suitable manner that allows the ball-stem 404 to impart translational and angular movement to the carrier 412.

As shown in FIGS. 17A-17D, the carrier 412 includes the flat portion 466 and the raised portion 470. A lower surface 474 of the flat portion 466 of the carrier 412 includes structure for interfacing with an upper surface 476 of the movable disk 414, such that the carrier 412 and the movable disk 414 are joined and do not move relative to one another. In one exemplary embodiment, the lower surface 474 of the carrier 412 includes three U-shaped projections 478 that friction fit into three corresponding U-shaped recesses 480 formed in the upper surface 476 of the movable disk 414. The spacing between adjacent U-shaped projections 478 (and, thus, the corresponding U-shaped recesses 480) can be varied so that the carrier 412 will only interface with the movable disk 414 in one orientation. Furthermore, as noted above, the carrier 412 also includes the coupling recess 472, which is formed in the raised portion 470 of the carrier 412. In this manner, the carrier 412 functions to interconnect the actuating mechanism (e.g., the ball-stem 404) and the dynamic sealing elements (e.g., the movable disk 414), in the valve cartridge 400.

Figure 18A:
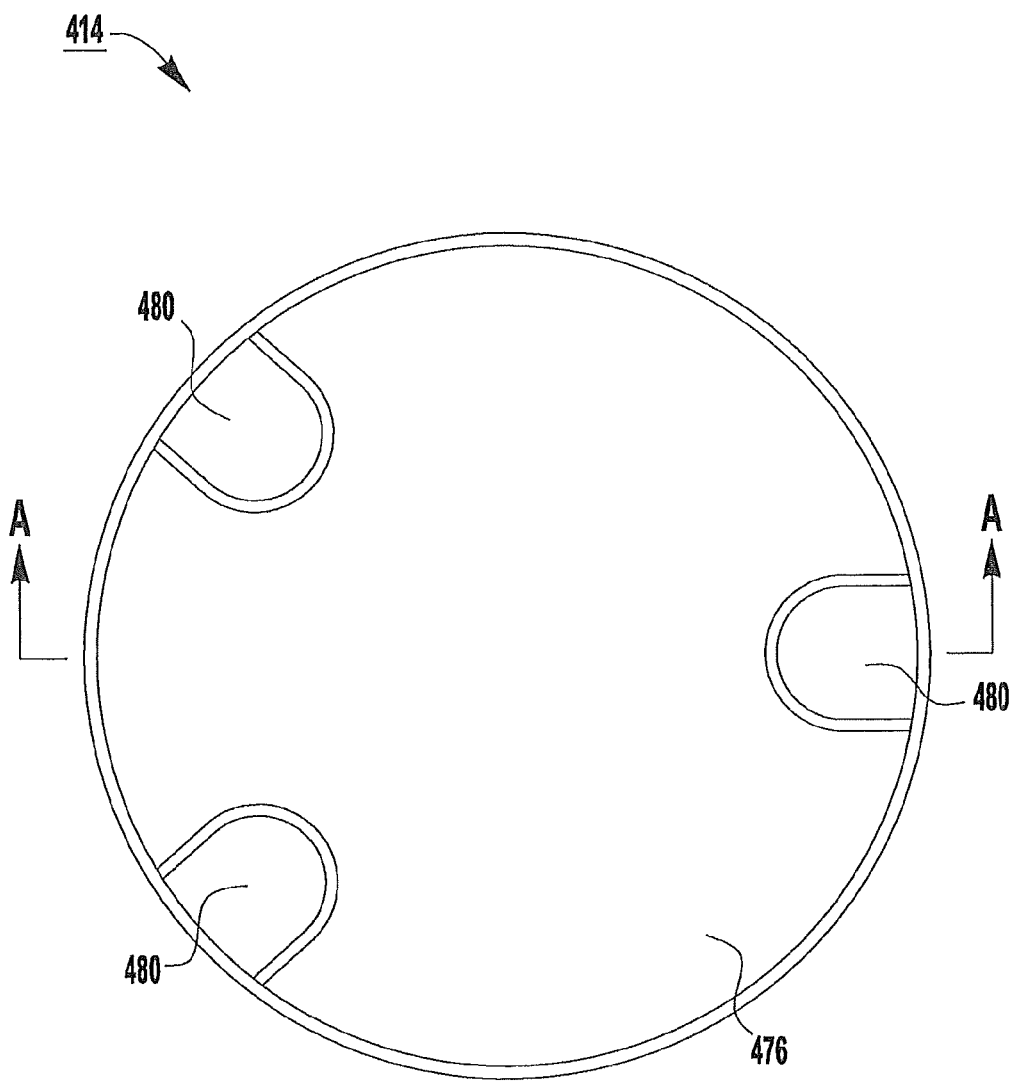
FIGS. 18A-18C show an exemplary movable disk used in the exemplary valve cartridge of FIG. 12.
Figure 18B:
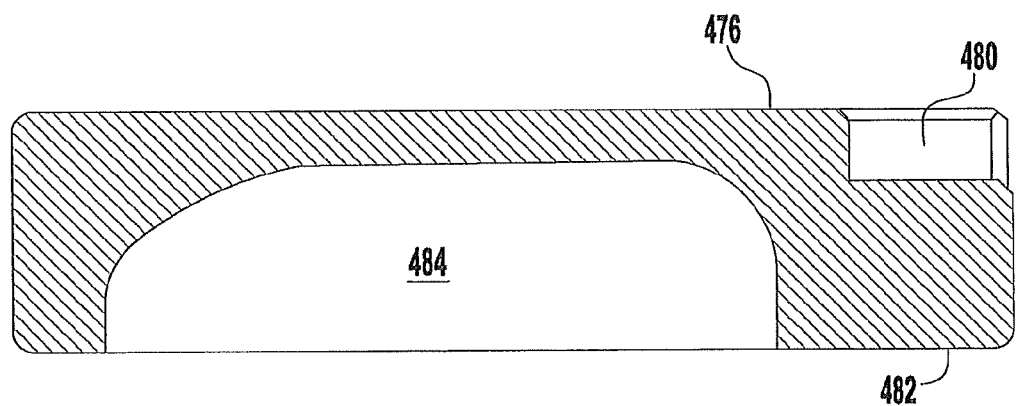
Figure 18C:
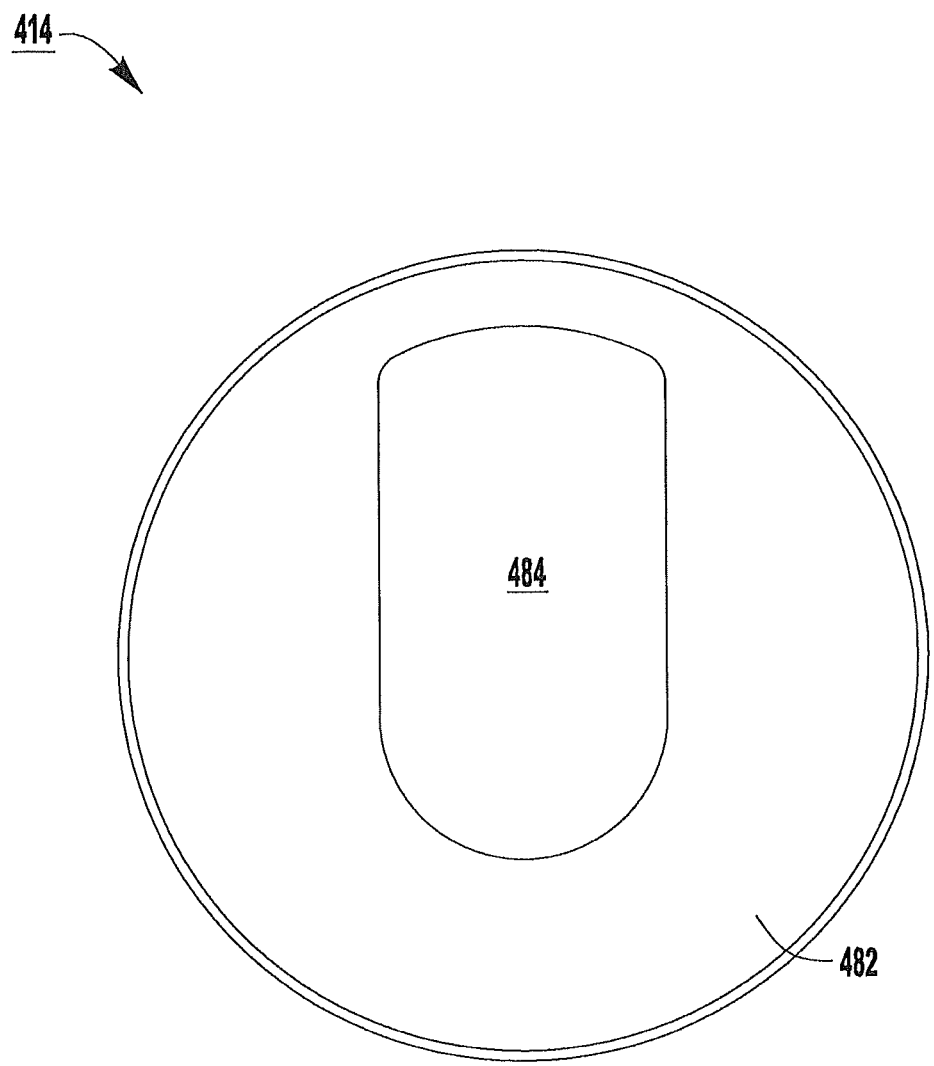
Figure 19A:
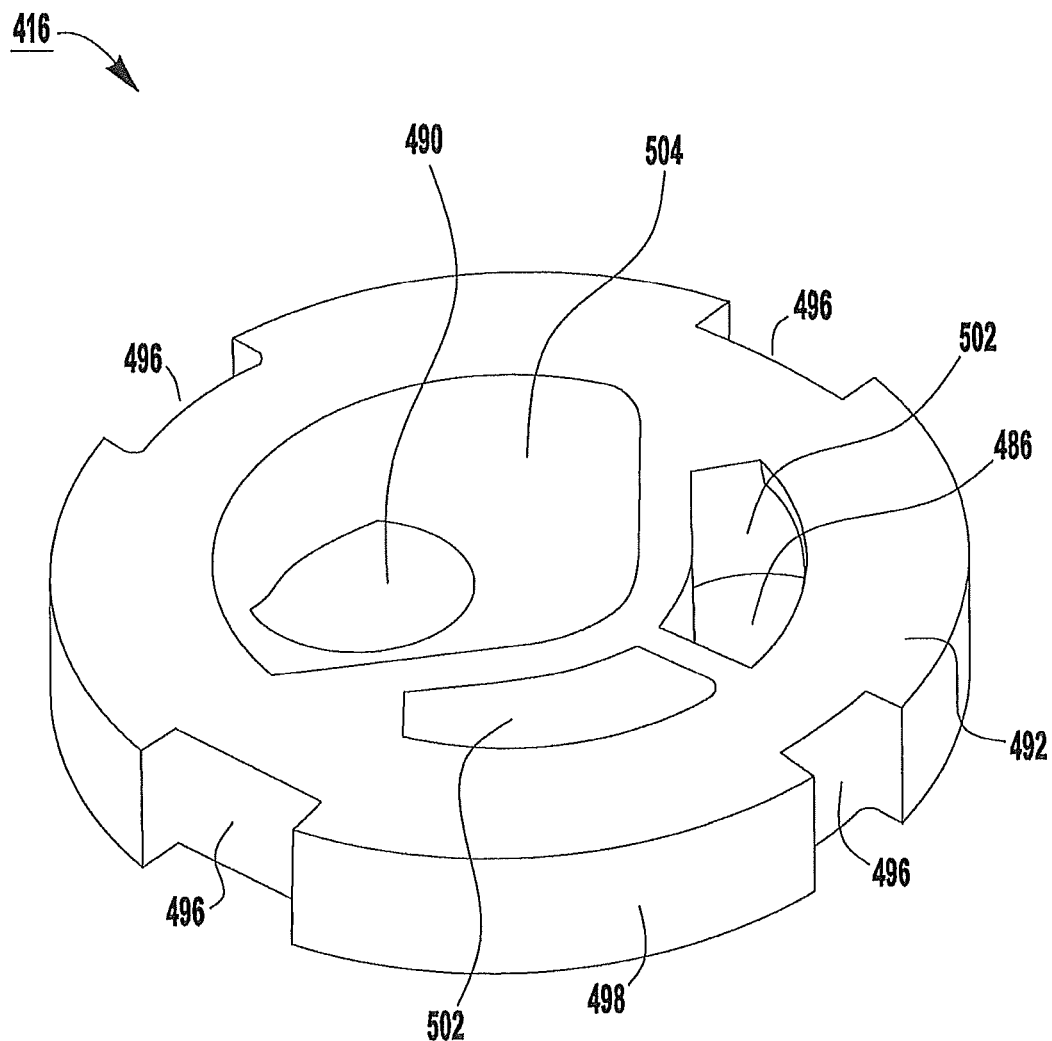
FIGS. 19A-19D show an exemplary fixed disk used in the exemplary valve cartridge of FIG. 12.
Figure 19B:
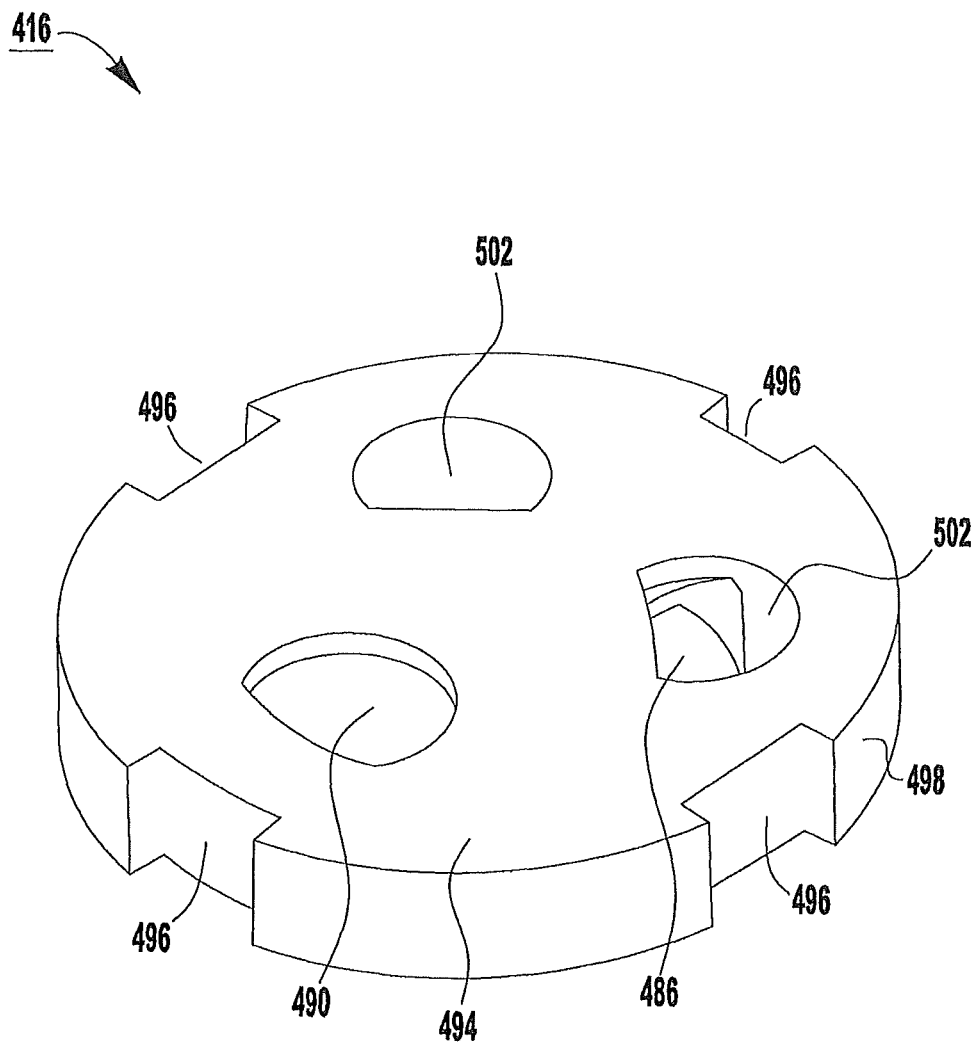
Figure 19C:
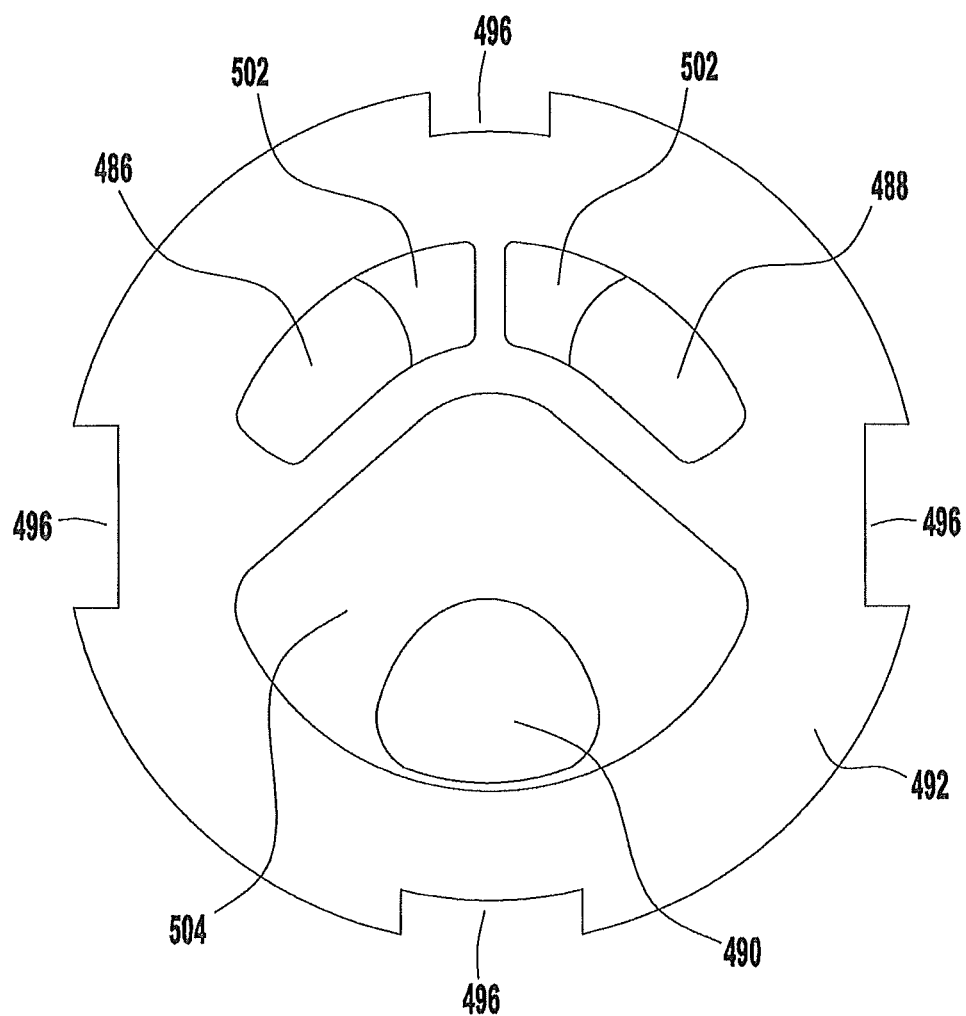
Figure 19D:
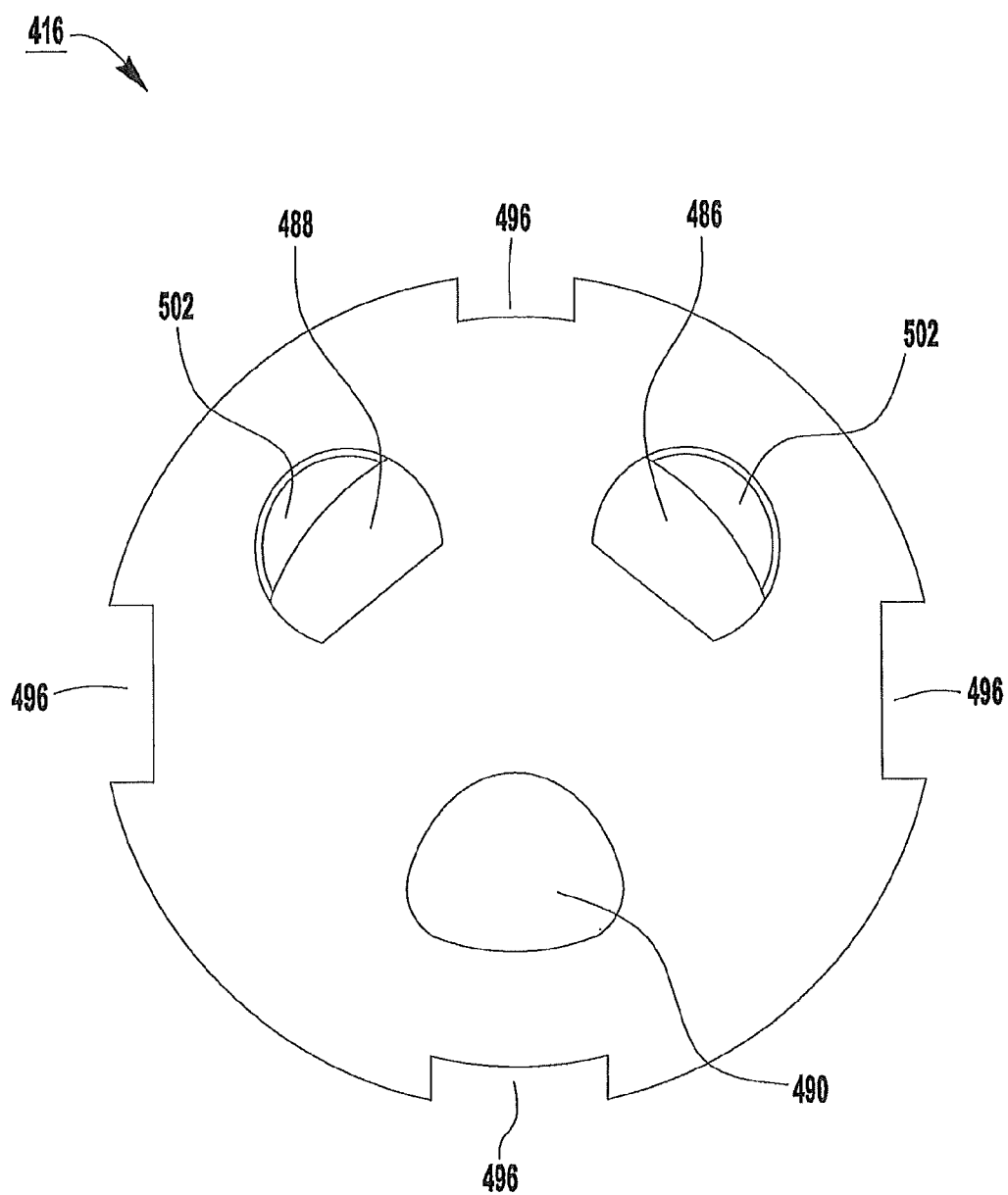

As shown in FIGS. 18A-18C, the movable disk 414 is a valve member formed as a plate, disk or the like that is movable relative to the upper housing 402. As noted above, the upper surface 476 of the movable disk 414 includes the U-shaped recesses 480. The upper surface 476 is substantially flat. A lower surface 482 of the movable disk 414 includes a mixing chamber 484 (i.e., a cavity formed in the movable disk 414). In an alternative exemplary embodiment, the mixing chamber 484 extends through the movable disk 414 (i.e., from the lower surface 482 to the upper surface 476). The lower surface 482 is substantially flat. The lower surface 482 of the movable disk 414 forms a sealing surface that can cover and uncover water inlet apertures 486 and 488 in the fixed disk 416 to allow only cold water, only hot water or both cold and hot water to flow through the fixed disk 416. The water flowing through the water inlet apertures 486 and 488 in the fixed disk 416 enters the mixing chamber 484 where the cold and hot water mix prior to being discharged through a water outlet aperture 490 in the fixed disk 416.

As shown in FIGS. 19A-19D, the fixed disk 416 is a valve member formed as a plate, disk or the like that is fixed relative to the upper housing 402. The fixed disk 416 has an upper surface 492 and a lower surface 494. The fixed disk 416 includes structure for interfacing with the lower housing 420 to fix (i.e., prevent rotation) of the fixed disk 416 relative to the upper housing 402 once the valve cartridge 400 is assembled. For example, four notches 496 are formed along a periphery 498 of the fixed disk 416. One or more notches 496 engage corresponding projections 500 formed on the lower housing 420, thereby preventing the fixed disk 416 from rotating relative to the lower housing 420. In one exemplary embodiment, two notches 496 engage corresponding projections 500. By varying the size of and/or the spacing between the notches 496 (and, thus, the corresponding projections 500), it is possible to insure that the fixed disk 416 will interface with the lower housing 420 in only one orientation. Thus, because the fixed disk 416 is prevented from rotating relative to the lower housing 420 and the lower housing 420 is secured to the upper housing 402, as described below, the fixed disk 416 will not rotate within the upper housing 402.

The fixed disk 416 includes the water inlet apertures 486 and 488, which correspond to a cold water inlet aperture and a hot water inlet aperture, respectively. The fixed disk 416 also includes the water outlet aperture 490 through which cold water flowing through the cold water inlet aperture 486, hot water flowing through the hot water inlet aperture 488 or a mixture of the cold and hot water can flow to a water outlet passage of the valve body. The cold water inlet aperture 486 and the hot water inlet aperture 488 of the fixed disk 416 each have walls 502 that slope from near the lower surface 494 of the fixed disk 416 to near the upper surface 492 of the fixed disk 416 to improve the flow of water through the fixed disk 416 and into the valve cartridge 400. The water outlet aperture 490 of the fixed disk 416 has walls 504 that slope from near the upper surface 492 of the fixed disk 416 to near the lower surface 494 of the fixed disk 416 to improve the flow of water through the fixed disk 416 and out of the valve cartridge 400.

Figure 20A:
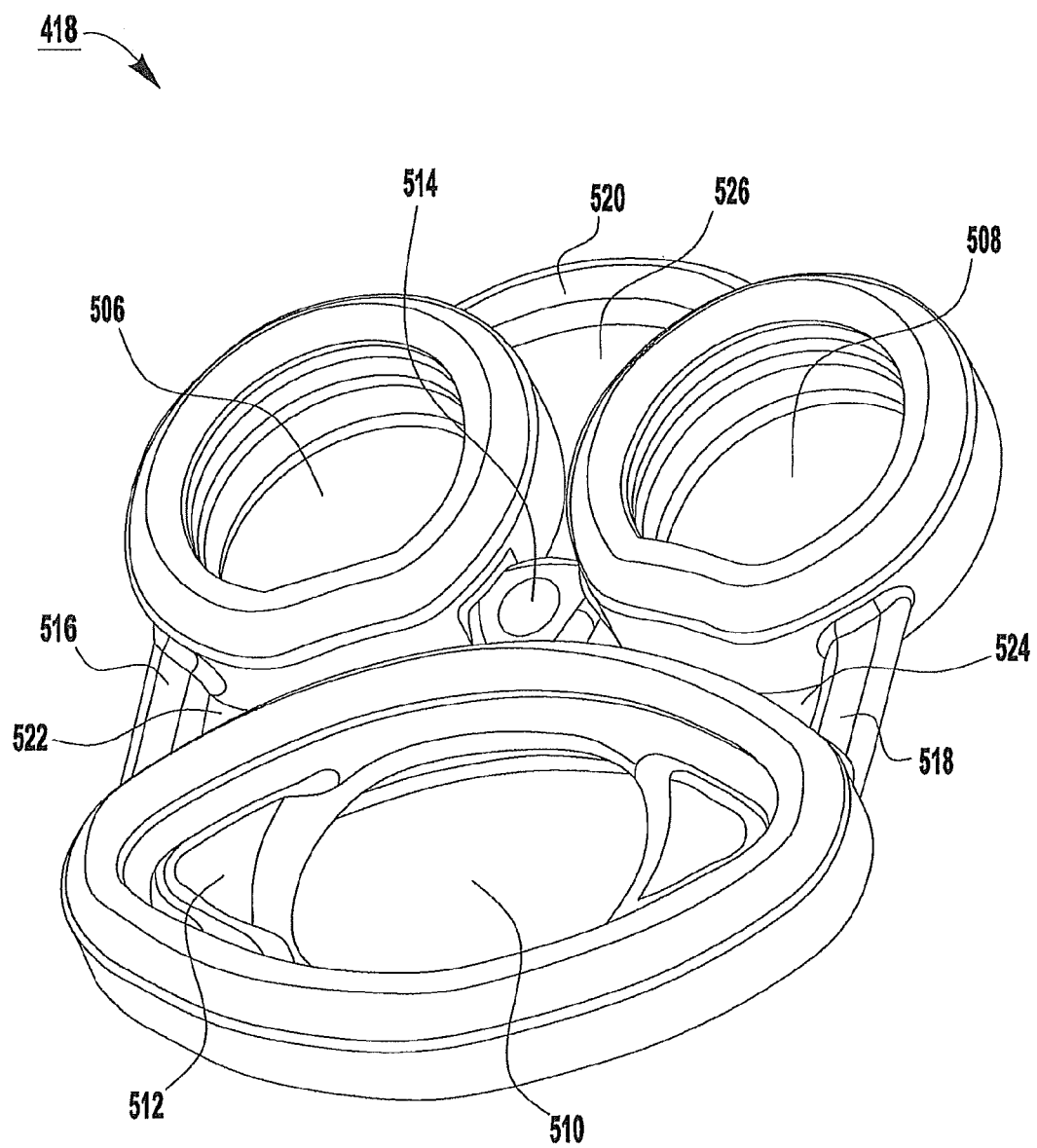
FIGS. 20A-20B show an exemplary base seal used in the exemplary valve cartridge of FIG. 12.
Figure 20B:
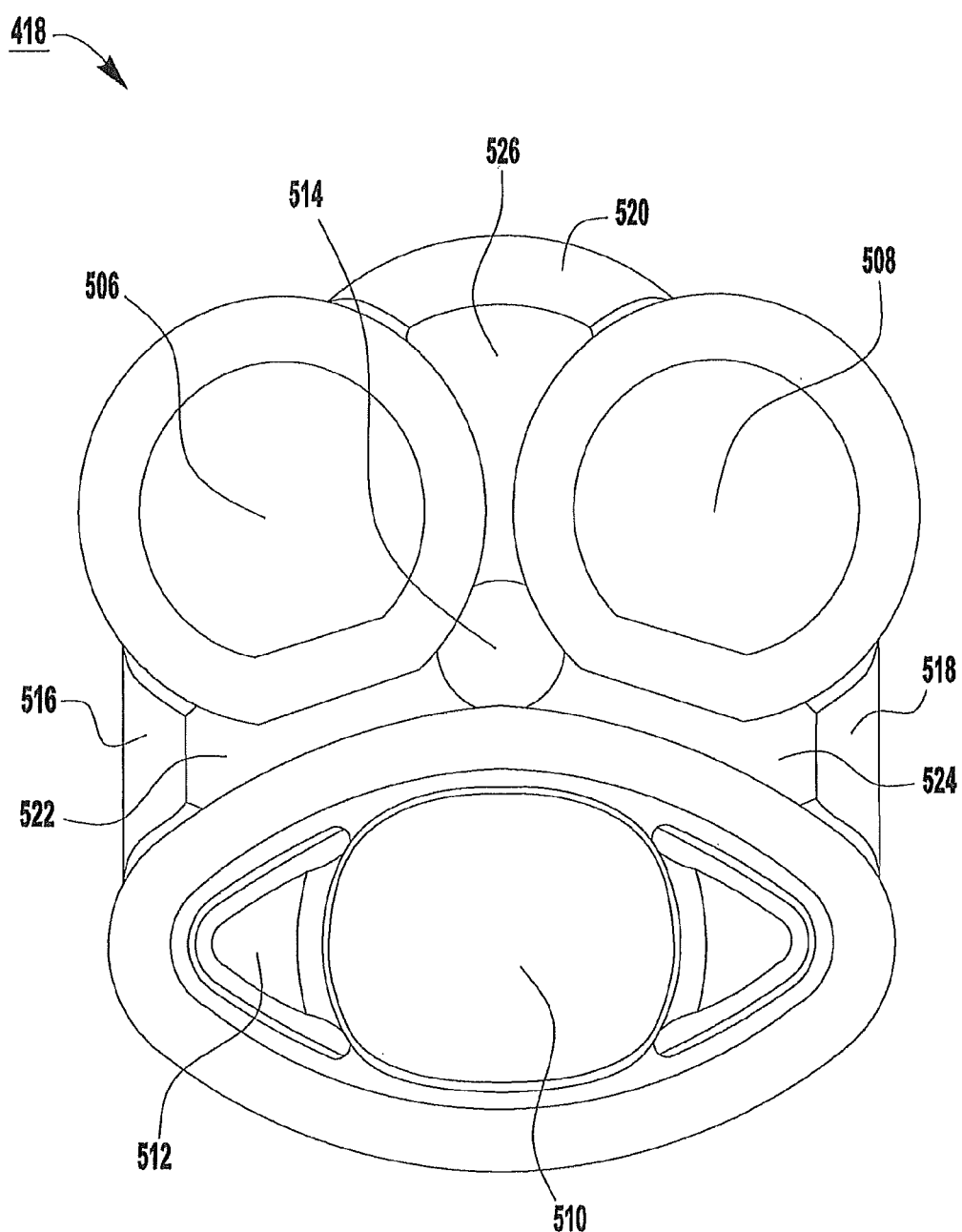
Figure 21A:
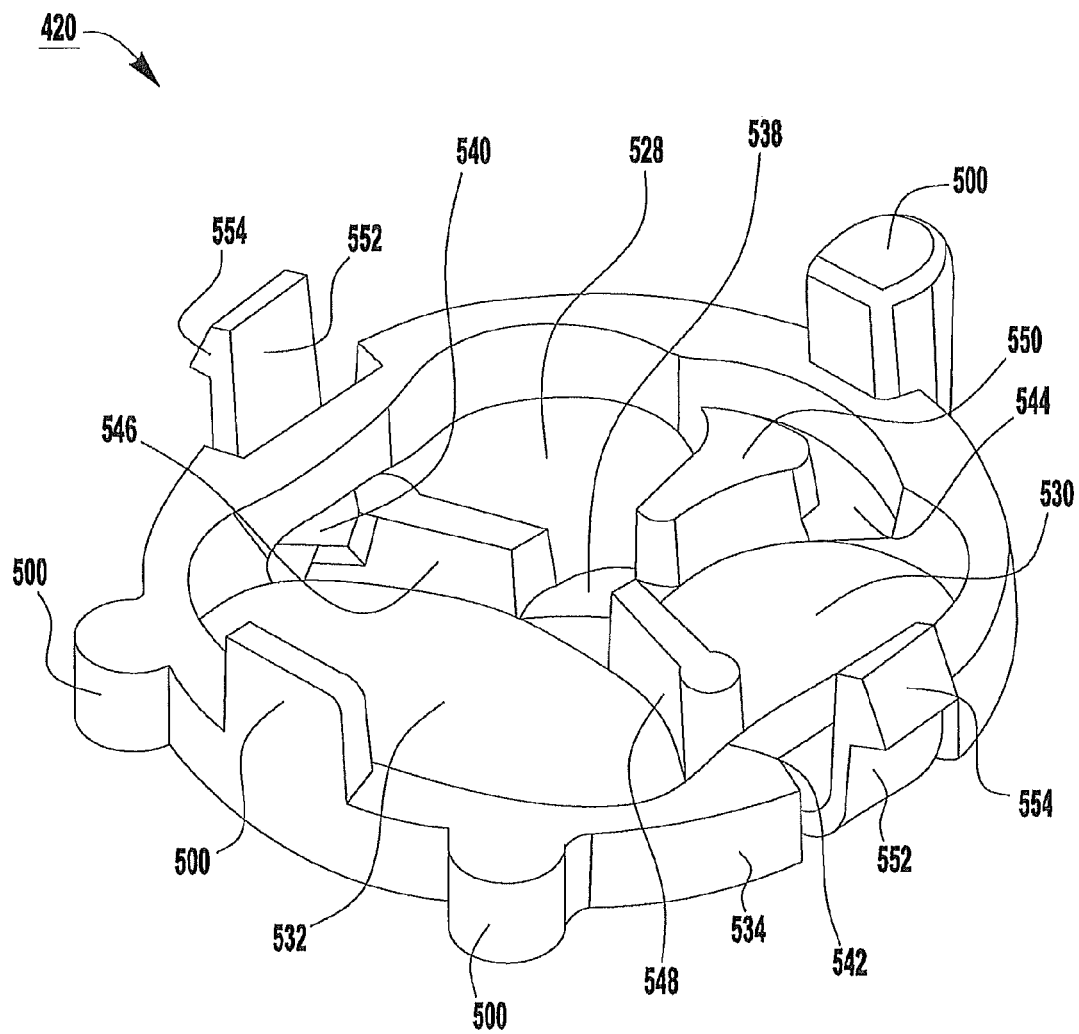
FIGS. 21A-21D show an exemplary lower housing used in the exemplary valve cartridge of FIG. 12.
Figure 21B:
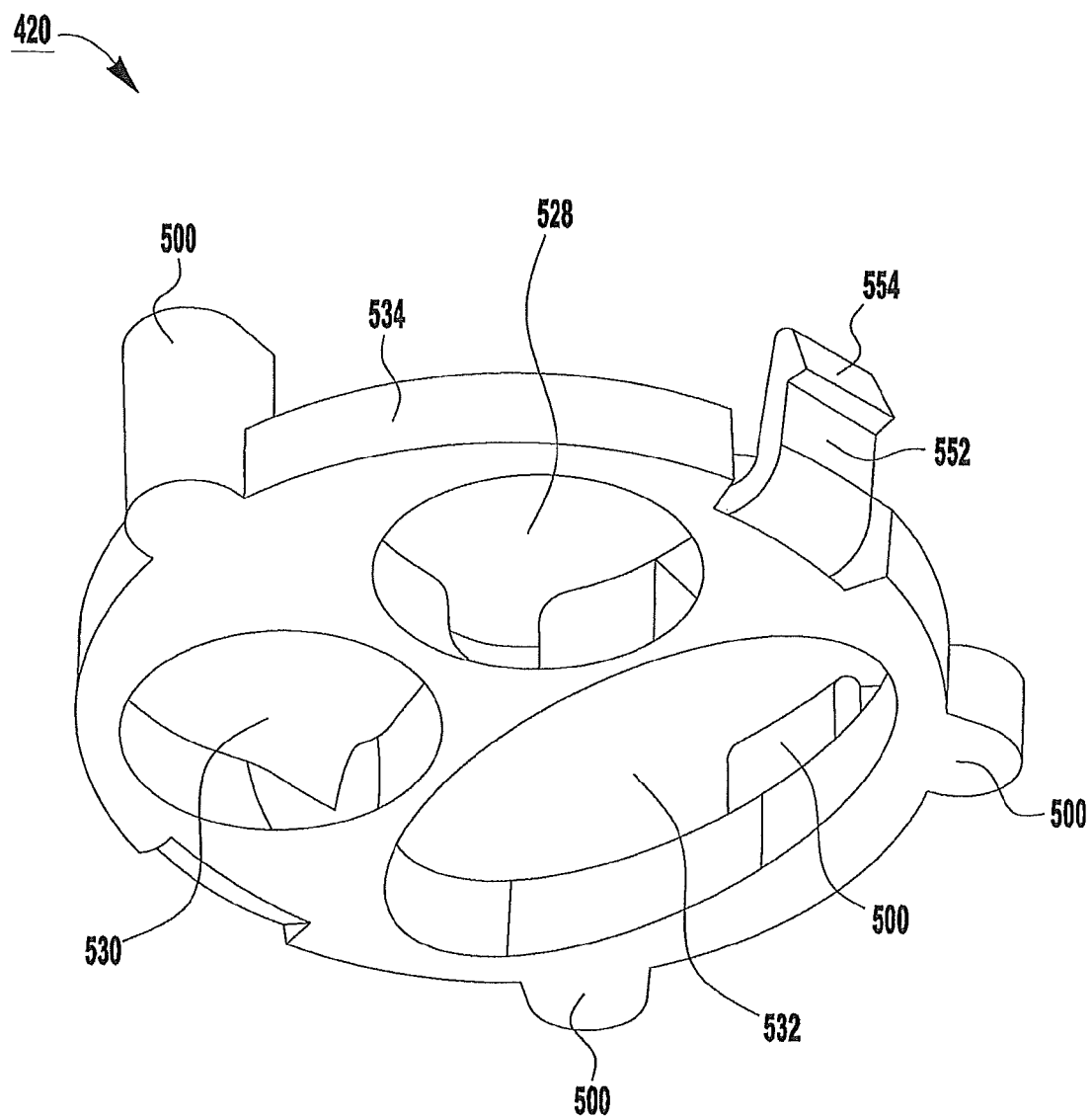
Figure 21C:
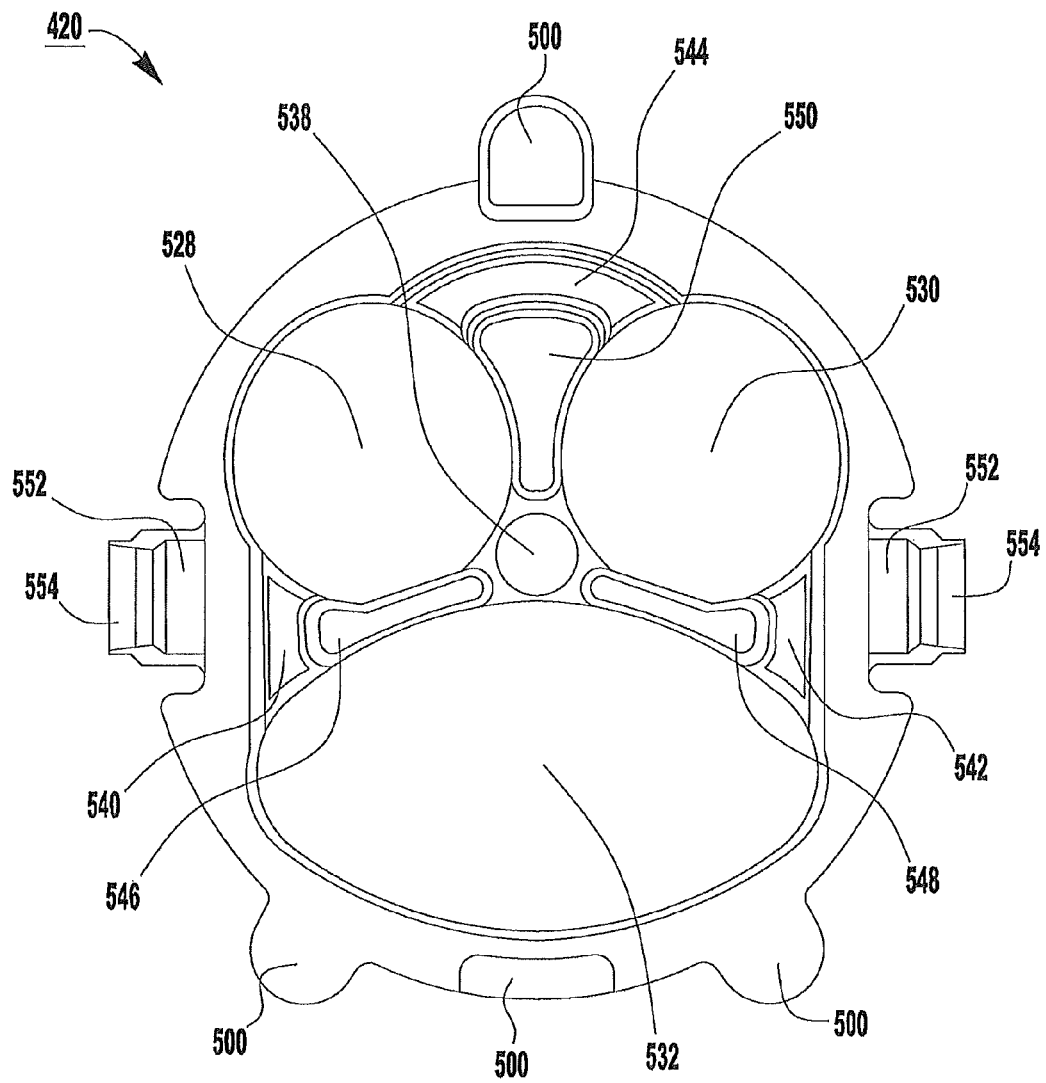
Figure 21D:
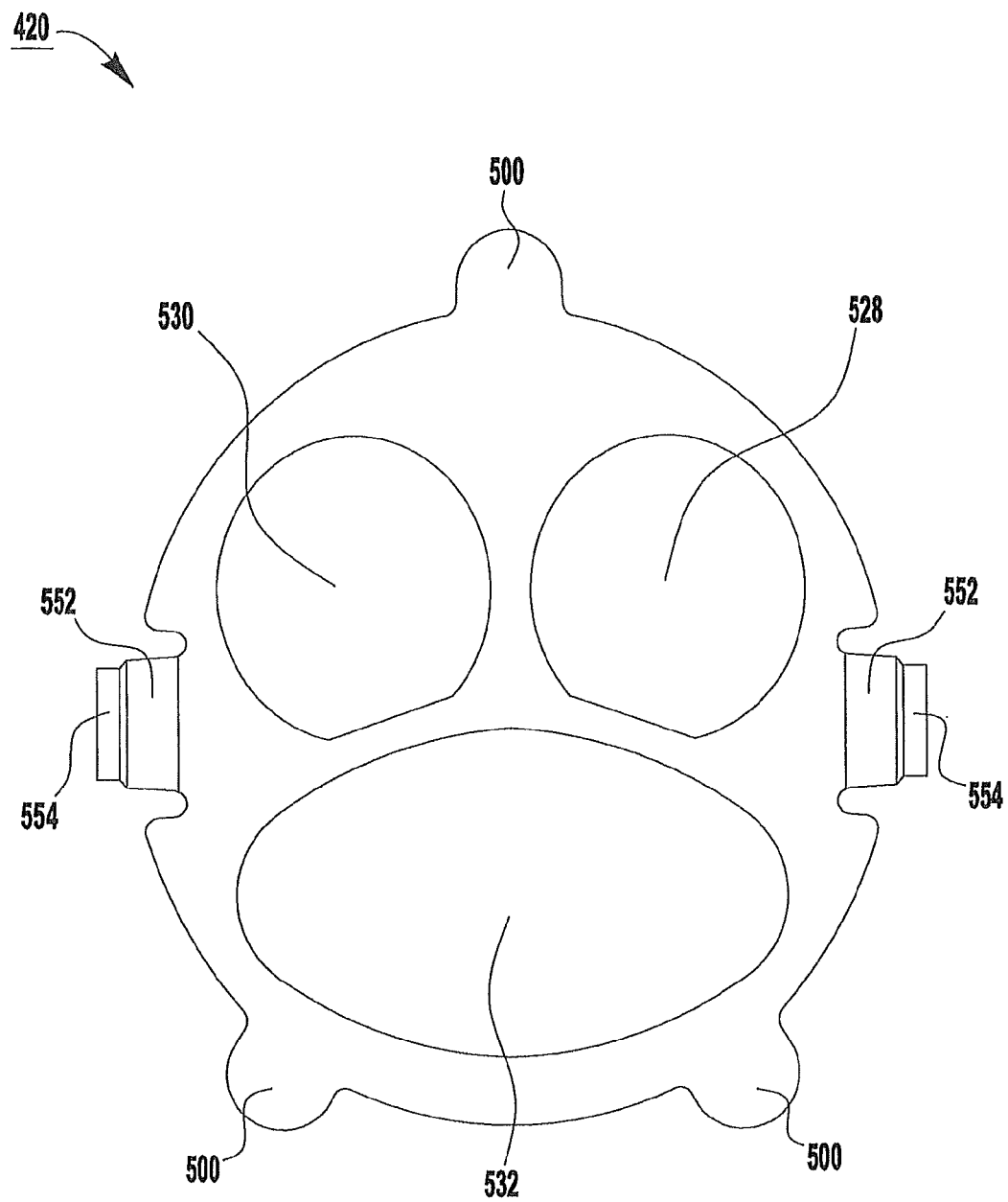

As shown in FIGS. 20A-20B, the base seal 418 is a sealing member formed of an elastic material (e.g., rubber). The base seal 418 forms a watertight seal around the cold water inlet aperture 486, the hot water inlet aperture 488 and the water outlet aperture 490 of the fixed disk 416. Like the fixed disk 416, the base seal 418 has a cold water inlet aperture 506, a hot water inlet aperture 508 and a water outlet aperture 510. In one exemplary embodiment, the water outlet aperture 510 of the base seal 418 is formed by inserting a member 512 (e.g., a plastic insert) having the water outlet aperture 510 therein into an opening in the base seal 418. In another exemplary embodiment, the base seal 418 is formed integrally with the lower housing 420.

The cold water inlet aperture 506, the hot water inlet aperture 508 and the water outlet aperture 510 are all connected by a hub 514 near the center of the base seal 418. Furthermore, the cold water inlet aperture 506 is connected to the water outlet aperture 510 by a first connection 516; the hot water inlet aperture 508 is connected to the water outlet aperture 510 by a second connection 518; and the cold water inlet aperture 506 is connected to the hot water inlet aperture 508 by a third connection 520. The joining of the cold water inlet aperture 506 to the water outlet aperture 510 by the first connection 516 forms a first space 522; the joining of the hot water inlet aperture 508 to the water outlet aperture 510 by the second connection 518 forms a second space 524; and the joining of the cold water inlet aperture 506 to the hot water inlet aperture 508 by the third connection 520 forms a third space 526.

It is important that the apertures 486, 488 and 490 in the fixed disk 416 are aligned with the apertures 506, 508 and 510 in the base seal 418 when the valve cartridge 400 is assembled. Accordingly, as described below, the hub 514, the first connection 516, the second connection 518, the third connection 520, the first space 522, the second space 524 and the third space 526 are used to align the base seal 418 in the lower housing 420 and, thus, with the fixed disk 418.

As shown in FIGS. 21A-21D and 22B-22C, the lower housing 420 interfaces with the upper housing 402 to retain the components (e.g., the bushing 410, the carrier 412, the movable disk 414, the fixed disk 416 and the base seal 418) in the cavity 422 of the upper housing 402 after assembly of the valve cartridge 400. The lower housing 420, for example, can be made of plastic or metal. The lower housing 420 can be formed from the same material as the upper housing 402.

Furthermore, the lower housing 420 functions as a support member to orient and retain the fixed disk 416 and the base seal 418 prior to assembly of the valve cartridge 400. Similar to the fixed disk 416 and the base seal 418, the lower housing 420 includes a cold water inlet aperture 528, a hot water inlet aperture 530 and a water outlet aperture 532 (see FIGS. 21A-21D). As noted above, the lower housing 420 also includes the projections 500. One or more projections 500 can extend above a sidewall 534 of the lower housing 420. In one exemplary embodiment, two projections 500 extend above the sidewall 534. One or more projections 500 can have a height that is substantially the same as a height of the sidewall 534. In one exemplary embodiment, two projections 500 have a height that is substantially the same as the height of the sidewall 534.

As noted above, one or more projections 500 can fit into openings 536 formed in the upper housing 402 below the keys 438 (see FIGS. 13A-13C). In one exemplary embodiment, three projections 500 fit into the openings 536. These projections 500 have a shape that is substantially the same as a shape of the keys 438. By fitting into the openings 536 below the keys 438, the projections 500 also function as part of the keys 438, for example, by engaging the complementary-shaped recesses in the valve body.

The size and/or shape of the projections 500 can be varied such that the lower housing 420 will interface with the fixed disk 416 and the upper housing 402 in only one orientation, thereby insuring that the fixed disk 416 will be properly oriented relative to the upper housing 402 and the lower housing 420 when the valve cartridge 400 is assembled. By engaging the notches 496 in the fixed disk 416, the projections 500 also prevent the fixed disk 416 from rotating relative to the lower housing 420 (and, thus, the upper housing 402).

The lower housing 420 includes a first recess 538, a second recess 540, a third recess 542 and a fourth recess 544. The lower housing 420 also includes a first projection 546, a second projection 548 and a third projection 550. The hub 514, the first connection 516, the second connection 518 and the third connection 520, respectively, of the base seal 418 fit into the first recess 538, the second recess 540, the third recess 542 and the fourth recess 544, respectively, of the lower housing 420. Furthermore, the first projection 546, the second projection 548 and the third projection 550, respectively, of the lower housing 420 fit into the first space 522, the second space 524 and the third space 526, respectively, of the base seal 418. Accordingly, the lower housing 420 orients, fixes and retains the base seal 418 in the lower housing 420.

The lower housing 420 also includes a pair of elastic flanges 552 that each have an angled upper portion 554. The notches 496 in the fixed disk 416 allow the elastic flanges 552 to be pressed inward (i.e., toward a central vertical axis of the valve cartridge 400), such that the angled upper portions 554 can enter the cavity 422 in the upper housing 402. When the angled upper portions 554 are aligned with the corresponding openings 556 formed in the upper housing 402 (see FIGS. 13A-13C), the elastic flanges 552 press outward and the angled upper portions 554 are received in the openings 556. In this manner, the lower housing 420 (including the fixed disk 416 and the base seal 418 interfaced therewith) can be secured to the upper housing 402 (see FIGS. 22B-22C).

It should be noted that although the notches 496 of the fixed disk 416 interface with the projections 500 of the lower housing 420 to prevent the fixed disk 416 from rotating within the lower housing 420 (and, thus, the upper housing 402), the fixed disk 416 is nonetheless allowed to move axially within the lower housing 420 and the upper housing 402. In this manner, compression of the base seal 418 exerts a loading force on the movable disk 414 and the fixed disk 416. Accordingly, the movable disk 414 and the fixed disk 416 are kept in water-tight engagement with one another, after installation of the valve cartridge 400.

The position and the orientation of the movable disk 414 relative to the fixed disk 416 are controlled by the stem portion 428 of the ball-stem 404 projecting out of the upper housing 402 through the upper opening 426. For example, pivoting the stem portion 428 of the ball-stem 404 about a pivot (e.g., the pin 406) changes the position of the movable disk 414 relative to the fixed disk 416, which changes the flow rate of the water. Rotating the stem portion 428 of the ball-stem 404 changes the orientation of the movable disk 414 relative to the fixed disk 416, which changes the temperature of the water.

An operating member (e.g., the operating member 234 shown in FIG. 11) such as a handle, knob or the like can be connected to the stem portion 428 of the ball-stem 404 to facilitate manipulation of the stem portion 428 by a user. Accordingly, after the valve cartridge 400 is installed in the valve body, the user can manipulate the operating member which moves the stem portion 428 of the ball-stem 404 to change the position and/or orientation of the movable disk 414 relative to the fixed disk 416, thereby controlling the flow rate and temperature of the water flowing through the valve cartridge 400 and out a plumbing fixture (e.g., the plumbing fixture 236 shown in FIG. 11).

Pivoting of the stem portion 428 of the ball-stem 404 about the pin 406 can be limited by the stem portion 428 contacting opposing surfaces of the upper opening 426 of the upper housing 402. Thus, the stem portion 428 of the ball-stem 404 contacts a first surface 558 of the upper opening 426 of the upper housing 402 when the valve cartridge 400 is in a fully closed position corresponding to a flow rate of zero (see FIG. 22C). The stem portion 428 of the ball-stem 404 contacts a second surface 560 of the upper opening 426 of the upper housing 402 when the valve cartridge 400 is in a fully open position corresponding to a maximum flow rate.

Rotation of the stem portion 428 of the ball-stem 404 can be limited by the distal ends of the pin 406 contacting end portions 562 of the slots 564 (see FIG. 22A). Accordingly, the length of the slots 564, which function as temperature limit stops, define the range of temperatures for which the valve cartridge 400 can deliver the water.

The valve body is operable to receive the valve cartridge 400 and includes the keyways formed in the inner surface of the valve body. The keyways have a curved shape for receiving the (lobular) keys 438 of the valve cartridge 400 therein. This curved shape of the keyways is easier and less expensive to form (e.g., machine) in the valve body than conventional keyways having a non-lobular shape.

The keys 438 of the valve cartridge 400 interface with the keyways of the valve body to insure that the valve cartridge 400 is aligned with the valve body. Accordingly, a cold water inlet, a hot water inlet and a water outlet of the valve body are brought into alignment with the apertures 486, 488 and 490 in the fixed disk 416 (and, thus, the apertures 506, 508 and 510 in the base seal 418 and the apertures 528, 530 and 532 in the lower housing 420) during installation of the valve cartridge 400 in the valve body.

Because the keyways extend from near a seating surface of the valve body to near an upper opening of the valve body, the keys 438 prevent the valve cartridge 400 from fitting through the upper opening of the valve body unless the keys 438 are aligned with the keyways. Furthermore, because the valve cartridge 400 has three, unevenly spaced keys 438, only one possible alignment exists between the keys 438 and the keyways. As a result, the valve cartridge 400 cannot be inserted in the valve body in an unaligned state. Accordingly, the keys 438 insure that the valve cartridge 400 is aligned with the valve body when the valve cartridge 400 is being installed in the valve body. Consequently, it is easier for the user to install the valve cartridge 400 in the valve body. Furthermore, installation of the valve cartridge 400 in the valve body can be performed more quickly. Further still, there is significantly less chance of any alignment error between the valve cartridge 400 and the valve body during installation of the valve cartridge 400.

In one exemplary embodiment, the height of a cavity of the valve body for receiving the valve cartridge 400 is between 1.076 and 1.082 inches. In another exemplary embodiment, the height of the cavity of the valve body is approximately equal to 1.079 inches. In still another exemplary embodiment, the height of the keyways is substantially the same as the height of the cavity of the valve body. The keyways, however, do not increase an overall height of the valve body.

In one exemplary embodiment, the depth of the keyways is between 0.041 and 0.047 inches. In another exemplary embodiment, the depth of the keyways is approximately equal to 0.044 inches. Because the depth of the keyways is less than or equal to the depth of a threaded surface of the valve body, the keyways do not increase an overall width (i.e., outer diameter) of the valve body.

Furthermore, the lobular keys 438 of the valve cartridge 400 interface with the keyways of the valve body to prevent the valve cartridge 400 from rotating relative to the valve body during operation of the valve cartridge 400. By preventing rotation of the valve cartridge 400 relative to the valve body, the alignment of the cold water inlet, the hot water inlet and the water outlet of the valve body valve and the apertures 486, 488 and 490 of the fixed disk 416 is maintained. Because the shape of the keyways closely matches the shape of the lobular keys 438, the user experiences a consistent, precise and smooth feel when manipulating the operating member during operation of the valve cartridge 400.

The above description of specific embodiments has been given by way of example. From the disclosure given, those skilled in the art will not only understand the general inventive concept and its attendant advantages, but will also find apparent various changes and modifications to the structures and methods disclosed. It is sought, therefore, to cover all such changes and modifications as fall within the spirit and scope of the general inventive concept, as defined herein, and equivalents thereof.

The invention claimed is:

1. A shell for housing dynamic sealing elements and operable to be installed in a valve body, the shell comprising a lobular key,
   wherein the lobular key includes a curved front surface and a rear surface,
   wherein at least the curved front surface of the lobular key is operable to interface with a corresponding curved keyway formed in the valve body to prevent rotation of the shell relative to the valve body, and
   wherein the rear surface of the lobular key includes an opening that is operable to interface with a portion of at least one of the dynamic sealing elements to prevent rotation of the at least one of the dynamic sealing elements relative to the shell.

2. The shell of claim 1, wherein the lobular key is formed integrally with the shell.

3. The shell of claim 1, wherein a height of the lobular key is between 0.486 and 0.494 inches.

4. The shell of claim 1, wherein a height of the lobular key is approximately 0.490 inches.

5. The shell of claim 1, wherein a height of the lobular key is between 0.641 and 0.651 inches.

6. The shell of claim 1, wherein a height of the lobular key is approximately 0.646 inches.

7. The shell of claim 1, wherein a height of the lobular key is greater than 30% of a height of the shell.

8. The shell of claim 1, wherein the shell is formed by connecting an upper housing and a lower housing, and wherein a portion of the lobular key is formed on the upper housing and a portion of the lobular key is formed on the lower housing.

9. The shell of claim 1, further comprising an installation ledge formed on the shell and operable to secure the shell in a valve body, and wherein the lobular key extends from a bottom of the shell to the installation ledge.

10. A shell for housing dynamic sealing elements and operable to be installed in a valve body, the shell comprising a plurality of lobular keys,
   wherein each lobular key is operable to interface with a corresponding curved keyway formed in the valve body, and
   wherein the lobular keys include a first lobular key, a second lobular key, and a third lobular key, and wherein a distance between the first lobular key and the second lobular key is different than a distance between the second lobular key and the third lobular key.

11. The shell of claim 10, wherein each lobular key is formed integrally with the shell.

12. The shell of claim 10, wherein a height of each lobular key is between 0.486 and 0.494 inches.

13. The shell of claim 10, wherein a height of each lobular key is approximately 0.490 inches.

14. The shell of claim 10, wherein a height of each lobular key is between 0.641 and 0.651 inches.

15. The shell of claim 10, wherein a height of each lobular key is approximately 0.646 inches.

16. The shell of claim 10, wherein a height of each lobular key is greater than 30% of a height of the shell.

17. The shell of claim 10, wherein the shell is formed by connecting an upper housing and a lower housing, and wherein a portion of each lobular key is formed on the upper housing and a portion of each lobular key is formed on the lower housing.

18. The shell of claim 10, further comprising an installation ledge formed on the shell and operable to secure the shell in a valve body, and wherein each lobular key extends from a bottom of the shell to the installation ledge.

* * * * *